US012015906B2

(12) United States Patent
Lee et al.

(10) Patent No.: US 12,015,906 B2
(45) Date of Patent: Jun. 18, 2024

(54) SOUND GENERATING DEVICE, DISPLAY APPARATUS INCLUDING THE SAME, AND AUTOMOTIVE APPARATUS INCLUDING THE SOUND GENERATING DEVICE

(71) Applicant: LG Display Co., Ltd., Seoul (KR)

(72) Inventors: Sungtae Lee, Paju-si (KR); KwanHo Park, Paju-si (KR); YeongRak Choi, Paju-si (KR); Kwangho Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/213,212

(22) Filed: Jun. 22, 2023

(65) Prior Publication Data

US 2023/0336920 A1 Oct. 19, 2023

Related U.S. Application Data

(62) Division of application No. 17/826,005, filed on May 26, 2022, now Pat. No. 11,743,654, which is a division of application No. 17/206,037, filed on Mar. 18, 2021, now Pat. No. 11,375,316, which is a (Continued)

(30) Foreign Application Priority Data

Dec. 31, 2018 (KR) ........................ 10-2018-0174091

(51) Int. Cl.

| | |
|---|---|
| ***H04R 9/06*** | (2006.01) |
| ***H04R 1/02*** | (2006.01) |
| ***H04R 7/26*** | (2006.01) |
| ***H04R 9/02*** | (2006.01) |
| ***H04R 9/04*** | (2006.01) |

(52) U.S. Cl.

CPC ............... *H04R 9/06* (2013.01); *H04R 1/025* (2013.01); *H04R 1/028* (2013.01); *H04R 7/26* (2013.01); *H04R 9/022* (2013.01); *H04R 9/025* (2013.01); *H04R 9/045* (2013.01); *H04R 2400/11* (2013.01); *H04R 2499/13* (2013.01); *H04R 2499/15* (2013.01)

(58) Field of Classification Search

None

See application file for complete search history.

(56) References Cited

U.S. PATENT DOCUMENTS

| | | | |
|---|---|---|---|
| 2003/0156732 | A1 | 8/2003 | Hong |
| 2006/0093180 | A1 | 5/2006 | Kim |
| 2012/0087517 | A1 | 4/2012 | Miyata et al. |

(Continued)

FOREIGN PATENT DOCUMENTS

| | | | |
|---|---|---|---|
| CN | 243915 | Y | 7/2001 |
| CN | 1438820 | A | 8/2003 |

(Continued)

OTHER PUBLICATIONS

First Notification of Office Action dated Jan. 7, 2021, issued in corresponding Chinese Patent Application No. 201911250158.3.

(Continued)

*Primary Examiner* — Kenny H Truong

(74) *Attorney, Agent, or Firm* — Morgan, Lewis & Bockius LLP

(57) ABSTRACT

A sound generating device includes a magnet and a center pole on a yoke, a bobbin around the center pole, a coil wound around the bobbin, a frame outside the yoke, a damper between the frame and the bobbin, and a spacer in the bobbin.

31 Claims, 25 Drawing Sheets

Related U.S. Application Data division of application No. 16/708,982, filed on Dec. 10, 2019, now Pat. No. 10,993,036.

(56) References Cited

U.S. PATENT DOCUMENTS

| | | | |
|---|---|---|---|
| 2017/0280215 | A1 | 9/2017 | Lee |
| 2017/0280234 | A1 | 9/2017 | Choi et al. |
| 2018/0317011 | A1 | 11/2018 | Choi et al. |
| 2018/0343512 | A1 | 11/2018 | Choi et al. |
| 2019/0238986 | A1 | 8/2019 | Ikeuchi |
| 2019/0260278 | A1 | 8/2019 | Kim et al. |
| 2020/0137472 | A1 | 4/2020 | Won |
| 2020/0213737 | A1 | 7/2020 | Won et al. |

FOREIGN PATENT DOCUMENTS

| | | | |
|---|---|---|---|
| CN | 101044787 | A | 9/2007 |
| CN | 205105393 | U | 3/2016 |
| CN | 108810760 | A | 11/2018 |
| KR | 20040079038 | A | 9/2004 |
| KR | 20110002370 | A | 1/2011 |
| KR | 10-1704517 | B1 | 2/2017 |
| KR | 20170115003 | A | 10/2017 |
| KR | 20180130352 | A | 12/2018 |

OTHER PUBLICATIONS

Office Action dated Jun. 26, 2023, issued in corresponding Korean Patent Application No. 10-2018-0174091.

SOUND GENERATING DEVICE, DISPLAY APPARATUS INCLUDING THE SAME, AND AUTOMOTIVE APPARATUS INCLUDING THE SOUND GENERATING DEVICE

CROSS-REFERENCE TO RELATED APPLICATIONS

This application is a Divisional of U.S. patent application Ser. No. 17/826,005, filed May 26, 2022, which is a Divisional of U.S. patent application Ser. No. 17/206,037, filed Mar. 18, 2021, which is a Divisional of U.S. patent application Ser. No. 16/708,982, filed Dec. 10, 2019, which claims the benefit and priority to Korean Patent Application No. 10-2018-0174091, filed on Dec. 31, 2018, all of which are incorporated herein by reference.

BACKGROUND

Technical Field

The present disclosure relates to a sound generating device, a display apparatus including the same, and an automotive apparatus including the sound generating device.

Discussion of the Related Art

Recently, as society advances toward an information-oriented society, the field of display apparatuses for visually displaying electrical information signal has rapidly advanced. Therefore, various display apparatuses having excellent performance, such as thinness, light weight, and low power consumption, are being developed.

For example, display apparatuses may be categorized into liquid crystal display (LCD) apparatuses, field emission display (FED) apparatuses, organic light emitting display apparatuses, etc.

The LCD apparatuses include an array substrate including a thin film transistor (TFT), an upper substrate including a color filter and/or a black matrix, and a liquid crystal layer between the array substrate and the upper substrate. The LCD apparatuses are apparatuses in which an alignment state of the liquid crystal layer is adjusted with an electric field generated between two electrodes provided in a pixel area, and a transmittance of light is adjusted based on the alignment state, thereby displaying an image.

The organic light emitting display apparatuses, which are self-emitting devices, have low power consumption, a fast response time, high emission efficiency, excellent luminance, and a wide viewing angle.

SUMMARY

Accordingly, embodiments of the present disclosure are directed to providing a sound generating device, a display apparatus including the same, and an automotive apparatus including the sound generating device that substantially obviate one or more of the issues due to limitations and disadvantages of the related art.

Display apparatuses display an image on a display panel, and a separate speaker is generally installed for providing a sound. When a speaker is installed in a display apparatus, a sound generated by the speaker travels to a rear surface of the display panel or toward a region under the display panel, instead of toward a front surface of the display panel, and for example, the sound does not travel in a direction toward a viewer who is watching an image displayed on the display panel. Due to this, an immersion experience of the viewer is hindered.

Moreover, a sound generated by a speaker travels toward a rear surface of a display panel or toward a region under the display panel, and for this reason, the quality of the sound is degraded due to interference of a sound reflected from a wall or a floor.

Moreover, when a speaker is included in a set apparatus such as a television (TV), a laptop computer, or a computer monitor, the speaker occupies a certain space. Thus, the design and space disposition of the set apparatus are limited.

Therefore, the present inventors have recognized the above-described problems and have performed various experiments so that when watching an image in front of a display panel, a traveling direction of a sound becomes a direction toward a front surface of the display panel, and thus, sound quality is enhanced. Through the various experiments, the present inventors have invented a display apparatus having a new structure, which outputs a sound so that a traveling direction of the sound becomes a direction toward a front surface of a display panel, thereby enhancing sound quality.

An aspect of the present disclosure is to provide a display apparatus including a sound generating device for generating sound that travels toward a region in front of a display panel.

Another aspect of the present disclosure is to provide a display apparatus including a sound generating device having a new structure for enhancing a sound.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, a sound generating device comprises a magnet and a center pole on a yoke, a bobbin around the center pole, a coil wound around the bobbin, a frame outside the yoke, a damper between the frame and the bobbin, and a spacer in the bobbin.

In another aspect, a sound generating device comprises a first sound generating module and a second sound generating module adjacent to the first sound generating module, wherein the first sound generating module and the second sound generating module includes a magnet and a center pole on a yoke, a bobbin around the center pole, a coil wound around the bobbin, a frame outside the yoke, a damper between the frame and the bobbin, and a spacer on the frame.

In another aspect, a display apparatus comprises a display panel configured to display an image, an encapsulation substrate on a rear surface of the display panel, at least one sound generating device in the display panel, the at least one sound generating device being configured to vibrate the display panel to generate sound, and a spacer between the encapsulation substrate and the at least one sound generating device.

In another aspect, a display apparatus comprises a display panel configured to display an image and including a first region, a second region, and a third region, a supporting member configured to support the display panel, at least one sound generating device in the display panel and at least one of the first region, the second region, and the third region, a first partition between the display panel and the supporting member, the first partition including a first side and a second side vertical to the first side, a second partition between the first region and the third region, and a third partition between the second region and the third region, wherein the at least one sound generating device includes a magnet and a center pole on a yoke, a bobbin around the center pole, a coil wound around the bobbin, a frame outside the yoke, a damper between the frame and the bobbin, and a spacer in the bobbin or on the frame.

In another aspect, an automotive apparatus comprises a vehicle body and a display apparatus or a sound generating device in the vehicle body.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this application, illustrate embodiments of the disclosure and together with the description serve to explain various principles of the disclosure.

Figure 1A:
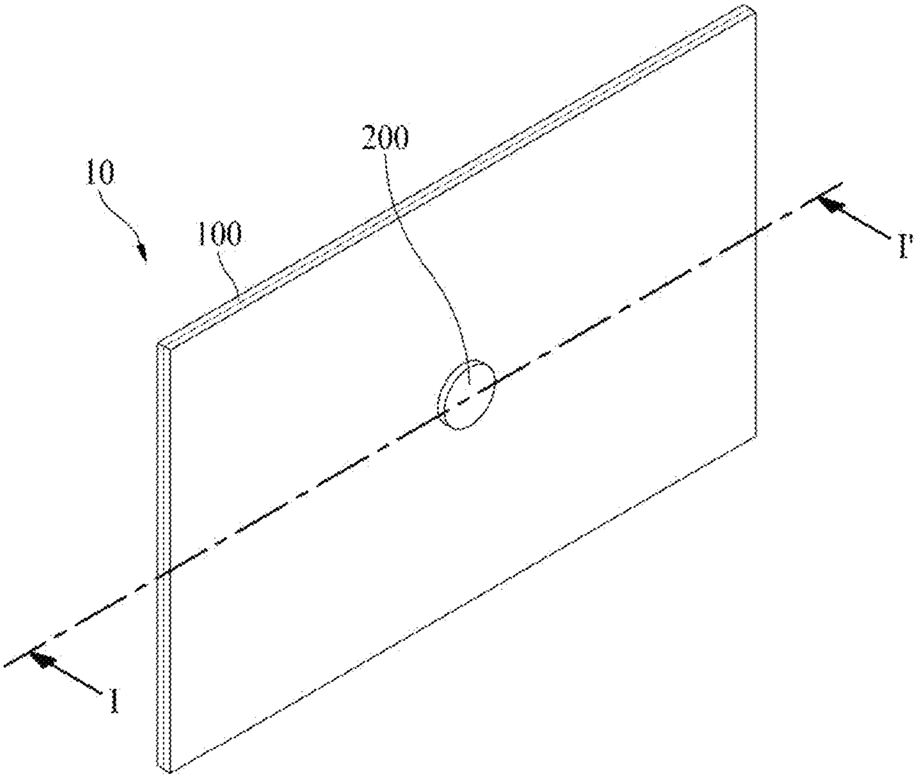
FIG. 1A illustrates a display apparatus including a sound generating device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to the exemplary embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where “comprise,” “have,” and “include” described in the present specification are used, another part may be added unless “only” is used. The terms of a singular form may include plural forms unless referred to the contrary.

In construing an element, the element is construed as including an error range although there is no explicit description.

In describing a position relationship, for example, when a position relation between two parts is described as “on,” “over,” “under,” and “next,” one or more other parts may be disposed between the two parts unless “just” or “direct(ly)” is used.

In describing a time relationship, for example, when the temporal order is described as “after,” “subsequent,” “next,” and “before,” a case which is not continuous may be included unless “just” or “direct(ly)” is used.

It will be understood that, although the terms “first,” “second,” etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as “first,” “second,” “A,” “B,” “(a),” “(b),” etc., may be used. Such terms are used for merely discriminating the corresponding elements from other elements and the corresponding elements are not limited in their essence, sequence, or precedence by the terms. It will be understood that when an element or layer is referred to as being “on” or “connected to” another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term “at least one” should be understood as including any and all combinations of one or more of the associated listed elements. For example, the meaning of “at least one of a first element, a second element, and a third element” denotes the combination of all elements proposed from two or more of the first element, the second element, and the third element as well as the first element, the second element, or the third element.

Features of various embodiments of the present disclosure may be partially or overall coupled to or combined to each other, and may be variously inter-operated to each other and driven technically as those skilled in the art can sufficiently understand. Embodiments of the present disclosure may be carried out independently from each other, or may be carried out together in co-dependent relationship.

In adding reference numerals to elements of each of the drawings, although the same elements are illustrated in other drawings, like reference numerals may refer to like elements. In the following description, when the detailed description of the relevant known function or configuration is determined to unnecessarily obscure the important point of the present disclosure, the detailed description will be omitted.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a television (TV), a computer monitor, an equipment apparatus including an automotive apparatus or another type apparatuses for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device, which is a final consumer device or an application product including the LCM or the OLED module.

In some embodiments, an LCM or an OLED module including a display panel and a driver may be referred to as a narrow-sense display apparatus, and an electronic device that is a final product including an LCM or an OLED module may be referred to as a set device. For example, the narrow-sense display apparatus may include a display panel, such as an LCD or an OLED, and a source printed circuit board (PCB) that is a controller for driving the display panel. The set apparatus may further include a set PCB that is a set controller electrically connected to the source PCB to overall control the set apparatus.

A display panel applied to the present embodiment may use any type of display panel, such as a liquid crystal display panel, an organic light emitting diode (OLED) display panel, and an electroluminescent display panel, but embodiments are not limited to any particular type of display panel that is vibrated by a sound generation device according to an embodiment of the present disclosure to output a sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT), which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached to the display panel. However, embodiments are not limited to the metal plate, and the display panel may include another structure.

Hereinafter, embodiments of the present disclosure will be described in detail with reference to the accompanying drawings.

FIG. 1A illustrates a display apparatus including a sound generating device according to an embodiment of the present disclosure.

FIG. 1A illustrates a rear surface of the display apparatus 10. With reference to FIG. 1A, the display apparatus 10 may include a display panel 100, which may display an image, and a sound generating device 200. The sound generating device 200 may vibrate the display panel 100 to generate sound SW to a forward region front of the display panel 100. The sound generating device 200 may be on a rear surface of the display panel 100.

The display panel 100 may display an image (for example, an electronic image or a digital image) and may be implemented as any type of display panel, such as a liquid crystal display panel, an organic light emitting diode (OLED) display panel, an electroluminescent display panel, etc. The display panel 100 may vibrate based on a vibration of the sound generating device 200 to output a sound.

According to an embodiment, the display panel 100 may display an image in a type such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed. In the bottom emission type, the visible light emitted from the pixel array layer may be irradiated onto a rearward region behind the base substrate to allow an image to be displayed.

Moreover, the sound generating device 200 may generate sound using the display panel 100 as a vibration plate. The sound generating device 200 may be referred to as an “actuator,” an “exciter,” or a “transducer,” but is not limited thereto. For example, the sound generating device 200 may be a sound device for outputting a sound according to an electrical signal.

Figure 1B:
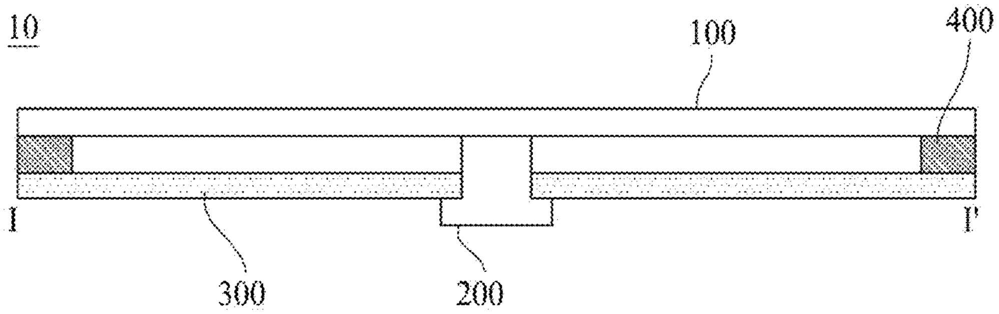
FIG. 1B is a cross-sectional view taken along line I-I' of FIG. 1A.

FIG. 1B is a cross-sectional view taken along line I-I' of FIG. 1A.

With reference to FIG. 1B, the display apparatus may include the sound generating device 200 and a supporting member 300.

The supporting member 300 may support one or more of a rear surface and a side surface of the display panel 100. Also, the sound generating device 200 may be fixed to the supporting member 300.

The supporting member 300 may be, for example, a cover bottom. For example, the supporting member 300 may include a middle cabinet, which may be coupled or connected to a cover bottom to surround the side surface (or a lateral surface) of the display panel 100 and may accommodate one edge or periphery of the display panel 100 to support the display panel 100. For example, the middle cabinet may include a sideways-T)-shaped cross-sectional surface. The supporting member 300 may include the cover bottom, or may include the cover bottom and the middle cabinet, but embodiments are not limited thereto. For example, the supporting member 300 may include an arbitrary structure that supports the rear surface and/or the side surface of the display panel 100.

The supporting member 300 may be a plate member that may be provided on the rear surface of the display panel 100 or all over the display panel 100. For example, the supporting member 300 may cover the whole rear surface of the display panel 100 so as to be spaced apart from the rear surface of the display panel by a certain air gap or distance. Also, the supporting member 300 may have a plate shape formed of a glass material, a metal material, or a plastic material. Here, an edge or a sharp corner of the supporting member 300 may have a tetragonal (e.g., quadrilateral) shape or a curved shape, e.g., through a chamfer process or a corner rounding process. According to an embodiment of the present disclosure, the supporting member 300 including the glass material may include sapphire glass. For example, the supporting member 300 including the metal material may be formed of one or more of aluminum (Al), an Al alloy, a magnesium (Mg) alloy, and an iron (Fe)-nickel (Ni) alloy. As another example, the supporting member 300 may have a stacked structure including a glass plate and a metal plate, in which the metal plate may have a thickness relatively thinner than the glass plate and the glass plate may face the rear surface of the display panel 100, and for example, a rear surface of the display apparatus 10 may be used as a mirror surface due to the metal plate. However, embodiments are not limited to the above materials or shape.

Moreover, the supporting member 300 may include a hole or a through-hole into which the sound generating device 200 may be accommodated or inserted. For example, the hole or the through-hole may be perforated or bored in a certain partial region of the supporting member 300 along a thickness direction of the supporting member 300 to have a circular shape or a polygonal shape, for the sound generating device 200 to be inserted or accommodated into the hole or the through-hole.

Moreover, in the present disclosure, the supporting member 300 may be referred to as a “cover bottom,” a “plate bottom,” a “back cover,” a “base frame,” a “metal frame,” a “metal chassis,” a “chassis base,” or an “m-chassis.” Therefore, the supporting member 300 may be a supporter for supporting the display panel 100, and may be implemented as any type of frame or plate structure on the rear surface of the display apparatus.

An adhesive member 400 may be in an edge or periphery of the display panel 100 and the supporting member 300. For example, the adhesive member 400 may be between the rear surface of the display panel 100 and an upper surface of the supporting member 300. The adhesive member 400 may attach the display panel 100 to the supporting member 300. Also, the adhesive member 400 may include a double-sided tape, a single-sided tape, an adhesive, a bond, and/or the like, but embodiments are not limited thereto.

Figure 2A:
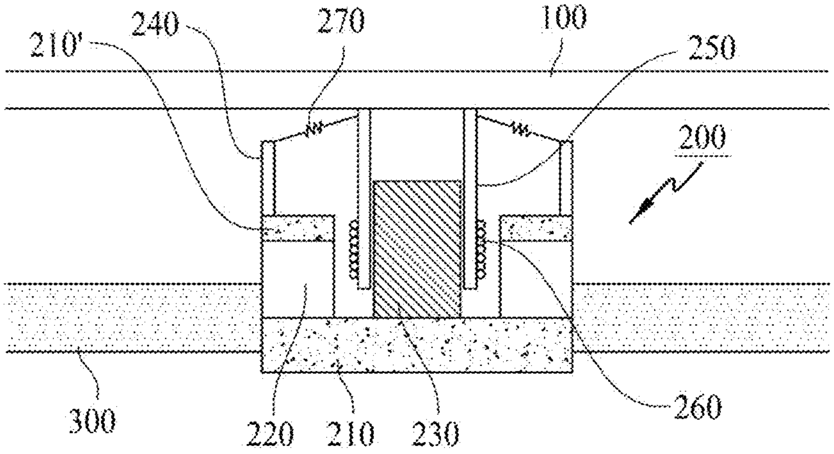
FIGS. 2A and 2B are cross-sectional views of a sound generating device according to an embodiment of the present disclosure.
Figure 2B:
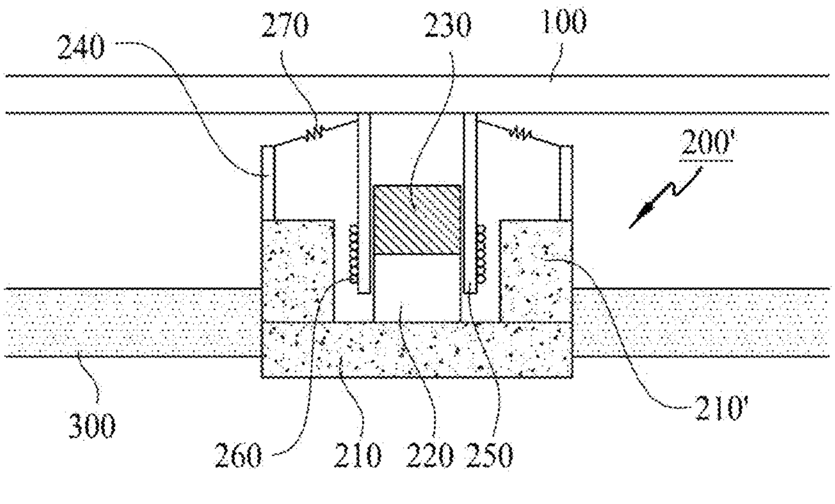

FIGS. 2A and 2B are cross-sectional views of a sound generating device according to an embodiment of the present disclosure.

The sound generating device may be classified into a first structure in which a magnet may be outside a coil, and a second structure in which a magnet may be inside a coil. The first structure may be referred to as a "dynamic type" or an "external magnetic type." Also, the second structure may be referred to as a "micro type" or an "internal magnetic type."

FIG. 2A illustrates the first structure, and FIG. 2B illustrates the second structure.

With reference to FIG. 2A, a sound generating device 200 may include a plurality of plates (for example, first and second plates) 210 and 210', a magnet 220 on a corresponding plate, a center pole 230 on a corresponding plate, a bobbin 250 near the center pole 230, and a coil 260 wound around the bobbin 250.

For example, the magnet 220 may be on the first plate 210, and the second plate 210' may be on the magnet 220. The first plate 210 and the second plate 210' may support the magnet 220 and may fix the sound generating device 200 to a supporting member 300. Therefore, the first plate 210 may be fixed to a supporting hole in the supporting member 300, and the magnet 220 may be fixed and supported between the first plate 210 and the second plate 210'.

At least one of the first plate 210 and the second plate 210' may include a material such as iron (Fe). Each of the first plate 210 and the second plate 210' is not limited to the term. For example, the first plate 210 or the second plate 210' may be referred to as a "yoke."

The magnet 220 may be implemented with a sintered magnet such as barium ferrite, and a material of the magnet 220 may use iron (III) oxide ($Fe_2O_3$), barium carbonate ($BaCO_3$; "witherite"), a neodymium magnet, strontium ferrite ($Fe_{12}O_{19}Sr$), e.g., with an improved magnet component, an alloy cast magnet including Al, nickel (Ni), and cobalt (Co), and/or the like, but embodiments are not limited thereto. For example, the neodymium magnet may be neodymium-iron-boron (Nd—Fe—B). However, embodiments are not limited thereto.

A frame 240 may be on the second plate 210' along an edge or periphery of the first plate 210. A center pole 230 may be in a center region of the first plate 210. Also, the center pole 230 and the first plate 210 may be provided as one body. Also, the center pole 230 may be referred to as "pole pieces." For example, pole pieces may be further on the center pole 230.

The bobbin 250 may surround the center pole 230. The coil 260 may be wound around a certain lower region (for example, a lower outer surface of the bobbin 250) of the bobbin 250. For example, the coil 260 may be wound around a lower outer surface of the bobbin 250, and a voice signal or a current for generating a sound may be applied to the coil 260.

The bobbin 250 may include a ring-shaped (or cylindrical) structure including a material obtained by processing pulp or paper, Al or Mg or an alloy thereof, synthetic resin such as polypropylene, or a polyamide-based fiber. The generic term for the bobbin 250 and the coil 260 may be a "voice coil."

Moreover, a damper 270 may be between the frame 240 and a partial region of an upper portion of the bobbin 250. The damper may be referred to as an "edge," a "spider," or a "suspension," but the term is not limited thereto.

FIG. 2B illustrates the second structure in which a magnet may be inside a coil.

With reference to FIG. 2B, a sound generating device 200' having the second structure may include a magnet 220 on a first plate 210, a center pole 230 on the magnet 220, a bobbin 250 near the magnet 220 and the center pole 230, and a coil 260 wound around the bobbin 250.

For example, the first plate 210 may be fixed to a supporting hole of a supporting member 300. The magnet 220 may be on the first plate 210, and the center pole 230 may be on the magnet 220. Also, the center pole 230 may be referred to as "pole pieces." For example, pole pieces may be further on the center pole 230.

The bobbin 250 may surround the magnet 220 and the center pole 230, and the coil 260 may be wound around an outer surface of the bobbin 250.

A second plate 210' may be near the first plate 210, and a frame 240 may be on the second plate 210'. For example, a damper 270 may be between the frame 240 and the bobbin 250.

In comparison with the first structure in which a magnet may be outside a coil, the second structure including an internal magnet may be small in leakage of magnetic flux and may reduce a total size of a sound generating device.

The sound generating device applied to the display apparatus according to an embodiment of the present disclosure is not limited to the first structure illustrated in FIG. 2A and the second structure illustrated in FIG. 2B. For example, the display apparatus according to an embodiment of the present disclosure may include another kind of sound generating device, which may vibrate a display panel to generate sound.

Figure 3A:
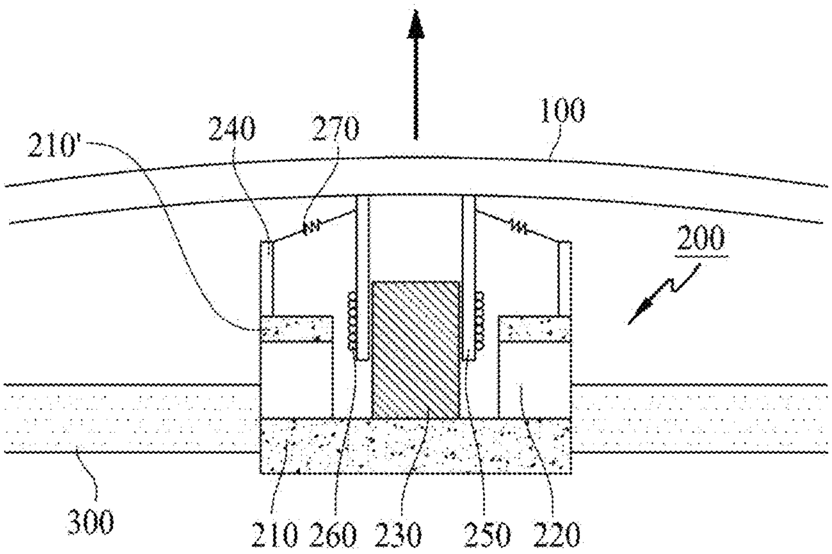
FIGS. 3A and 3B illustrate a sound generating operation performed by a sound generating device having a first structure according to an embodiment of the present disclosure.
Figure 3B:
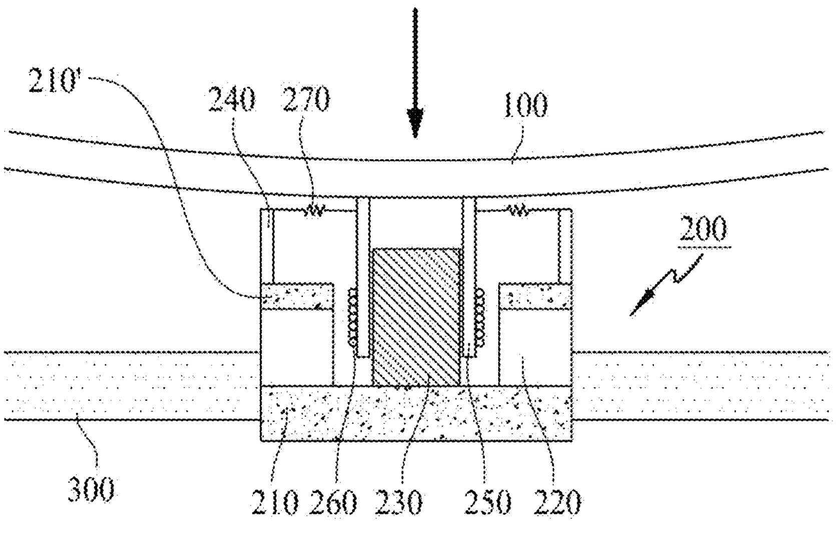

FIGS. 3A and 3B illustrate a sound generating operation performed by a sound generating device having a first structure according to an embodiment of the present disclosure.

FIG. 3A illustrates a state in which a current may be applied.

The center pole may be a north (N)-pole, and the second plate 210' connected to an upper surface of the magnet 220 may be a south (S)-pole, and an external magnetic field may be generated around the coil 260. The north and south poles may be interchangeable.

In this state, when a current for generating a sound is applied to the coil 260, an application magnetic field may be generated around the coil 260, and a force for moving the bobbin 250 to an upper portion may be generated by the application magnetic field and an external magnetic field. For example, when a current is applied to the coil 260, a magnetic field may be generated around the coil 260. Thus, the bobbin 250 may be guided by the center pole 230, and may move to the upper portion according to Fleming's Left-Hand Rule for Motors based on the generated application magnetic field and the external magnetic field generated by the magnet 220.

Therefore, one surface of the bobbin 250 may contact a rear surface of the display panel 100. Thus, the bobbin 250 may vibrate the display panel 100 in an upward direction (illustrated by an arrow) according to whether a current is applied to the coil 260 or not, and a sound wave (or a sound) may be generated by the vibration of the display panel 100.

In this state, when the application of the current stops or a reverse current is applied, as illustrated in FIG. 3B, a force for moving the bobbin 250 to a lower side may be generated according to the principle similar to description given above with reference to FIG. 3A, and the display panel 100 may vibrate in a downward direction (illustrated by an arrow).

The damper 270 may be between a portion of an upper portion of the bobbin 250 and the frame 240. The damper 270 may be provided in a creased structure, and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to an original position by the restoring force of the damper 270.

Therefore, the display panel 100 may vertically vibrate based on a direction and level of a current applied to the coil 260. A sound wave may be generated by the vibration.

Figure 4A:
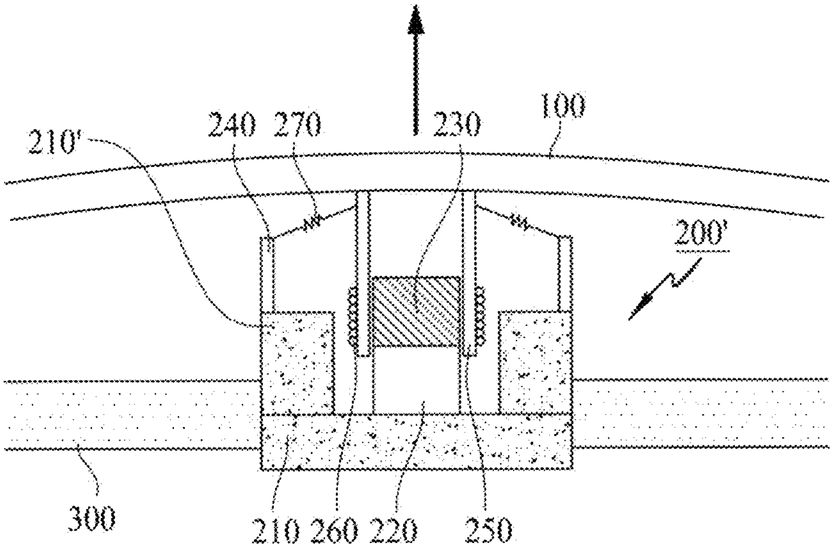
FIGS. 4A and 4B illustrate a sound generating operation performed by a sound generating device having a second structure according to an embodiment of the present disclosure.
Figure 4B:
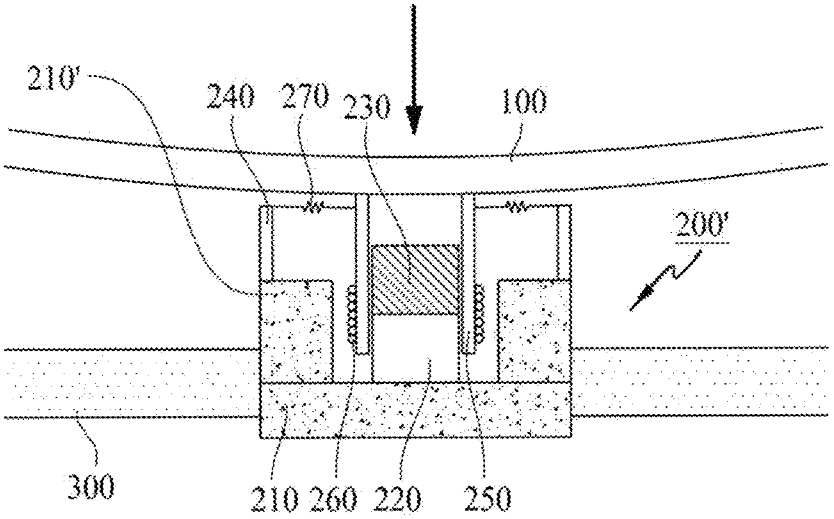

FIGS. 4A and 4B illustrate a sound generating operation performed by a sound generating device having a second structure according to an embodiment of the present disclosure.

FIG. 4A illustrates a state in which a current may be applied.

The second plate 210' may be an S-pole, and the center pole 230 connected to an upper surface of the magnet 220 may be an N-pole, whereby an external magnetic field may be generated around the coil 260. The S-pole and the N-pole may switch therebetween, and if the S-pole and the N-pole switches therebetween, the sound generating device may identically operate by correcting a winding direction of the coil 260. In this state, when a current for generating a sound is applied to the coil 260, an application magnetic field may be generated around the coil 260, and a force for moving the bobbin 250 to an upper portion may be generated by the application magnetic field and an external magnetic field. For example, when a current is applied to the coil 260, a magnetic field may be generated around the coil 260. Thus, the bobbin 250 may be guided by the center pole 230, and may move to the upper side according to Fleming's Left-Hand Rule for Motors based on the generated application magnetic field and the external magnetic field generated by the magnet 220.

Therefore, one surface of the bobbin 250 may contact a rear surface of the display panel 100. Thus, the bobbin 250 may vibrate the display panel 100 in an upward direction (illustrated by an arrow) according to whether a current is applied to the coil 260 or not, whereby a sound wave (or a sound) may be generated by the vibration of the display panel 100.

In this state, when the application of the current stops or a reverse current is applied, as illustrated in FIG. 4B, a force for moving the bobbin 250 to a lower side may be generated according to the principle similar to description given above with reference to FIG. 4A, and the display panel 100 may vibrate in a downward direction (illustrated by an arrow).

The damper 270 may be between a partial region of an upper portion of the bobbin 250 and the frame 240. The damper 270 may be provided in a creased structure having elasticity and may be contracted and relaxed based on a vertical motion of the bobbin 250 to control a vertical vibration of the bobbin 250. For example, the damper 270 may be connected to the bobbin 250 and the frame 240. Thus, the vertical vibration of the bobbin 250 may be controlled by a restoring force of the damper 270. For example, when the bobbin 250 vibrates by a certain height or more or vibrates by a certain height or less, the bobbin 250 may be restored to an original position by the restoring force of the damper 270.

Therefore, the display panel 100 may vertically vibrate based on an application direction and level of a current applied to the coil 260. A sound wave may be generated by the vibration.

Figure 5:
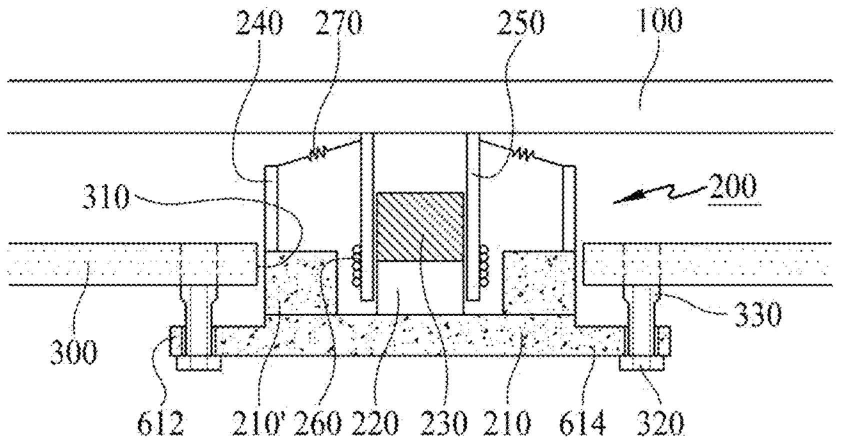
FIG. 5 illustrates a connection structure of a supporting member and a sound generating device according to an embodiment of the present disclosure.

FIG. 5 illustrates a connection structure of a supporting member and a sound generating device according to an embodiment of the present disclosure.

In an embodiment of the present disclosure, any of a sound generating device having the first structure and a sound generating device having the second structure may be applied. Hereinafter, a sound generating device having the second structure will be described as an example.

With reference to FIG. 5, a sound generating device 200 may include a diameter enlargement part 614. The diameter enlargement part 614 may be provided as one body with a first plate 210 of the sound generating device 200. One side of the first plate 210 may include a protrusion that may be greater than a diameter of the other portion of the first plate 210. A protrusion region having an enlarged diameter may be referred to as a "diameter enlargement part 614." The diameter enlargement part 614 may have a ring shape. Also, an extension part 612 for fixing the sound generating device 200 may be in a portion of the diameter enlargement part 614.

A screw 320 and a nut 330 may be provided on the extension part 612. The sound generating device 200 may be coupled to a supporting member 300 by the screw 320 using the nut 330 fixed to the supporting member 300. The nut 330 may be, for example, a self-clinching nut. An example of the self-clinching nut may include a PEM® nut, and embodiments are not limited thereto. Also, the sound generating device 200 may be accommodated into a supporting hole 310 in the supporting member 300.

If the self-clinching nut is used, a portion of a vibration generated by the sound generating device 200 may be absorbed by the self-clinching nut which is the nut 330. Thus, a vibration transferred to the supporting member 300 may be reduced. Also, the display panel 100 may be attached to the bobbin 250 of the sound generating device 200.

As described above with reference to FIG. 5, a sound generating device may be coupled or connected to a display panel through a supporting hole of a supporting member. However, there is a problem where a rear surface of the supporting member needs the supporting hole and external particles penetrate into the inside of the display panel through the supporting hole. Also, since the sound generating device is exposed at the rear surface of the supporting member, a sense of beauty in appearance is reduced by the sound generating device exposed at the rear surface of the supporting member. Also, since a protection cover for protecting the sound generating device is needed for preventing damage of the sound generating device exposed at the rear surface of the supporting member, there is a problem where a process of adding the protection cover is needed or a thickness of the sound generating device is thickened by the protection cover. Therefore, the present inventors have performed various experiments for configuring the sound generating device which is provided in the display panel without being coupled or connected to the supporting member by the supporting hole of the supporting member. Through the various experiments, the present inventors have recognized that a thickness of the sound generating device should be reduced for configuring the sound generating device in the display panel. When the sound generating device is thick, the inventors have recognized that there is a problem where a thickness of the display panel is thickened, the image quality of the display panel or an image displayed by the display panel is adversely affected, and a sense of beauty in appearance is reduced. Therefore, to reduce a thickness of the sound generating device, it is required to reduce a thickness of the element in the sound generating device. For example, when a thickness of a magnet is reduced, a magnetic flux density may decrease, causing a problem where a sound pressure may be lowered. Also, when a height (or a thickness) of a bobbin is lowered, a winding width of a coil wound around the bobbin may be reduced, and due to this, a magnetic force of the sound generating device may be weakened, causing a problem where an articulation of a tone is reduced or a sound pressure is lowered. Also, a line through which an electrical signal is transferred to a coil may cause a problem where an interference sound occurs in the sound generating device due to interference by a damper. Therefore, through various experiments, the present inventors have invented a sound generating device having a new structure, in which a thickness of the sound generating device is reduced by widening an area of the sound generating device, and a sound is not affected. This will be described below with reference to FIGS. 6 to 12.

Figure 6:
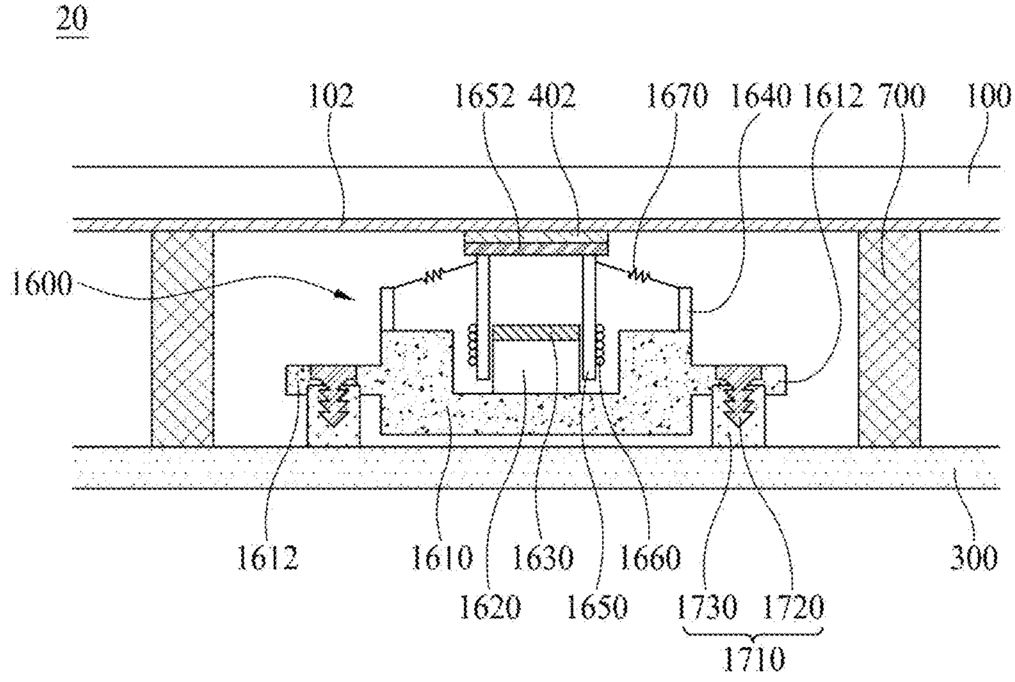
FIG. 6 illustrates a display apparatus including a sound generating device according to an embodiment of the present disclosure.

FIG. 6 illustrates a display apparatus including a sound generating device according to another embodiment of the present disclosure.

In an embodiment of the present disclosure, any of a sound generating device having the first structure and a sound generating device having the second structure may be applied. Hereinafter, the second structure will be described as an example.

With reference to FIG. 6, the display apparatus 20 according to another embodiment of the present disclosure may include a display panel 100 and a sound generating device 1600. An encapsulation substrate 102 may be on a rear surface of the display panel 100. For example, the encapsulation substrate 102 may protect a thin film transistor (TFT) and a light emitting device layer in the display panel 100 against an external impact and may prevent water (or moisture) or oxygen from penetrating into the light emitting device layer. The encapsulation substrate 102 may be referred to as an "encapsulation substrate."

The sound generating device 1600 may include a magnet 1620 on a yoke 1610, a center pole 1630 on the magnet 1620, a bobbin 1650 near the magnet 1620 and the center pole 1630, and a coil 1660 wound around an outer portion of the bobbin 1650. A frame 1640 may be on the yoke 1610. Also, a damper 1670 may be between the frame 1640 and the bobbin 1650. A description of the sound generating device 1600 may be substantially similar to the description given above with reference to FIG. 2, and thus, may be omitted.

The display panel 100 may be attached to the bobbin 1650 of the sound generating device 1600 by an adhesive member 402. For example, a bobbin ring 1652 may be further on the bobbin 1650. The bobbin ring 1652 may be between the bobbin 1650 and the display panel 100, and may transfer a vibration of the bobbin 1650 to the display panel 100. In the FIG. 6 example, an example where the bobbin ring 1652 is all over the bobbin 1650 will be described. However, embodiments are not limited, and the bobbin ring 1652 may be disposed at a position at which the bobbin 1650 is located. The bobbin ring 1652 may be attached to the display panel 100 by the adhesive member 402. The adhesive member 402 may include a double-sided tape, a single-sided tape, an adhesive, a bond, and/or the like, but embodiments are not limited thereto. Also, as in the FIG. 6 example, the adhesive member 402 may be at a portion where the sound generating device 1600 is attached to the display panel 100, but embodiments are not limited thereto. For example, the adhesive member 402 may be on a whole rear surface of the display panel 100. For example, the adhesive member 402 may be on a whole surface between the display panel 100 and the sound generating device 1600. Also, a partition 700 may be between the display panel 100 and the supporting member 300.

A coupling or connection member 1710 may be in the sound generating device 1600 for the sound generating device 1600 to be disposed in the display panel 100. The yoke 1610 may include an extension part 1612. The coupling or connection member 1710 may be in the extension part 1612 of the yoke 1610. For example, a screw tap may be formed by enlarging a thickness of the yoke 1610, and then, screwing may be performed. The screw tap may be formed as a manual tap, a machine tap, a gas screw tap, and a master tap, but embodiments are not limited thereto. For example, the coupling or connection member 1710 may be in the supporting member 300. The coupling or connection member 1710 may include a screw 1720 and a nut 1730. The screw 1720 and the nut 1730 may be in the supporting member 300, and the sound generating device 1600 may be fixed to or in the supporting member 300 by the screw 1720 and the nut 1730. The nut 1730 may be, for example, a self-clinching nut. An example of the self-clinching nut may include a PEM® nut, but embodiments are not limited thereto.

For example, in the sound generating device 1600, the supporting member 300 may be coupled or connected to the nut 1730 by a press-fitting manner without a supporting hole of the supporting member 300. The press-fitting manner may use a saw-toothed press-fitting manner, and embodiments are not limited to a coupling or connection manner or a coupling or connection shape. Therefore, the sound generating device 1600 may be in the display panel 100. For example, the sound generating device 1600 may be between the display panel 100 and the supporting member 300 by the coupling or connection member 1710. Therefore, a sound generating device may be in a display panel, and thus, a supporting hole of a supporting member may not be provided, thereby preventing penetration of external particles through the supporting hole of the supporting member. Also, because the sound generating device is not exposed at a rear surface of the supporting member, a display apparatus having an aesthetic appearance may be provided, and damage of the sound generating device may be prevented.

Figure 7:
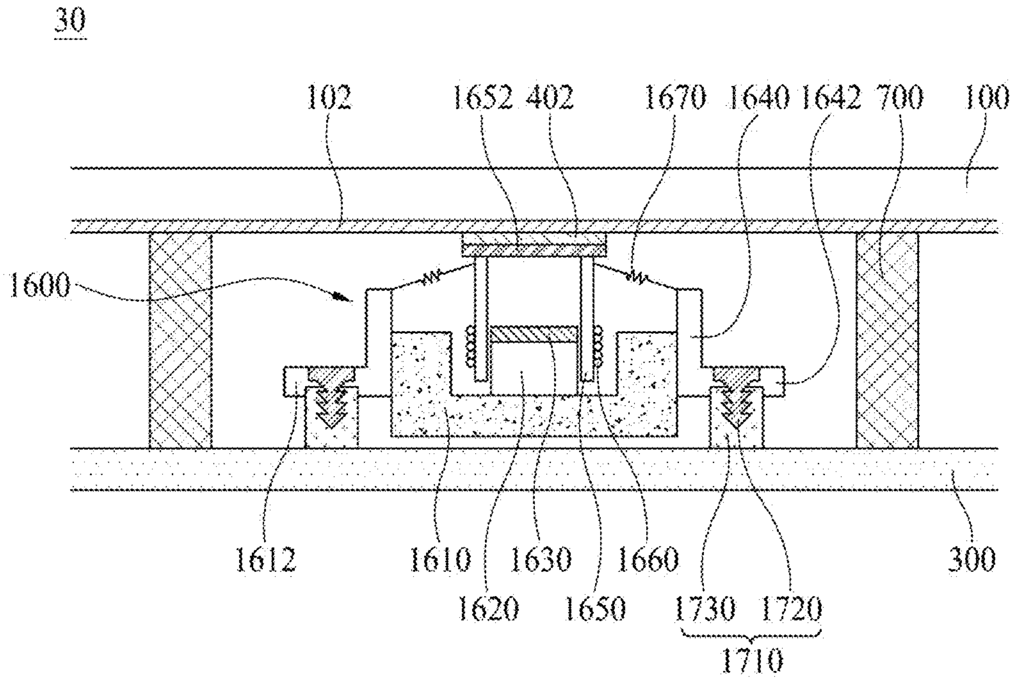
FIG. 7 illustrates a display apparatus including a sound generating device according to an embodiment of the present disclosure.

FIG. 7 illustrates a display apparatus 30 including a sound generating device according to another embodiment of the present disclosure.

In an embodiment of the present disclosure, any of a sound generating device having the first structure and a sound generating device having the second structure may be applied. Hereinafter, the second structure will be described as an example.

With reference to FIG. 7, the display apparatus 30 according to another embodiment of the present disclosure may include a display panel 100 and a sound generating device 1600. An encapsulation substrate 102 may be on a rear surface of the display panel 100. For example, the encapsulation substrate 102 may protect a TFT and a light emitting device layer in the display panel 100 against an external impact and may prevent water (or moisture) or oxygen from penetrating into the light emitting device layer. The encapsulation substrate 102 may be referred to as an "encapsulation substrate."

The sound generating device 1600 may include a magnet 1620 on a yoke 1610, a center pole 1630 on the magnet 1620, a bobbin 1650 near the magnet 1620 and the center pole 1630, and a coil 1660 wound around an outer portion of the bobbin 1650. A frame 1640 may be outside the yoke 1610. Also, a damper 1670 may be between the frame 1640 and the bobbin 1650. A description of the sound generating device 1600 may be the substantially similar to the description given above with reference to FIG. 2, and thus, may be omitted.

The display panel 100 may be attached to the bobbin 1650 of the sound generating device 1600 by an adhesive member 402. For example, a bobbin ring 1652 may be further on the bobbin 1650. The bobbin ring 1652 may be between the bobbin 1650 and the display panel 100 and may transfer a vibration of the bobbin 1650 to the display panel 100. In FIG. 6, an example where the bobbin ring 1652 is disposed all over the bobbin 1650 will be described. However, embodiments are not limited, and the bobbin ring 1652 may be disposed at a position at which the bobbin 1650 is located. The bobbin ring 1652 may be attached to the display panel 100 by the adhesive member 402. The adhesive member 402 may include a double-sided tape, a single-sided tape, an adhesive, a bond, and/or the like, but embodiments are not limited thereto. Also, as in FIG. 6, the adhesive member 402 may be in a portion where the sound generating device 1600 is attached to the display panel 100, but embodiments are not limited thereto. For example, the adhesive member 402 may be on a whole rear surface of the display panel 100. For example, the adhesive member 402 may be on a whole surface between the display panel 100 and the sound generating device 1600. Also, a partition 700 may be between the display panel 100 and the supporting member 300.

A coupling or connection member 1710 may be in the sound generating device 1600 for the sound generating device 1600 to be placed or disposed in the display panel 100. The frame 1640 may include an extension part 1642. The coupling or connection member 1710 may be in the extension part 1642 of the frame 1640. The coupling or connection member 1710 may include a screw 1720 and a nut 1730. The screw 1720 and the nut 1730 may be in the supporting member 300, and the sound generating device 1600 may be fixed to or in the supporting member 300 by the screw 1720 and the nut 1730. The nut 1730 may be, for example, a self-clinching nut. An example of the self-clinching nut may include a PEM® nut, but embodiments are not limited thereto.

For example, in the sound generating device 1600, the supporting member 300 may be coupled or connected to the nut 1730 by a press-fitting manner without a supporting hole of the supporting member 300. The press-fitting manner may use a saw-toothed press-fitting manner, and embodiments are not limited to a coupling or connection manner or a coupling or connection shape. Therefore, the sound generating device 1600 may be in the display panel 100. For example, the sound generating device 1600 may be between the display panel 100 and the supporting member 300 by the connection member 1710. Therefore, a sound generating device may be in a display panel, and thus, a supporting hole of a supporting member may not be provided, thereby preventing penetration of external particles through the supporting hole of the supporting member. Also, because the sound generating device is not exposed at a rear surface of the supporting member, a display apparatus having an aesthetic appearance may be provided, and damage of the sound generating device may be prevented.

The encapsulation substrate 102 on a rear surface of the display panel 100 may be formed of a ferromagnetic material, for example, a material such as invar which is an iron-nickel (Fe—Ni) alloy, and thus, the present inventors have recognized that a magnetic force of a magnet of the sound generating device in the display panel 100 is absorbed by the encapsulation substrate, and due to this, is lost. The present inventors have recognized that the encapsulation substrate is attracted by the magnetic force of the magnet, and thus, the sound generating device is pressed, whereby the sound generating device is unable to vibrate vertically. Also, the present inventors have recognized that the encapsulation substrate is attracted by the magnetic force of the magnet and is adhered to the sound generating device, and due to this, a space enabling the sound generating device to vibrate is lost. Therefore, through various experiments, the present inventors have invented a display apparatus where the leakage of a magnetic force of a sound generating device is reduced, and a space enabling the sound generating device to vibrate is not reduced. This will be described below with reference to FIGS. 8 to 12.

Figure 8:
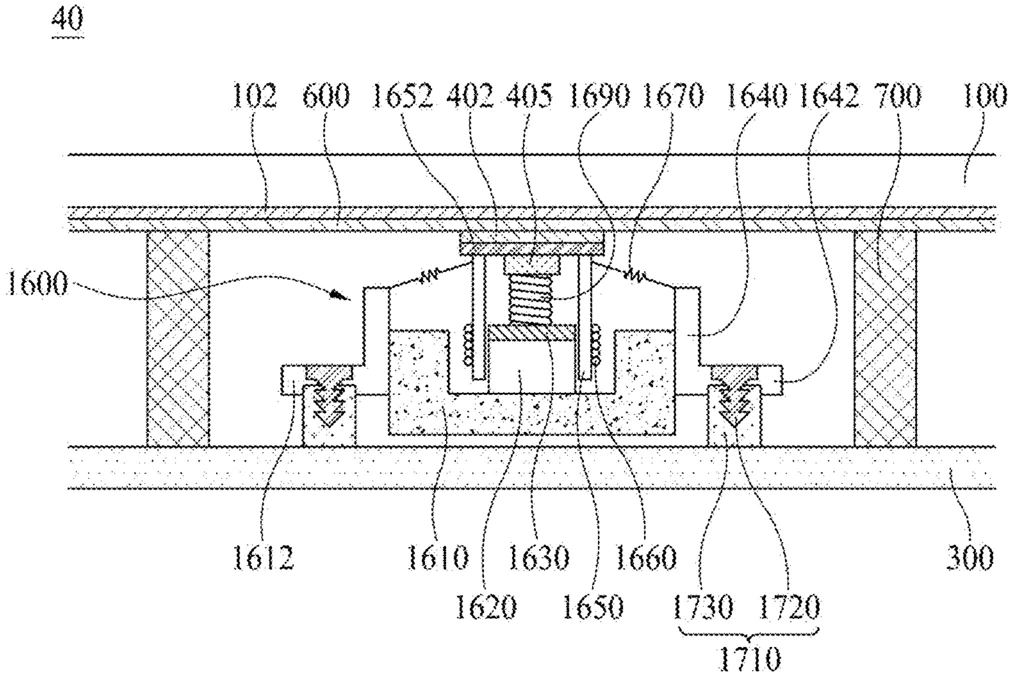
FIG. 8 illustrates a display apparatus including a sound generating device according to another embodiment of the present disclosure.

FIG. 8 illustrates a display apparatus including a sound generating device according to another embodiment of the present disclosure.

In an embodiment of the present disclosure, any of a sound generating device having the first structure and a sound generating device having the second structure may be applied. Hereinafter, the second structure will be described as an example.

With reference to FIG. 8, the display apparatus 40 according to another embodiment of the present disclosure may include a display panel 100 and a sound generating device 1600. The sound generating device 1600 may be disposed between the display panel 100 and a supporting member 300. The sound generating device 1600 may be in the display panel 100. A description of the sound generating device 1600 may be substantially similar to descriptions given above with reference to FIGS. 2, 6, and 7, and thus, may be omitted. The display apparatus 40 of FIG. 8, for example, will be described with reference to FIG. 7 and may be similarly applied to the display apparatus of FIG. 6.

The sound generating device 1600 may include a magnet 1620 on a yoke 1610, a center pole 1630 on the magnet 1620, a bobbin 1650 near the magnet 1620 and the center pole 1630, and a coil 1660 wound around an outer portion of the bobbin 1650. A frame 1640 may be outside the yoke 1610. Also, a damper 1670 may be between the frame 1640 and the bobbin 1650. A bobbin ring 1652 may be further on the bobbin 1650. In FIG. 8, an example where the bobbin ring 1652 is disposed all over the bobbin 1650 will be described. However, embodiments are not limited thereto, for example, the bobbin ring 1652 may be disposed at a position at which the bobbin 1650 is located.

An encapsulation substrate 102 may be on a rear surface of the display panel 100. A spacer 1690 may be further between the display panel 100 and the center pole 1630 of the sound generating device 1600, for decreasing the loss of a magnetic force of the magnet 1620 caused by the encapsulation substrate 102. For example, the spacer 1690 may maintain an interval or distance between the encapsulation substrate 102 and the magnet 1630 of the sound generating device 1600. For example, the spacer 1690 may be inside the bobbin 1650. For example, the spacer 1690 may be between the center pole 1630 and the encapsulation substrate 102. For example, the spacer 1690 may be between the center pole 1630 and the heat dissipation member 600. A second adhesive member 405 may be between the spacer 1690 and the bobbin 1650 or the bobbin ring 1652. The spacer 1690 may be attached to the sound generating device 1600 by the second adhesive member 405. For example, the spacer 1690 may be attached to the bobbin 1650 or the bobbin ring 1652 by the second adhesive member 405. The adhesive member 402 may include a double-sided tape, a single-sided tape, an adhesive, a bond, and/or the like, but embodiments are not limited thereto. For example, the spacer 1690 may include one of a spring and an adhesive, but embodiments are not limited thereto. For example, the spring 1690 may include a nonmagnetic material. For example, the spring 1690 may include one material of stainless steel and a copper (Cu) alloy, but embodiments are not limited thereto. For example, the Cu alloy may include one or more materials of: brass that is an alloy of Cu and zinc (Zn), beryllium (Be) bronze that is an alloy of Cu and Be, and phosphor bronze that slight phosphorus (P) is included in Cu and tin (Sn), but embodiments are not limited thereto. Therefore, the spacer 1690 may maintain an interval or distance between the encapsulation substrate 102 and the sound generating device 1600, thereby solving a problem where the encapsulation substrate 102 is attracted by the magnetic force of the magnet 1620, and due to this, the display panel 100 is attracted. Therefore, the present disclosure may decrease a problem where the sound generating device is unable to vertically vibrate because the encapsulation substrate is attracted by the magnetic force of the magnet and thus the sound generating device is pressed. Also, the present disclosure may decrease a problem where a space enabling the sound generating device to vibrate is lost because the encapsulation substrate is attracted by the magnetic force of the magnet and is adhered to the sound generating device.

A heat dissipation member 600 may be further on the rear surface of a display panel 100, for decreasing heat occurring when a sound generating device 1600 is vibrating. For example, the heat dissipation member 600 may be on the rear surface of the display panel 100 using an adhesive member. The heat dissipation member 600 may be configured to cover the sound generating device 1600 or to have a size that is greater than that of the sound generating device 1600 and may have a polygonal plate shape or a circular plate shape having a certain thickness, but embodiments are not limited thereto. For example, the heat dissipation member 600 may be a heat dissipation sheet or a heat dissipation tape formed of a metal material that has high thermal conductivity like aluminum (Al), copper (Cu), or silver (Ag) and an alloy thereof, but embodiments are not limited thereto. Accordingly, because the heat dissipation member 600 is provided, an influence of heat occurring when the sound generating device is vibrating may be reduced on the image quality of the display panel 100.

FIGS. 9A to 9D illustrate a sound generating device according to another embodiment of the present disclosure.

FIGS. 9A to 9D are rear views illustrating the sound generating device according to another embodiment of the present disclosure. FIGS. 9A to 9D illustrate an example of a sound generating device which is reduced in thickness and is in a display panel.

Figure 9A:
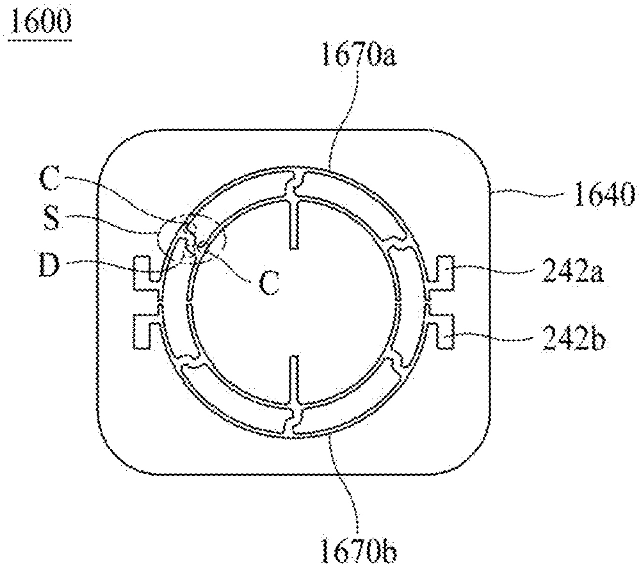
FIGS. 9A to 9D illustrate a sound generating device according to another embodiment of the present disclosure.
Figure 9B:
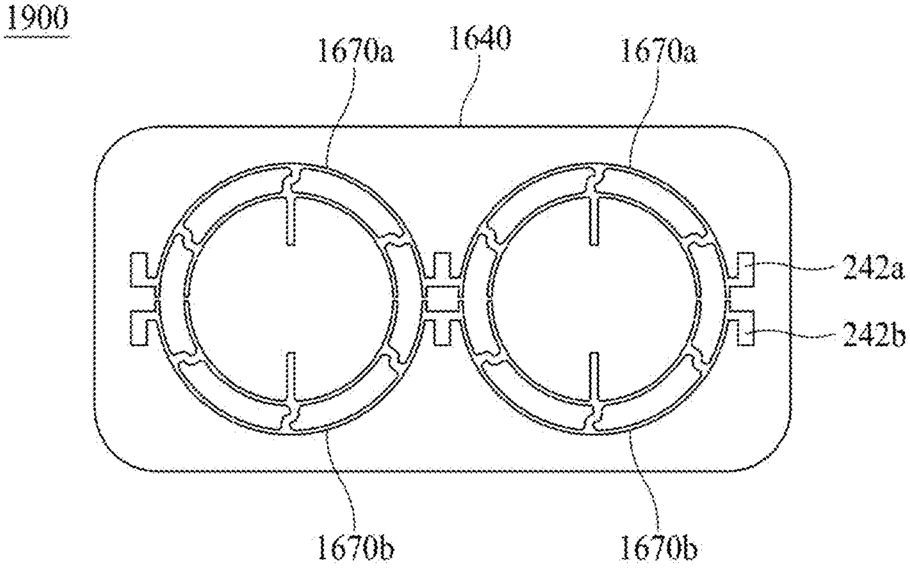
Figure 9C:
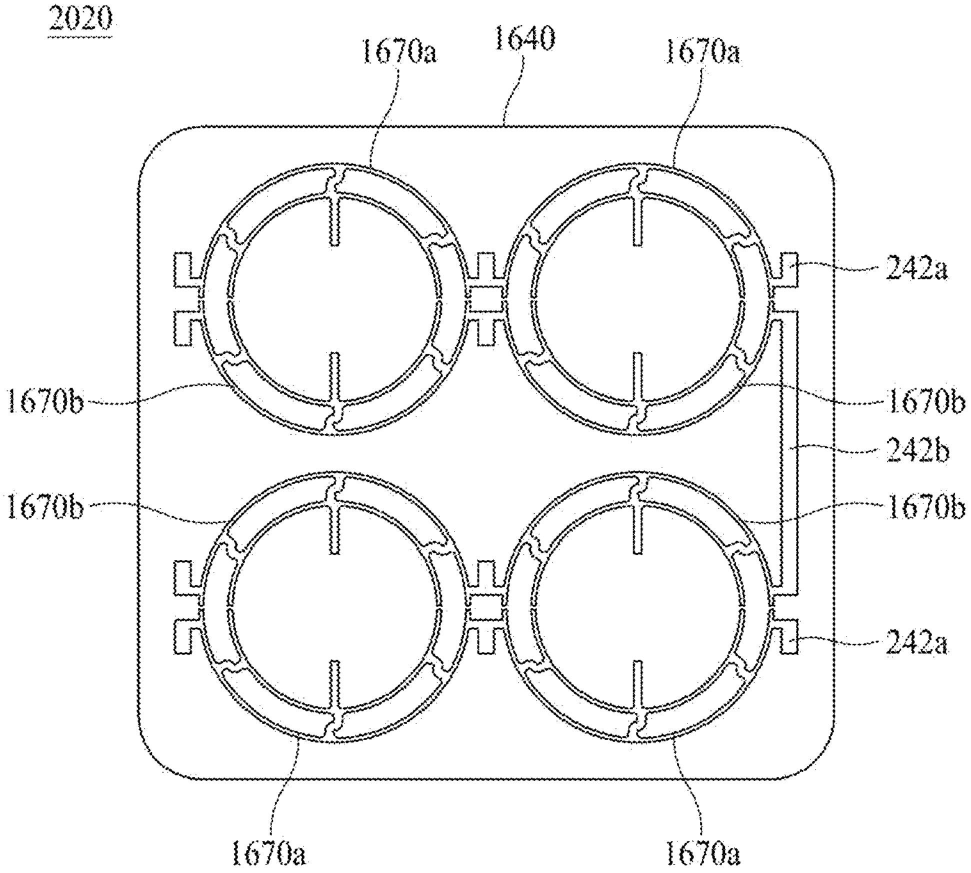
Figure 9D:
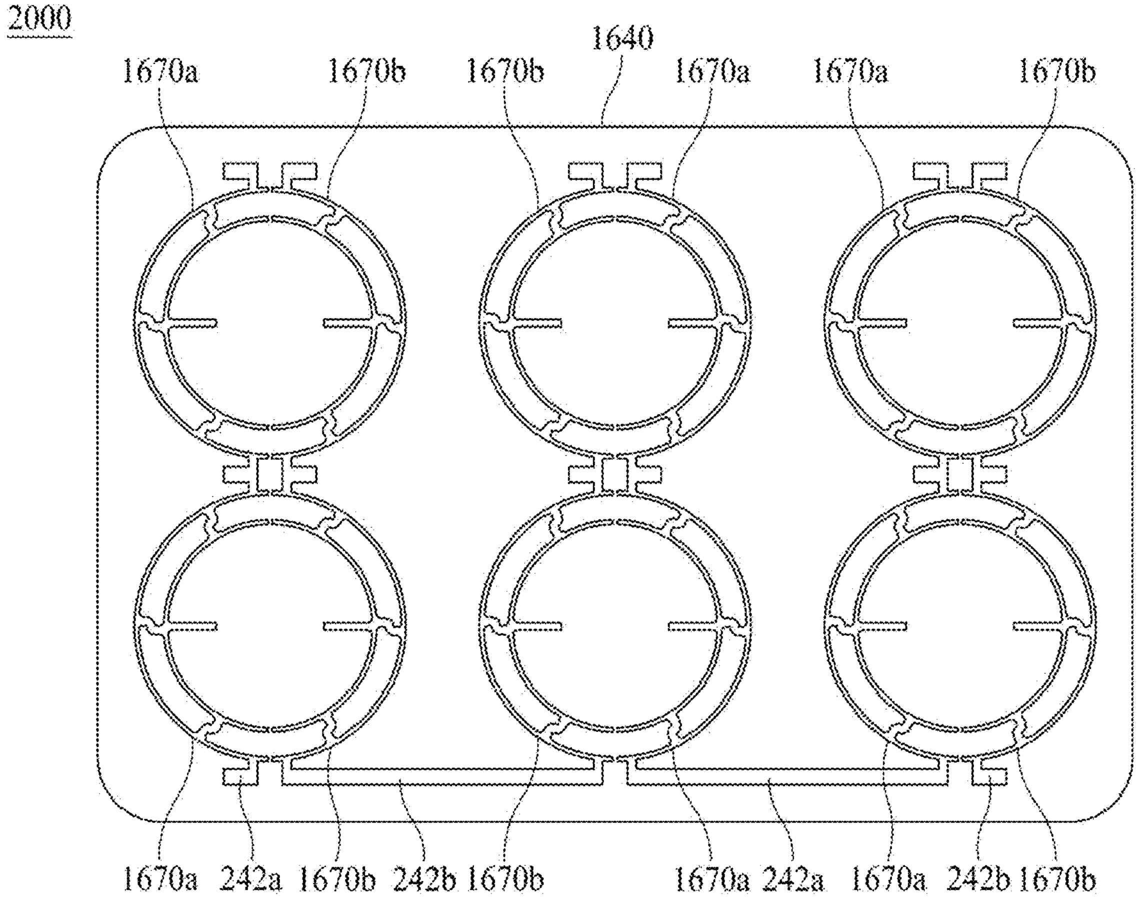

FIG. 9A illustrates one sound generating device. FIG. 9B illustrates a two-device array in which two sound generating devices may be provided. FIG. 9C illustrates a four-device array in which four sound generating devices may be provided. FIG. 9D illustrates a six-device array in which six sound generating devices may be provided. The sound generating device according to an embodiment of the present disclosure may be configured as one sound generating device or a sound generating device having two or more-device array structure, but embodiments are not limited thereto. The sound generating device having the first structure or the second structure described above with reference to FIGS. 2A and 2B may be applied to the sound generating device according to an embodiment of the present disclosure. The sound generating device may be a sound generating module, but the term is not limited thereto.

With reference to FIGS. 9A to 9D, an area of a damper may be widely set for decreasing a thickness of a sound generating device, and for enhancing the performance of a magnet. Also, the damper may include stainless steel, Cu, and/or the like, and thus, may be a line for applying a sound signal to the sound generating device.

With reference to FIG. 9A, in a one sound generating device 1600, a damper 1670 may be on a frame 1640. The one sound generating device 1600 may be referred to as a "single type."

The damper 1670 may be configured to perform a function of a line, and thus, may include a first damper **1670*a* to which positive (+) power (or a sound signal) may be applied and a second damper 1670*b* to which negative (−) power (or a sound signal) is applied. The damper 1670 may be divided with respect to a widthwise direction. For example, the first damper 1670*a*, to which the positive power may be applied, may be an upper portion with respect to the front of the drawing and the second damper 1670*b*, to which the negative power may be applied, may be a lower portion with respect to the front of the drawing. For example, the first damper 1670*a* may be connected to a first line 242*a*, and the second damper 1670*b* may be connected to a second line 242*b*. Also, a shape 'S' of the damper 1670 may be provided as a zigzag shape. When the damper 1670 may be configured diagonally, disconnection may occur due to a vertical motion of the damper 1670, and when a length of the damper 1670 is long, the damper 1670** may affect a resonance frequency. For example, a portion illustrated by 'C' and a portion illustrated by 'D' may be configured to have the same thickness and different widths, and disconnection may be avoided or prevented from occurring in an overlapping portion therebetween.

With reference to FIG. 9B, in a two-device array sound generating device 1900, a damper 1670 may be on a frame 1640. The two-array sound generating device 1900 may be referred to as a "twin type."

A plurality of dampers may be connected to each other in parallel. The damper 1670 may be configured to perform a function of a line, and thus, may include a first damper **1670*a* to which positive (+) power may be applied, and a second damper 1670*b* to which negative (−) power may be applied. The damper 1670 may be divided with respect to a widthwise direction. For example, the first damper 1670*a*, to which the positive power may be applied, may be an upper portion with respect to the front of the drawing and the second damper 1670*b*, to which the negative power may be applied, may be a lower portion with respect to the front of the drawing. For example, the first damper 1670*a* may be connected to a first line 242*a*, and the second damper 1670*b* may be connected to a second line 242*b*. For example, two first dampers 1670*a* may be connected as one body, and may be connected to the first line 242*a*, and two second dampers 1670*b* may be connected as one body, and may be connected to the second line 242*b*. A description of a shape of the damper 1670 may be the same as or similar to the description give above with respect to FIG. 9**A.

With reference to FIG. 9C, in a four-array sound generating device 2020, a damper 1670 may be on a frame 1640. The four-array sound generating device 2020 may be referred to as a "quad type."

A plurality of dampers may be connected to one another in parallel and in series. The damper 1670 may be configured to perform a function of a line, and thus, may include a first damper **1670*a*, to which positive (+) power may be applied and a second damper 1670*b*, to which negative (−) power may be applied. The damper 1670 may be divided with respect to a widthwise direction. For example, the first damper 1670***a*, to which the positive power may be applied, may be an upper portion with respect to the front of the drawing and the second damper 1670*b*, to which the negative power may be applied, may be a lower portion with respect to the front of the drawing. Two first dampers 1670*a* may be connected to a first line 242*a*, and two second dampers 1670*b* may be connected to a second line 242*b*. For example, two first dampers 1670*a* may be connected as one body and may be connected to the first line 242*a*, and two second dampers 1670*b* may be connected as one body and may be connected to the second line 242*b*. A description of a shape of the damper 1670 may be the same as or similar to the description give above with respect to FIG. 9A.

With reference to FIG. 9D, in a six-array sound generating device 2000, a damper 1670 may be on a frame 1640. The six-array sound generating device 2000 may be referred to as a "hexa type."

A plurality of dampers may be connected to one another in parallel and serially. The damper 1670 may be configured to perform a function of a line, and thus, may include a first damper 1670*a*, to which positive (+) power may be applied and a second damper 1670*b*, to which negative (−) power may be applied. The damper 1670 may be divided with respect to a lengthwise direction. For example, in dampers disposed in a left portion and a right portion of the drawing, the first damper 1670*a*, to which the positive power may be applied, may be a left portion with respect to the front of the drawing and the second damper 1670*b*, to which the negative power may be applied, may be a right portion with respect to the front of the drawing. Each of the first dampers 1670*a* may be connected to a first line 242*a*, and each of the second dampers 1670*b* may be connected to a second line 242*b*. For example, two first dampers 1670*a* may be connected as one body and may be connected to the first line 242*a*, and two second dampers 1670*b* may be connected as one body and may be connected to the second line 242*b*. A description of a shape of the damper 1670 may be the same as or similar to the description give above with respect to FIG. 9A.

Therefore, according to an embodiment of the present disclosure, the sound generating device may be disposed without a supporting hole of a supporting member, and thus, a degree of freedom in disposition of the sound generating device may be enhanced.

Figure 10A:
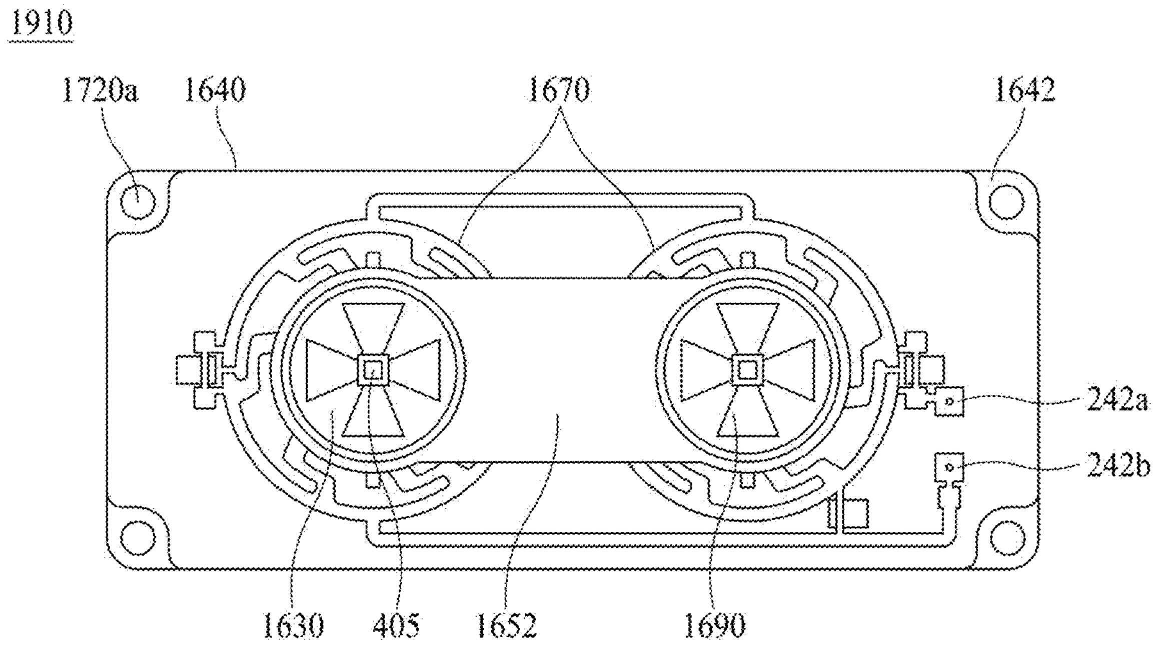
FIGS. 10A and 10B illustrate a display apparatus including a sound generating device according to another embodiment of the present disclosure.
Figure 10B:
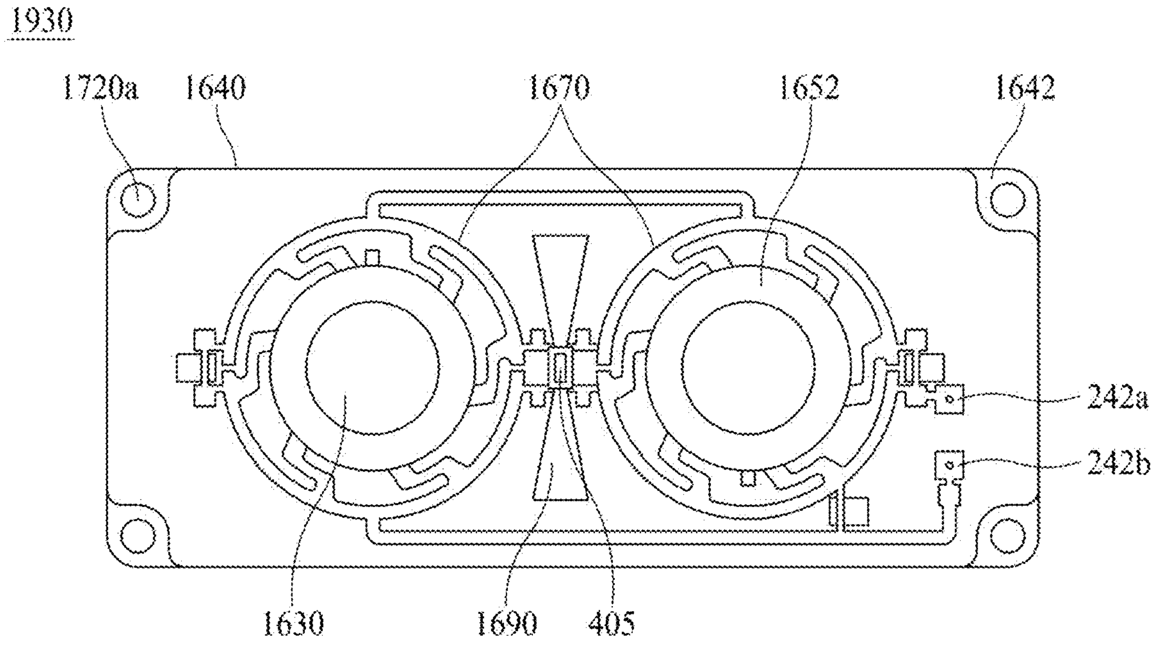

FIGS. 10A and 10B illustrate a display apparatus including a sound generating device according to another embodiment of the present disclosure.

With reference to FIGS. 10A and 10B, the sound generating device 1910 may be configured as a two-device array including two generating devices. For example, the sound generating device 1910 may include a first sound generating device and a second sound generating device adjacent to the first sound generating device. For example, the sound generating device 1910 may include a first sound generating module and a second sound generating module adjacent to the first sound generating module. The sound generating device 1910 may include a center pole 1630, a bobbin ring 1652, a frame 1640, and a damper 1670. The sound generating device 1910 may include a screw hole 1720*a* which is disposed in an extension part 1642 of the frame 1640. A screw may be fastened to the screw hole 1720*a*, and thus, the sound generating device 1910 may be disposed in a display panel 100. The sound generating device 1910 may include two dampers 1670, and the two dampers 1670 may be respectively connected to a first line 242*a* and a second line 242*b*.

With reference to FIG. 10A, a spacer 1690 may be disposed in the center pole 1630 of each of the sound generating devices 1910. For example, the spacer 1690 may be disposed in the bobbin 1650 of each of the sound generating devices 1910. The spacer 1690 may be disposed in or attached to the display panel 100 by a second adhesive member 405. Bobbin rings 1652 of the two sound generating devices 1910 may be configured as one body. Accordingly, a horizontal vibration of a two-array sound generating device may be prevented, and a uniform vibration may be maintained, thereby outputting a uniform sound.

With reference to FIG. 10B, a spacer 1690 may be between the two sound generating devices 1910. For example, the spacer 1690 may be on the frame 1640. The spacer 1690 may be disposed in or attached to the display panel 100 by a second adhesive member 405. A shape of the spacer illustrated in FIGS. 10A and 10B illustrates as an example, but embodiments are not limited thereto.

The present inventors have recognized that a problem occurs in a sound generating device because the damper 1670 is thinly configured. Therefore, the present inventors have performed various experiments for reinforcing stiffness of a sound generating device. The present inventors have implemented a sound generating device having a new structure based on various experiments. This will be described below with reference to FIGS. 11A and 11B.

Figure 11A:
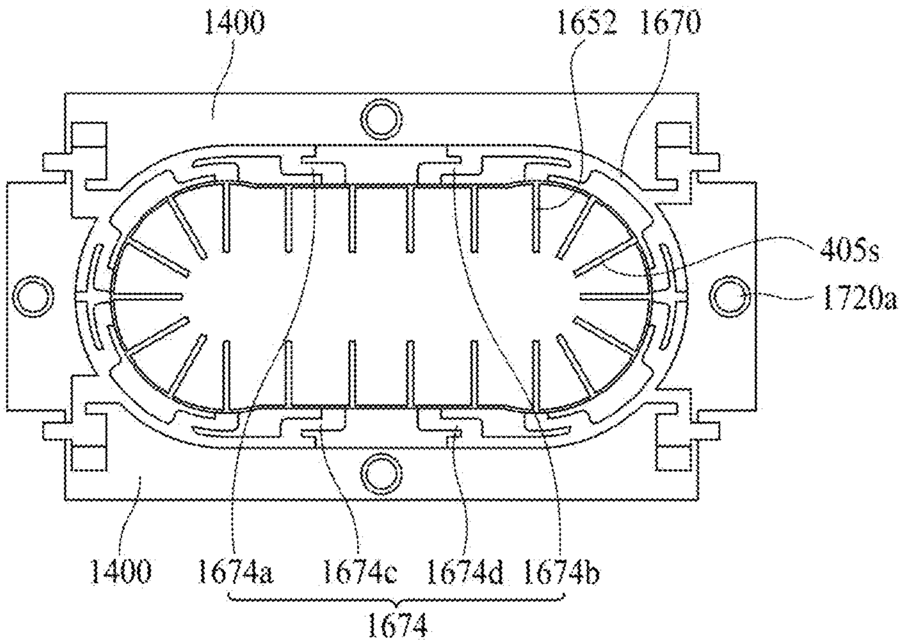
FIGS. 11A and 11B illustrate a sound generating device and a partition according to an embodiment of the present disclosure.
Figure 11B:
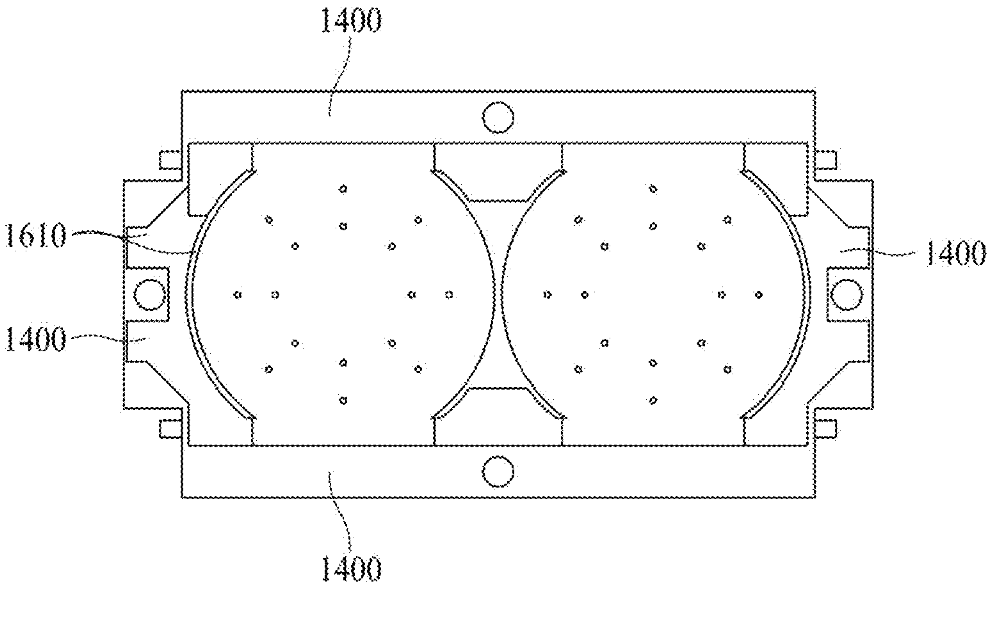

FIGS. 11A and 11B illustrates a sound generating device according to another embodiment of the present disclosure.

FIG. 11A is a diagram seen from above with respect to the sound generating device according to another embodiment of the present disclosure. FIG. 11B is a diagram seen from below with respect to the sound generating device according to another embodiment of the present disclosure. In FIGS. 11A and 11B, a two-device array sound generating device will be described as an example.

With reference to FIG. 11A, one structure may be further provided in one of a peripheral portion and a center portion of a damper 1670. For example, a first structure 1400 may be near the damper 1670. The first structure 1400 may surround the damper 1670. The first structure 1400 may reinforce stiffness of the damper 1670. The first structure 1400 may be formed of aluminum (Al), magnesium (Mg), and/or the like, but embodiments are not limited thereto. In FIG. 11A, a sound generating device configured as a two-device array is illustrated, and when one sound generating device is provided, a first structure may be disposed near a damper. One or more second structures 1674 may be further provided in the center portion of the damper 1670. For example, the second structures 1674 may include a 2-1$^{st}$ structure 1674*a*, a 2-2$^{nd}$ structure 1674*b*, a 2-3$^{rd}$ structure 1674*c*, and a 2-4$^{th}$ structure 1674*d*. The second structures 1674 may reinforce stiffness of the center portion of the damper 1670. In FIG. 11A, a sound generating device provided as a two-device array is illustrated, and when one sound generating device is provided, at least one second structure may be disposed in a center portion of a damper. However, embodiments are not limited thereto, and when a sound generating device is provided as a two or more-device array, a first structure and/or a second structure may be disposed in one of the peripheral portion and the center portion of the damper 1670.

A screw hole 1720*a* may be further in the first structure 1400. A sound generating device may be in a display panel using the screw hole 1720*a*. A slit 405*s* may be further on the damper 1670. The slit 405*s* may be provided for an attachment function of the second adhesive member 405 and may remove an air bubble of the second adhesive member 405.

For example, the slit 405*s* may prevent a high-pitched sound from being degraded by an air bubble in an attachment process of the second adhesive member 405. The shape and number of slits 405*s* do not limit an embodiment. As another example, a slit may be in an adhesive member 402. The slit may prevent a high-pitched sound from being degraded by an air bubble in an attachment process of the adhesive member 402.

With reference to FIG. 11B, a first structure 1400 may be near a yoke 1610. For example, the first structure 1400 may further reinforce stiffness of an injection material of a yoke or a frame. For example, the first structure 1400 may further reinforce stiffness of an injection material of a yoke or a frame along with the first structure 1400 of FIG. 11A. The injection material may be formed based on insert injection, but embodiments are not limited thereto. As another example, an injection material may be fastened based on a screw or a bond, or may be formed of an adhesive. The first structure 1400 may be formed of Al, Mg, and/or the like, but embodiments are not limited thereto.

Figure 12:
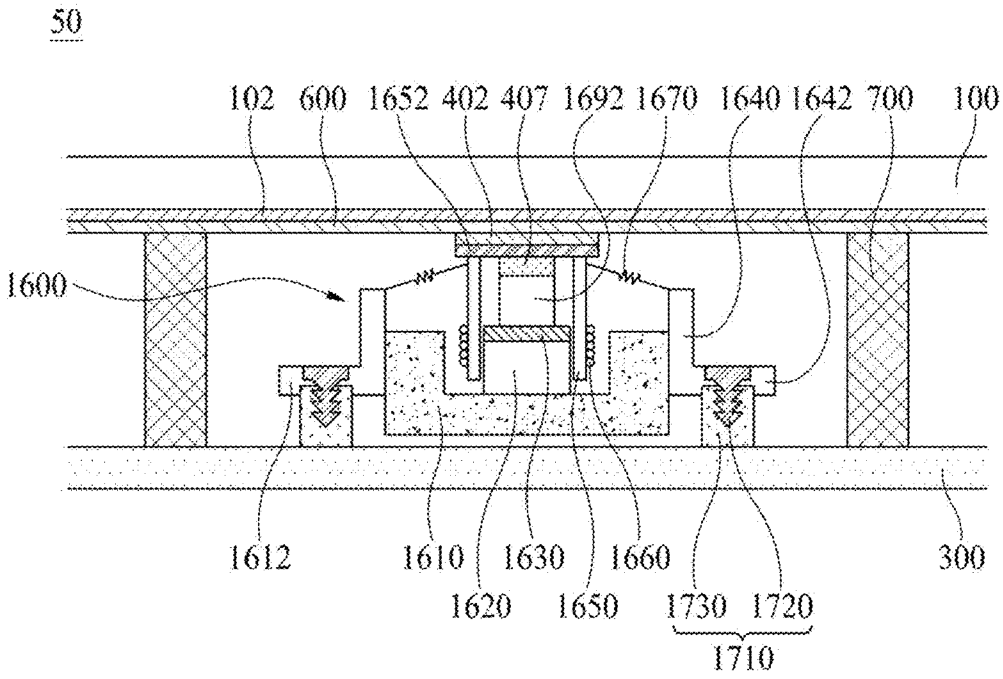
FIG. 12 illustrates a sound generating device and a partition according to an embodiment of the present disclosure.

FIG. 12 illustrates a display apparatus including a sound generating device according to another embodiment of the present disclosure.

In an embodiment of the present disclosure, any of a sound generating device having the first structure and a sound generating device having the second structure may be applied. Hereinafter, the second structure will be described as an example.

With reference to FIG. 12, the display apparatus 50 according to another embodiment of the present disclosure may include a display panel 100 and a sound generating device 1600. The sound generating device 1600 may be between the display panel 100 and a supporting member 300. The sound generating device 1600 may be in the display panel 100. A description of the sound generating device 1600 may be substantially similar to descriptions given above with reference to FIGS. 2A, 2B, 6, and 7, and thus, may be omitted. The display apparatus 50 of FIG. 12, for example, will be described with reference to FIG. 7 and may be similarly applied to the display apparatus of FIG. 6.

The sound generating device 1600 may include a magnet 1620 on a yoke 1610, a center pole 1630 on the magnet 1620, a bobbin 1650 near the magnet 1620 and the center pole 1630, and a coil 1660 wound around an outer portion of the bobbin 1650. A frame 1640 may be outside the yoke 1610. Also, a damper 1670 may be between the frame 1640 and the bobbin 1650. A bobbin ring 1652 may be further on the bobbin 1650. In FIG. 12, an example where the bobbin ring 1652 is disposed all over the bobbin 1650 will be described. However, embodiments are not limited, and the bobbin ring 1652 may be disposed at a position at which the bobbin 1650 is located.

An encapsulation substrate 102 may be on a rear surface of the display panel 100. A spacer 1692 may be further provided between the display panel 100 and the center pole 1630 of the sound generating device 1600, for decreasing the loss of a magnetic force of the magnet 1620 caused by the encapsulation substrate 102. For example, the spacer 1692 may maintain an interval or distance between the encapsulation substrate 102 and the magnet 1630 of the sound generating device 1600. For example, the spacer 1690 may be inside the bobbin 1650. For example, the spacer 1692 may be between the center pole 1630 and the encapsulation substrate 102. For example, the spacer 1692 may be between the center pole 1630 and the heat dissipation member 600. As another example, the spacer 1692 may be on the frame 1640. For example, as described above with reference to FIGS. 10A and 10B, the sound generating device 1600 may be configured with two sound generating modules. For example, the spacer 1692 may be on the center pole 1630 of each of the sound generating device 1600. For example, the spacer 1692 may be in the bobbin 1650 of each of the sound generating device 1600. As another example, the spacer 1692 may be between two sound generating devices 1600. For example, the spacer 1692 may be on the frame 1640.

A second adhesive member 407 may be between the spacer 1692 and the bobbin 1650 or the bobbin ring 1652. The spacer 1692 may be attached to the sound generating device 1600 by the second adhesive member 407. For example, the spacer 1692 may be attached to the bobbin ring 1652 by the second adhesive member 407. The second adhesive member 407 may include a double-sided tape, a single-sided tape, an adhesive, a bond, and/or the like, but embodiments are not limited thereto. For example, the spacer 1692 may be formed of a foam pad or an injection material, but embodiments are not limited thereto. For example, the foam pad or the injection material may include polyurethane, polyolefin, and polyethylene, but embodiments are not limited thereto. Therefore, the spacer 1692 may maintain an interval or distance between the encapsulation substrate 102 and the sound generating device 1600, thereby solving a problem where the encapsulation substrate 102 is attracted by the magnetic force of the magnet 1620, and due to this, the display panel 100 is attracted. Therefore, an embodiment of the present disclosure may decrease a problem where the sound generating device may be unable to vertically vibrate because the encapsulation substrate may be attracted by the magnetic force of the magnet and thus the sound generating device may be pressed. Also, an embodiment of the present disclosure may decrease a problem where a space enabling the sound generating device to vibrate is lost because the encapsulation substrate is attracted by the magnetic force of the magnet and is adhered to the sound generating device.

A heat dissipation member 600 may be further on the rear surface of a display panel 100, for decreasing heat occurring when a sound generating device 1600 is vibrating. For example, the heat dissipation member 600 may be on the rear surface of the display panel 100 using an adhesive member. The heat dissipation member 600 may be configured to cover the sound generating device 1600 or to have a size that is greater than that of the sound generating device 1600 and may have a polygonal plate shape or a circular plate shape having a certain thickness, but embodiments are not limited thereto. For example, the heat dissipation member 600 may be a heat dissipation sheet or a heat dissipation tape formed of a metal material that has high thermal conductivity like aluminum (Al), copper (Cu), or silver (Ag) and an alloy thereof, but embodiments are not limited thereto. Accordingly, because the heat dissipation member 600 is provided, an influence of heat occurring when the sound generating device is vibrating may be reduced on the image quality of the display panel 100.

Figure 13:
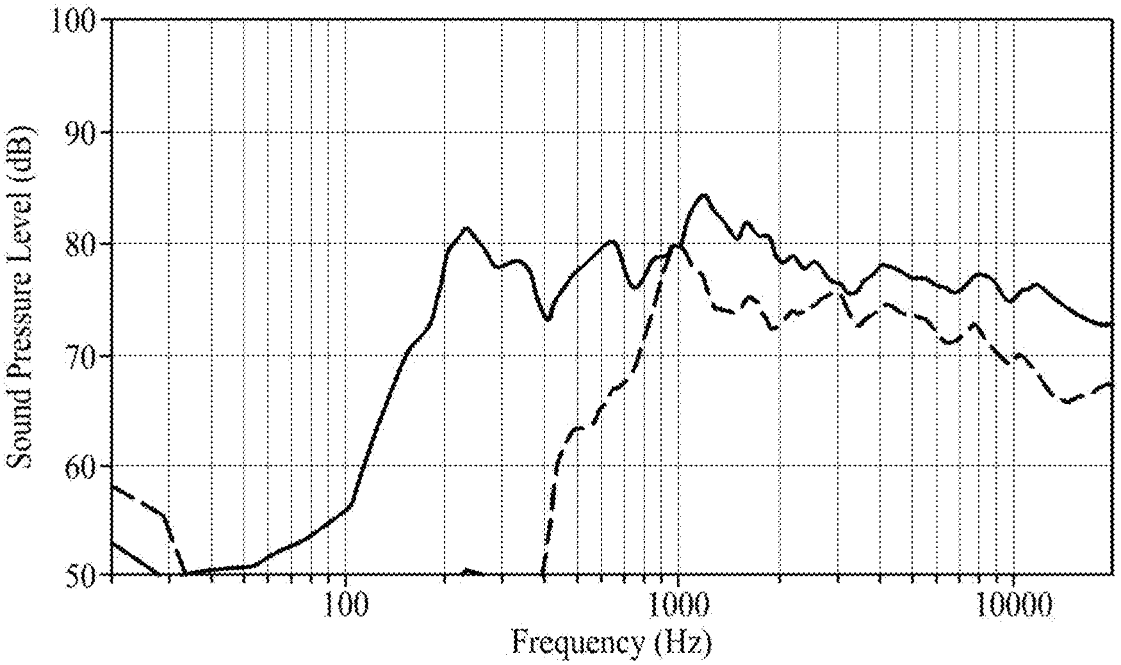
FIG. 13 illustrates a sound generating device and a partition according to an embodiment of the present disclosure.

FIG. 13 illustrates a sound output characteristic of a sound generating device according to an embodiment of the present disclosure.

The sound output characteristic may be measured by a sound analysis apparatus. The sound analysis apparatus may include a sound card that transmits or receives a sound to or from a control personal computer (PC), an amplifier that amplifies a signal generated from the sound card and transfers the amplified signal to the sound generating device, and a microphone that collects a sound generated by the sound generating device in a display panel. The sound collected through the microphone may be input to the control PC through the sound card, and a control program may check the input sound to analyze the sounds of the sound generating device.

In FIG. 13, a dotted line shows a sound output characteristic of the sound generating device of FIG. 7, and a solid line shows a sound output characteristic of the sound generating device of FIG. 10A. The sound generating device may be provided as a two-device array. The abscissa axis (x-axis) represents a frequency in hertz (Hz), and the ordinate axis (y-axis) represents a sound pressure level (SPL) in decibel (dB).

With reference to FIG. 13, in comparison with the sound generating device of FIG. 7, it may be seen that a sound generating device to which FIG. 10A is applied outputs a sound in about 200 Hz or less. Therefore, it may be seen that an interval or distance between an encapsulation substrate and a sound generating device is maintained by a spacer, and thus, a space enabling the sound generating device to vertically vibrate is provided, whereby a sound may be output. A sound output characteristic of a sound generating device to which FIGS. 10B and 12 are applied may be identical or similar thereto.

FIGS. 14A to 14D illustrate a sound generating device and a partition according to an embodiment of the present disclosure.

With reference to FIGS. 14A to 14D, a display panel 100 may include a first region L, a second region R, and a third region C. The first region L may be a left region of a rear surface of the display panel 100, the second region R may be a right region of the rear surface of the display panel 100, and the third region C may be a center region of the rear surface of the display panel 100. Also, one or more sound generating devices may be in at least one of the first region L, the second region R, and the third region C. The one or more sound generating devices may include one or more of a circular sound generating device, an oval sound generating device, a pair of sound generating devices, and a two or more-device array sound generating device. The oval sound generating device may have an elliptical shape, a rectangular shape with rounded corners, or non-circular curved shape having a width different from its height, but embodiments are not limited thereto. The one or more sound generating devices may vibrate the display panel 100 to generate sound. For example, the one or more sound generating devices may directly vibrate the display panel 100 to generate sound.

Figure 14A:
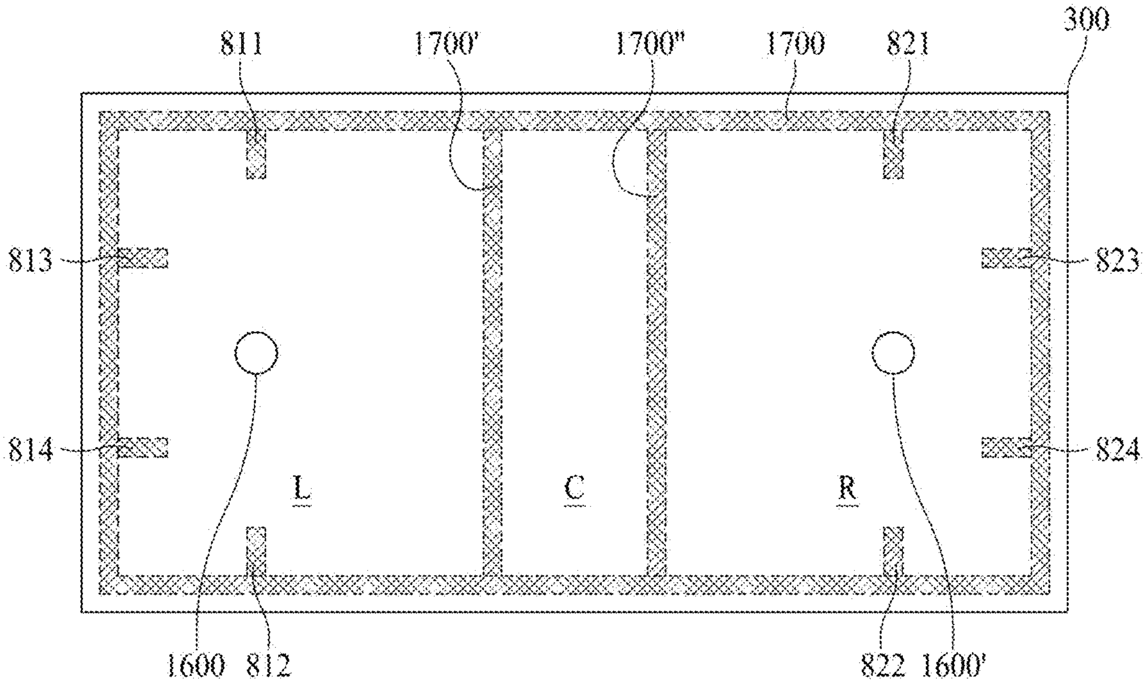
FIGS. 14A to 14D illustrate a sound generating device and a partition according to an embodiment of the present disclosure.
Figure 14B:
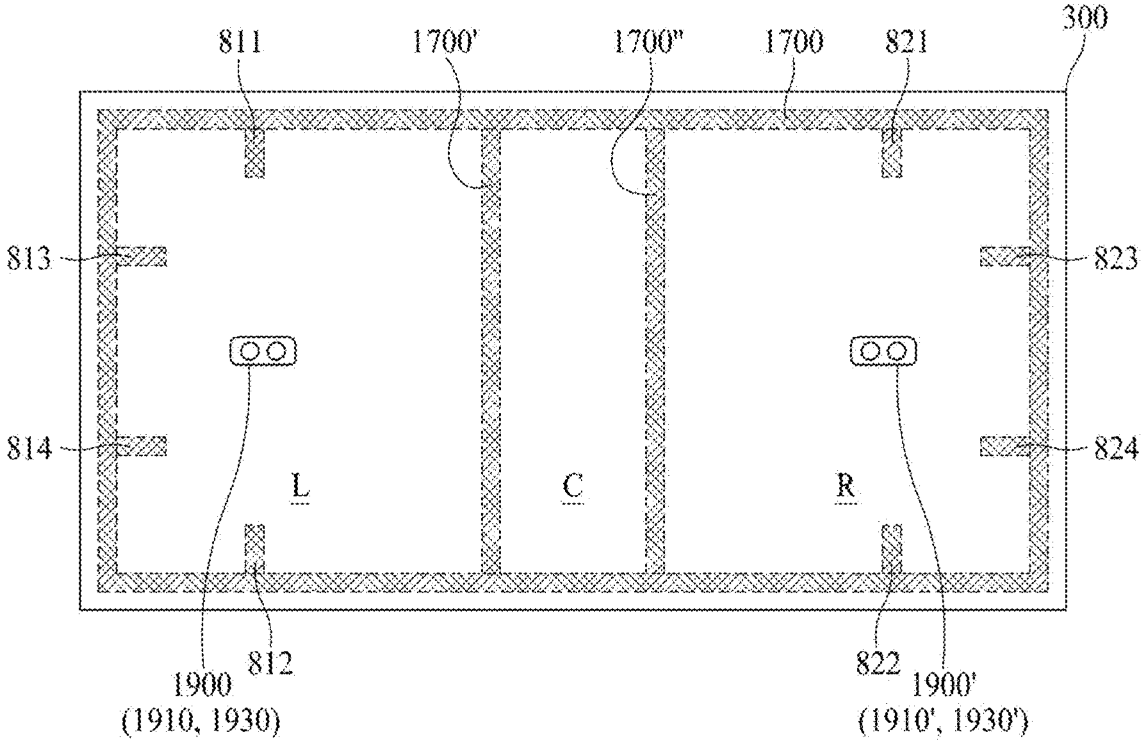
Figure 14C:
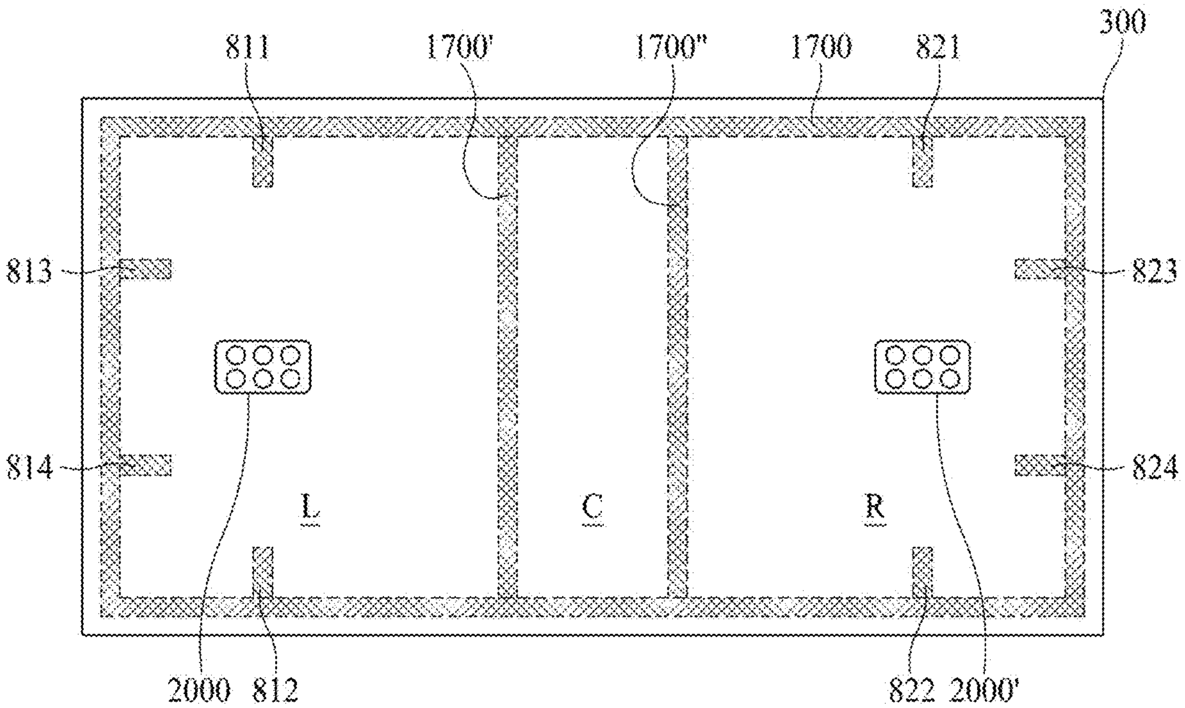
Figure 14D:
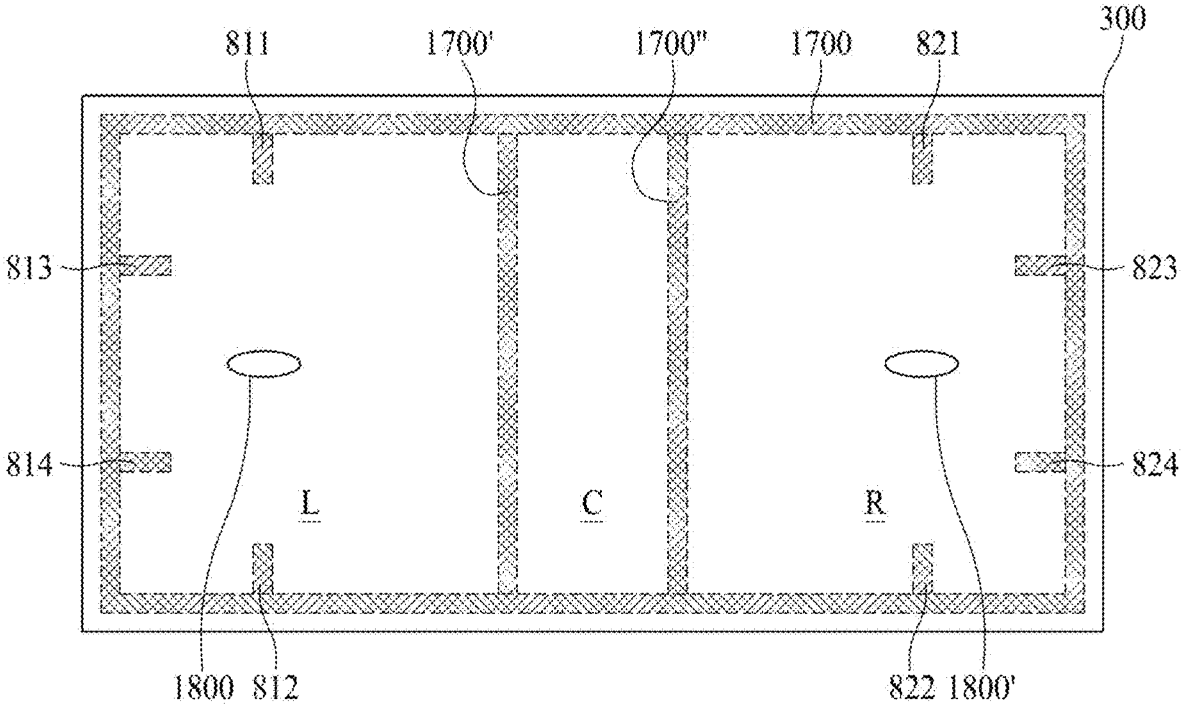

In FIG. 14A, a first sound generating device 1600 and a second sound generating device 1600' may be configured as a circular sound generating device or sound generating module described above with reference to FIGS. 8 and 9A. As another example, the first sound generating device 1600 and a second sound generating device 1600' may be configured as the sound generating device or the sound generating module described above with reference to FIGS. 9A and 12. In FIG. 14B, a first sound generating device 1900 (1910 and 1930) and a second sound generating device 1900' (1910' and 1930') may be configured as the sound generating device or the sound generating module described above with reference to FIGS. 8, 9B, 10A, and 10B. As another example, the first sound generating device 1900 (1910 and 1930) and the second sound generating device 1900' (1910' and 1930') may be configured as the sound generating device or the sound generating module described above with reference to FIGS. 9B, 10A, 10B, and 12. For example, the first sound generating device 1900 and the second sound generating device 1900' may be configured with two sound generating devices or sound generating modules. The first sound generating device 1900 (1910 and 1930) and the second sound generating device 1900' (1910' and 1930') may output sounds of different middle-high-pitched sound bands in the first region L and the second region R. For example, the first sound generating device 1900 and the second sound generating device 1900' may output a sound of a range of about 300 Hz to about 20 kHz, but a range is not limited thereto. In FIG. 14C, a first sound generating device 2000 and a second sound generating device 2000' may be configured as the sound generating device or the sound generating module described above with reference to FIGS. 8 and 9D. As another example, the first sound generating device 2000 and the second sound generating device 2000' may be configured as the sound generating device or the sound generating module described above with reference to FIGS. 9D and 12. For example, the first sound generating device 2000 and the second sound generating device 2000' may be configured with six sound generating devices or sound generating modules. The first sound generating device 2000 and the second sound generating device 2000' may output sounds of different middle-high-pitched sound bands in the first region L and the second region R. For example, the first sound generating device 2000 and the second sound generating device 2000' may output a sound of a range of about 300 Hz to about 20 kHz, but a range is not limited thereto. In FIG. 14D, a first sound generating device 1800 and a second sound generating device 1800' may be applied as an oval sound generating device or sound generating module, instead of a circular sound generating device described above with reference to FIG. 9A. As another example, the first sound generating device 1800 and the second sound generating device 1800' may be as the sound generating device or the sound generating module described above with reference to FIGS. 9A and 12.

With reference to FIG. 14A, the first sound generating device 1600 may be in the first region L, and the second sound generating device 1600' may be in the second region R. For example, the first sound generating device 1600 may be in the first region L of the rear surface of the display panel 100, and the second sound generating device 1600' may be in the second region R of the rear surface of the display panel 100. Also, as described above with reference to FIGS. 8 and 12, the first sound generating device 1600 and the second sound generating device 1600' may be in the display panel 100.

Therefore, the first sound generating device 1600 may be in the first region L, which is the left region of the rear surface of the display panel 100 and may vibrate the first region L of the display panel 100, and the second sound generating device 1600' may be in the second region R, which is the right region of the rear surface of the display panel 100 and may vibrate the second region R of the display panel 100. The first sound generating device 1600 and the second sound generating device 1600' may receive different vibration signals and may be independently driven. For example, the first sound generating device 1600 may generate a sound using the first region L of the display panel 100 as a vibration plate, and the second sound generating device 1600' may generate a sound using the second region R of the display panel 100 as a vibration plate. Such descriptions may be applied to FIGS. 14B to 21D similarly or identically. Also, descriptions given above with reference to FIGS. 8 and 12 may be applied identically or similarly.

A partition and a pad will be described below with reference to FIG. 14A for example, and such descriptions may be applied to FIGS. 14B to 14D similarly or identically.

With reference to FIGS. 14A to 14D, a first partition 1700 may be between a display panel and a supporting member 300. The first partition 1700 may be between a rear surface of the display panel and an upper surface of the supporting member 300. For example, the first partition 1700 may be at the supporting member 300. The first partition 1700 may be at an edge or periphery of the supporting member 300 or an edge or periphery of an upper surface of the supporting member 300. For example, the first partition 1700 may be at an edge or periphery of the display panel. The first partition 1700 may be at an edge or periphery of the rear surface of the display panel. Also, the first partition 1700 may be a whole region of the rear surface of the display panel or the supporting member 300. The first partition 1700 may be a whole region of four outer sides of the supporting member 300 or the whole region of the rear surface of the display panel. The first partition 1700 may be provided in a sealed structure, or may be provided in an unsealed structure.

The first partition 1700 may be an air gap or a space where a sound is generated when the display panel 100 vibrates by a sound generating device. An air gap or a space which generates or transfers a sound may be referred to as a "partition." The first partition 1700 may be referred to as an "enclosure" or a "baffle," but the term is not limited thereto.

With reference to FIG. 14A, at least two partitions, for example, a second partition 1700' and a third partition 1700", may be between the first sound generating device 1600 and the second sound generating device 1600'. It may be considered that one of the second partition 1700' and the third partition 1700" is configured with two or more sub-partitions between the first sound generating device 1600 and the second sound generating device 1600'. For example, the second partition 1700' may be between the first region L and the third region C, and the third partition 1700" may be between the second region R and the third region C.

The first partition 1700 may surround the first region L, the second region R, and the third region C. The first partition 1700, the second partition 1700', and the third partition 1700" may be at the rear surface of the display panel 100. The first partition 1700, the second partition 1700', and the third partition 1700" may be at the upper surface of the supporting member 300. Also, the first partition 1700, the second partition 1700', and the third partition 1700" may be between the display panel 100 and the supporting member 300. For example, the first partition 1700, the second partition 1700', and the third partition 1700" may be between the rear surface of the display panel 100 and the upper surface of the supporting member 300.

The second partition 1700' and the third partition 1700" may be an air gap or a space where a sound is generated when the display panel 100 vibrates by the first sound generating device 1600 and the second sound generating device 1600'. An air gap or a space which generates or transfers a sound may be referred to as a "partition." The second partition 1700' and the third partition 1700" may be referred to as an "enclosure" or a "baffle," but the term is not limited thereto. The second partition 1700' and the third partition 1700" may separate a left sound and a right sound respectively generated by the first sound generating device 1600 and the second sound generating device 1600'. Also, a vibration of the display panel 100 performed in a space or an air gap defined as the partition 700 may be attenuated or absorbed by a center of the display panel 100, and thus, a sound generated in the first region L may be prevented from being transferred to a space of the second region R. Therefore, the first sound generating device 1600 and the second sound generating device 1600' may output sounds of different middle-high-pitched sound bands and may output a stereo sound by separating left and right sounds, thereby providing a display apparatus having a two-channel sound output characteristic. Therefore, a partition may be in a center region of the display panel 100, thereby decreasing an influence of a sound characteristic caused by a resonance frequency difference of a middle-high-pitched sound in the left region and the right region of the display panel 100. Here, a middle-pitched sound band may be 200 Hz to 3 kHz, a high-pitched sound band may be 3 kHz or higher, and a low-pitched sound band may be 200 Hz or lower. However, embodiments are not limited thereto.

The first sound generating device 1600 may be in the first region L which is the left region, the second sound generating device 1600' may be in the second region R which is the right region, and a sound generating device may not be provided in a third region C which is a center region. Accordingly, the degradation in sound quality caused by interference in the first region L and the second region R may be reduced. Also, a sound characteristic of the low, middle, and high-pitched sound bands may be further enhanced.

An area of the first region L and an area of the second region R may be adjusted to be greater than that of the third region C. Because the area of the first region L and the area of the second region R increases, a sound of the low-pitched sound band may be enhanced, and the third region C may decrease the degradation in sound quality caused by interference in the first region L and the second region R. Accordingly, the quality of sounds of the low, middle, and high-pitched sound bands may be enhanced.

In FIGS. 14A to 21D, the first partition 1700 may be the adhesive member described above with reference to FIG. 1. Also, the adhesive member for attaching the supporting member to the display panel may be further provided between the display panel and the supporting member described above with reference to FIG. 1. For example, the adhesive member may be further in an edge or periphery of the display panel or an edge or periphery of the supporting member.

FIGS. 14A to 15D illustrate an example where the sound generating device is in a side of the left region or in a side of the right region without being in a center of the left region (the first region L) or the right region (the second region R) of the display panel 100, but embodiments are not limited thereto. For example, the sound generating device may be disposed in the center of the left region (the first region L) or the right region (the second region R) of the display panel 100. Alternatively, the sound generating device may be asymmetrically in the first region L and the second region R of the display panel 100. A stereo sound characteristic may be further enhanced in a case, where the sound generating device is disposed in a side of the left region or a side of the right region, than a case where the sound generating device is disposed in the center of the left region (the first region L) or the right region (the second region R) of the display panel 100.

To implement a display apparatus having a thin thickness, a thickness of the glass substrate may be thin. Because the thickness of the substrate is thinned, and when the partition is provided on the rear surface of the display panel 100 or an upper surface of a supporting member, a problem where the display panel 100 may be not flat and a step height may be formed in the display panel 100 may occur due to the partition when the supporting member is attached to the display panel 100. For example, a problem in which the display panel 100 may be not flat and a screen may be unevenly seen may occur due to a shape of the bent part bouncing on a screen of the display panel 100 or a separated portion of the bent part, for example, a portion in which the two rectilinear portions contact each other. Such a phenomenon may be referred to as an uneven phenomenon or a wave phenomenon of the display panel 100, and the term is not limited thereto. Therefore, the present inventors have performed various experiments on a shape of a pad and a shape of another partition. Through the various experiments, the present inventors have recognized that the first partition 1700 should be disposed based on a shape of the display panel 100. For example, the first partition 1700 may have a tetragonal (e.g., quadrilateral) shape, but embodiments are not limited thereto. In other embodiments, a shape of the first partition 1700 may be modified based on a shape of the display panel 100. If the display panel 100 is a curved display panel having a curve shape or the like, the first partition 1700 may have a curved shape or a curve shape. Accordingly, the first partition 1700 may be disposed along a shape of the display panel 100, and thus, a degree to which the display panel 100 is pulled is reduced in a process of attaching the supporting member to the display panel 100, thereby preventing the wave phenomenon.

A sound wave, which may be generated when a display panel vibrates by a sound generating device may be spread radially from a center of the sound generating device, and may travel. The sound wave may be referred to as a "progressive wave." The progressive wave may be reflected by one side of a partition to generate a reflected wave, and the reflected wave may travel in a direction opposite to the progressive wave. The reflected wave may overlap and interfere with the progressive wave, and may not travel, thereby generating a standing wave that may stand at a certain position. A sound pressure may be reduced by the standing wave, and thus, a sound output characteristic may be reduced.

However, if the first partition 1700 is provided, it is unable to control the peak and the dip caused by the standing wave, and thus, the present inventors have recognized that the first partition 1700 should have a structure for controlling the peak and the dip caused by the standing wave. The peak may be a phenomenon where a sound pressure bounces in a specific frequency, and the dip may be a phenomenon where generating of a specific frequency is suppressed, and thus, a low sound pressure is generated. A sound output characteristic of the display apparatus is reduced by the peak or the dip. The structure is not implemented through a simple procedure but has been implemented through various experiments. Therefore, a pad may be in the first partition 1700 to decrease a peak and dipping which are caused by a standing wave occurring in a lengthwise direction of the first and second sound generating devices 1600 and 1600'. Therefore, the degree of reduction in sound pressure caused by the standing wave generated by interference between the reflected wave and the progressive wave may be reduced. Also, the standing wave which causes the sound pressure to be reduced is much generated at a position at which a level of the progressive wave and the reflected wave is high. Accordingly, the bent part may be disposed at a position at which a level of a sound wave transferred from the vibration generating device is highest. For example, the pad may be provided on one or more sides of the first partition 1700. The pad may be provided on one or more sides, which a strongest sound wave reaches, of four sides of the first partition 1700 and may be configured to face the first and second sound generating devices 1600 and 1600'.

A shape of a pad may be implemented to prevent the wave phenomenon from occurring when the display panel 100 is pulled in a process of attaching a pad, disposed on the supporting member, to the display panel 100. Alternatively, a shape of the pad may be implemented to prevent the wave phenomenon from occurring when the display panel 100 is pulled in a process of attaching the pad, disposed on the display panel 100, to the supporting member. For example, a shape of the pad should be implemented to prevent the wave phenomenon and to enable the peak and the dip caused by the standing wave to be easily controlled. The pad has been implemented in a tetragonal shape (e.g., quadrilateral) or a corner-rounded tetragonal (e.g., quadrilateral) shape through various experiments.

With reference to FIG. 14A, at least one pad may be provided on at least one side of the first partition 1700, for decreasing the peak and the dipping caused by the standing wave. For example, the first partition 1700 may include a first side and a second side vertical to the first side, and at least one first pad 811 and at least one seventh pad 821 may be provided on the first side. The at least one first pad 811 may be in the first region L, and the at least one seventh pad 821 may be in the second region R. The first pad 811 and the seventh pad 821 may be provided as one or as a plurality. The first side may be a widthwise direction of the display panel 100 or the supporting member 300, and the second side may be a lengthwise direction of the display panel 100 or the supporting member 300. The widthwise direction and the lengthwise direction may be interchangeable.

At least one second pad 812 may be disposed to face the at least one first pad 811. For example, the at least one second pad 812 may be on a side facing the at least one first pad 811. The at least one second pad 812 may be in the first region L. The at least one second pad 812 may be provided as one or as a plurality.

At least one eighth pad 822 may be disposed to face the at least one seventh pad 821. For example, the at least one eighth pad 822 may be in a side facing the at least one seventh pad 821. The at least one eighth pad 822 may be in the second region R. The at least one eighth pad 822 may be provided as one or as a plurality.

The second pad 812 and the eighth pad 822 may be further provided on a side facing the first side of the first partition 1700. The second pad 812 may be on a side facing the first side of the first partition 1700 in the first region L, and the eighth pad 822 may be on a side facing the first side of the first partition 1700 in the second region R. The second pad 812 may be provided to face the first pad 811. The eighth pad 822 may be provided to face the seventh pad 821. The second pad 812 and the eighth pad 822 may be provided as one or as a plurality.

The at least one first pad 811 and the at least one second pad 812 may face the first sound generating device 1600. The at least one seventh pad 821 and the at least one eighth pad 822 may face the second sound generating device 1600'. For example, the first pad 811 and the second pad 812 may be in the first region L to face the first sound generating device 1600, and the seventh pad 821 and the eighth pad 822 may be in the second region R to face the second sound generating device 1600'. Therefore, the pads 811, 812, 821, and 822 may decrease the peak or the dipping caused by the standing wave which occurs in a lengthwise direction of the first sound generating device 1600 and the second sound generating device 1600' and may allow a vibration to laterally transferred, thereby enhancing a sound output characteristic.

At least one third pad 813, at least one fourth pad 814, at least one ninth pad 823, and at least one tenth pad 824 may be further in the second side of the first partition 1700. As another example, one of the at least one third pad 813 and the at least one fourth pad 814 may be provided. As another example, one of the at least one ninth pad 823 and the at least one tenth pad 824 may be provided. The third pad 813, the fourth pad 814, the ninth pad 823, and the tenth pad 824 may be provided as one or as a plurality in one or more sides of the first partition 1700. The third pad 813, the fourth pad 814, the ninth pad 823, and the tenth pad 824 may be in at least one of a first region L and a second region R. For example, the third pad 813 and the fourth pad 814 may be in the first region L, and the ninth pad 823 and the tenth pad 824 may be in the second region R. For example, the third pad 813 and the fourth pad 814 may be disposed to be symmetrical with respect to the first sound generating device 1600, and the ninth pad 823 and the tenth pad 824 may be disposed to be symmetrical with respect to the second sound generating device 1600'.

A shape of the first to fourth pads 811 to 814 and a shape of the seventh to tenth pads 821 to 824 may be a tetragonal (e.g., quadrilateral) shape or an end-rounded tetragonal (e.g., quadrilateral) shape, but embodiments are not limited thereto and may be provided as various shapes such as a circular shape.

The first partition 1700 may be formed of a double-sided tape, a double-sided foam pad, a single-sided tape, a single-sided foam pad, an adhesive, or a bond, but embodiments are not limited thereto. When the first partition 1700 is formed of the double-sided tape or the double-sided foam pad, an adhesive force may be enhanced in a process of attaching the upper surface of the supporting member to the rear surface of the display panel 100. Also, the first partition 1700 may be formed of a material having an elastic force which enables compression to be made to a certain degree, and for example, may be formed of polyurethane, polyolefin, polyethylene, and/or the like, but embodiments are not limited thereto.

The second partition 1700' and the third partition 1700" may be formed of the same material as that of the first partition 1700. For example, the second partition 1700' and the third partition 1700" may be formed of one of a double-sided tape, a double-sided foam pad, a single-sided tape, a single-sided foam pad, an adhesive, and a bond, but embodiments are not limited thereto.

The at least one first pad 811 or the at least one second pad 812 may be formed of the same material as that of the first partition 1700. The at least one third pad 813 or the at least one fourth pad 814 may be formed of the same material as that of the first partition 1700. The at least one seventh pad 821 or the at least one eighth pad 822 may be formed of the same material as that of the first partition 1700. The at least one ninth pad 823 or the at least one tenth pad 824 may be formed of the same material as that of the first partition 1700. For example, the pads may be formed of a double-sided tape, a double-sided foam pad, a single-sided tape, a single-sided foam pad, an adhesive, or a bond, but embodiments are not limited thereto.

The first to fourth pads 811 to 814 and the seventh to tenth pads 821 to 824 may be formed of the same material as that of the first partition 1700. The first to fourth pads 811 to 814 and the seventh to tenth pads 821 to 824 may be formed of the same material as that of the second partition 1700' or the third partition 1700". For example, the first to fourth pads 811 to 814 and the seventh to tenth pads 821 to 824 may be formed of a double-sided tape, a double-sided foam pad, a single-sided tape, a single-sided foam pad, an adhesive, or a bond, but embodiments are not limited thereto.

As another example, the at least one first pad 811 may be formed of the same material as that of the first partition 1700. The first partition 1700 may be formed of a double-sided tape. In comparison with a single-sided tape, when the first partition 1700 is formed of the double-sided tape, the wave phenomenon is not reduced, but an adhesive force between the display panel and the supporting member is enhanced and sound quality is enhanced. The at least one first pad 811 may be formed of a material differing from that of at least one of the first partition 1700, the second partition 1700', and the third partition 1700". The at least one first pad 811 or the at least one second pad 812 may be formed of a material differing from that of the first partition 1700. The at least one first pad 811 or the at least one second pad 812 may be formed of a material differing from that of at least one of the first partition 1700, the second partition 1700', and the third partition 1700". The at least one second pad 812 may be formed of the same material as that of the at least one first pad 811. The at least one third pad 813 or the at least one fourth pad 814 may be formed of a material differing from that of the first partition 1700. The at least one third pad 813 or the at least one fourth pad 814 may be formed of a material differing from that of at least one of the first partition 1700, the second partition 1700', and the third partition 1700". The at least one third pad 813 or the at least one fourth pad 814 may be formed of the same material as that of the at least one first pad 811.

The at least one seventh pad 821 or the at least one eighth pad 822 may be formed of a material differing from that of the first partition 1700. The at least one seventh pad 821 or the at least one eighth pad 822 may be formed of a material differing from that of at least one of the first partition 1700, the second partition 1700', and the third partition 1700". The at least one seventh pad 821 or the at least one eighth pad 822 may be formed of the same material as that of the at least one first pad 811. The at least one eighth pad 822 may be formed of the same material as that of the at least one seventh pad 821.

The at least one ninth pad 823 or the at least one tenth pad 824 may be formed of a material differing from that of the first partition 1700. The at least one ninth pad 823 or the at least one tenth pad 824 may be formed of a material differing from that of at least one of the first partition 1700, the second partition 1700', and the third partition 1700". The at least one ninth pad 823 or the at least one tenth pad 824 may be formed of the same material as that of the at least one first pad 811. The at least one ninth pad 823 or the at least one tenth pad 824 may be formed of the same material as that of the at least one seventh pad 821.

The first to fourth pads 811 to 814 and the seventh to tenth pads 821 to 824 may be formed of a material differing from that of the first partition 1700. The first to fourth pads 811 to 814 and the seventh to tenth pads 821 to 824 may be formed of a material differing from that of the second partition 1700' or the third partition 1700". For example, the first to fourth pads 811 to 814 and the seventh to tenth pads 821 to 824 may be formed of a single-sided tape. The single-sided tape may include a foam material which absorbs an impact when contacting the display panel 100. When the single-sided tape does not include the foam material, an undesired abnormal sound may occur due to contacting the display panel 100. For example, the single-sided tape may be formed of polyurethane, polyolefin, polyethylene, and/or the like, but embodiments are not limited thereto. When the first partition 1700, the first to fourth pads 811 to 814, and the seventh to tenth pads 821 to 824 are formed of different materials, the materials may be the same materials having different adhesive forces. Alternatively, the materials may differ and may have different adhesive forces, but embodiments are not limited thereto. In this case, a degree to which the display panel 100 is pulled may be reduced in a process of attaching the display panel 100 and the supporting member 300 to the first to fourth pads 811 to 814 and the seventh to tenth pads 821 to 824 in the first partition 1700, thereby preventing the wave phenomenon.

Therefore, because a partition is configured based on a shape of a display panel and one or more pads are provided on at least one side of the partition, the wave phenomenon may decrease, and the peak or the dip caused by the standing wave may be reduced, thereby enhancing a sound output characteristic. Also, a first sound generating device and a second sound generating device may output a sound of the middle-pitched sound band and a sound of the high-pitched sound band and may output a stereo sound by separating the left and right sounds, thereby providing a display apparatus having a two-channel sound output characteristic.

FIGS. 15A to 15D illustrate a sound generating device and a partition according to an embodiment of the present disclosure.

In FIGS. 15A to 15D, the substantially same descriptions as descriptions given above with reference to FIGS. 14A to 14D may be omitted or may be briefly given below. For example, descriptions of a sound generating device, a partition, and a pad may be omitted or may be briefly given below. A partition and a pad will be described below with reference to FIG. 15A, and their descriptions may be similarly applied to FIGS. 15B to 15D.

In describing the sound generating device, the partition, and the pad with reference to FIGS. 15A to 21D, the same descriptions as descriptions given above with reference to FIGS. 14A to 14D may be omitted or may be briefly given. In FIGS. 15A to 21D, one sound generating device, a two-device array sound generating device, and a six-device array sound generating device will be described below as an example of a sound generating device, but the four-device array sound generating device of FIG. 9C may also be applied.

With reference to FIGS. 15A to 15D, a pad may be in at least one side of a first partition 1700 to decrease a peak and dipping which are caused by a standing wave occurring in a lengthwise direction of the first and second sound generating devices. For example, the first partition 1700 may include a first side and a second side vertical to the first side, and a first pad 811 and a seventh pad 821 may be in the first side. A second pad 812 and an eighth pad 822 may be further on a side facing the first side of the first partition 1700. A third pad 813, a fourth pad 814, a ninth pad 823, and a tenth pad 824 may be in the second side of the first partition 1700. As another example, one of the at least one third pad 813 and the at least one fourth pad 814 may be provided. As another example, one of the at least one ninth pad 823 and the at least one tenth pad 824 may be provided. The third pad 813, the fourth pad 814, the ninth pad 823, and the tenth pad 824 may be provided as one or as a plurality in one or more sides of the first partition 1700. Descriptions of the first to fourth pads 811 to 814 and the seventh to tenth pads 821 to 824 are substantially similar to descriptions given above with reference to FIGS. 14A to 14D, and thus, may be omitted but may be simply given below.

Figure 15A:
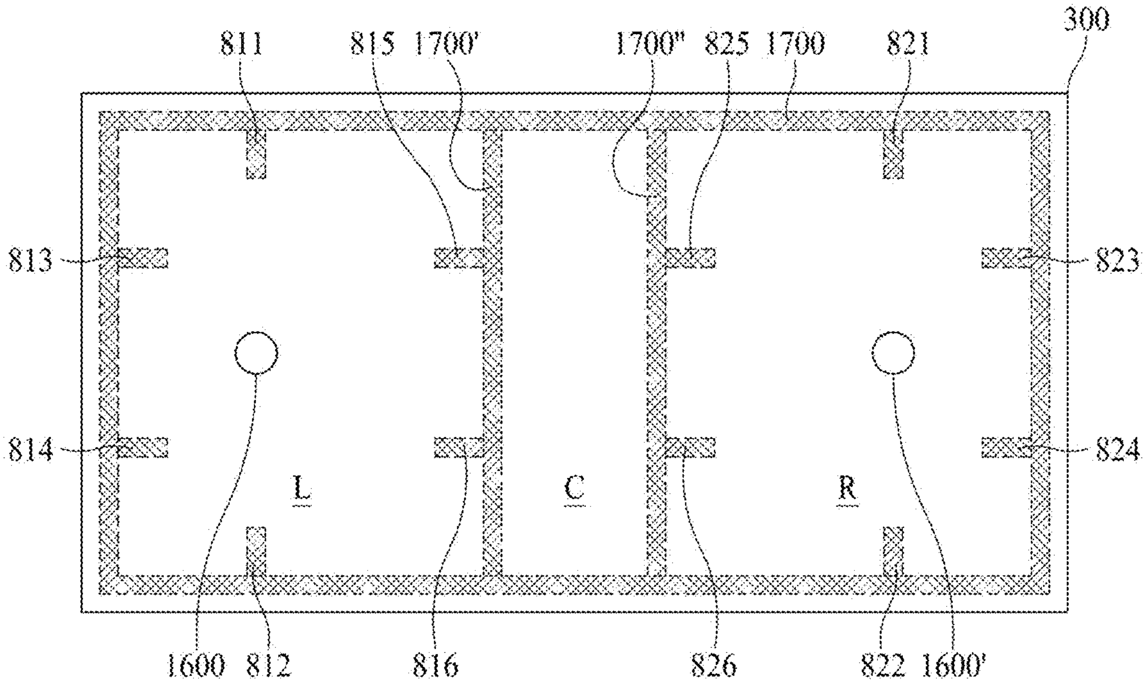
FIGS. 15A to 15D illustrate a sound generating device and a partition according to an embodiment of the present disclosure.
Figure 15B:
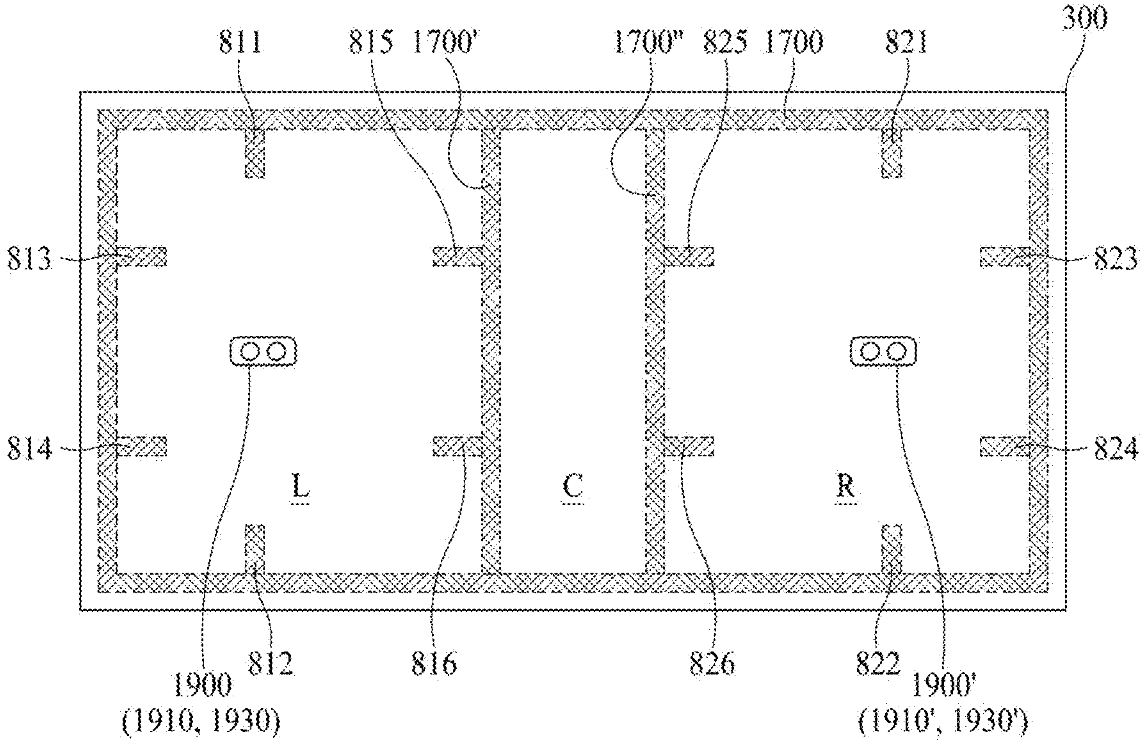
Figure 15C:
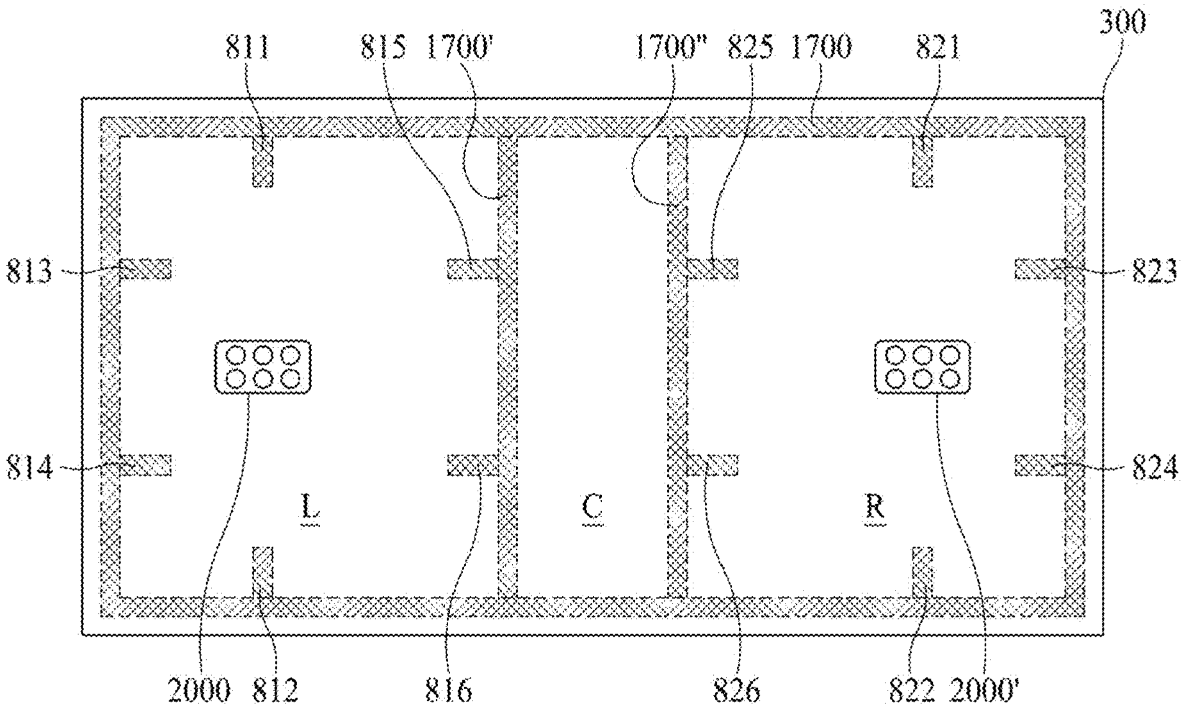
Figure 15D:
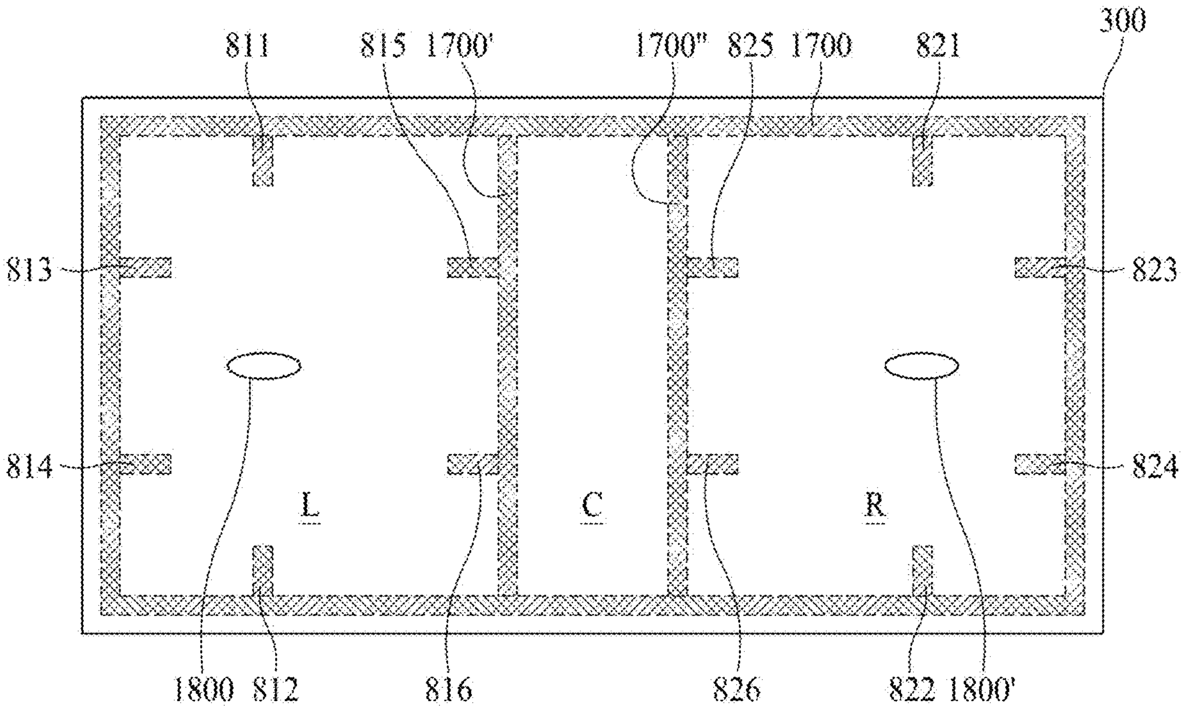

With reference to FIG. 15A, at least one fifth pad 815, sixth pad 816, eleventh pad 825, and twelfth pad 826 may be further on a side facing the second side of the first partition 1700. For example, the at least one fifth pad 815 and the at least one sixth pad 816 may be in a side, facing the second side of the first partition 1700, of a first region L and may be on one side of a second partition 1700'. As another example, one of the at least one fifth pad 815 and the at least one sixth pad 816 may be provided. For example, the at least one eleventh pad 825 and the at least one twelfth pad 826 may be on a side, facing the second side of the first partition 1700, of a second region R and may be on one side of the third partition 1700". As another example, one of the at least one eleventh pad 825 and the at least one twelfth pad 826 may be provided. The fifth pad 815 and the sixth pad 816 may face the third pad 813 and the fourth pad 814. For example, the fifth pad 815 and the sixth pad 816 may be disposed to be symmetrical with respect to a first sound generating device 1600. The eleventh pad 825 and the twelfth pad 826 may face the ninth pad 823 and the tenth pad 824. For example, the eleventh pad 825 and the twelfth pad 826 may be disposed to be symmetrical with respect to a second sound generating device 1600'.

The at least one fifth pad 815 or the at least one sixth pad 816 may be formed of the same material as that of the first partition 1700. For example, the at least one fifth pad 815 or the at least one sixth pad 816 may be formed of one of a double-sided tape, a double-sided foam pad, a single-sided tape, a single-sided foam pad, an adhesive, and a bond, but embodiments are not limited thereto. As another example, the at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one eleventh pad 825 or the at least one twelfth pad 826 may be formed of the same material as that of the first partition 1700. For example, the at least one eleventh pad 825 or the at least one twelfth pad 826 may be formed of one of a double-sided tape, a double-sided foam pad, a single-sided tape, a single-sided foam pad, an adhesive, and a bond, but embodiments are not limited thereto. As another example, the at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700".

Therefore, because a partition is configured based on a shape of a display panel and one or more pads are provided on at least one side of the partition, the wave phenomenon may decrease, and the peak or the dip caused by the standing wave may be reduced, thereby enhancing a sound output characteristic. Also, a first sound generating device and a second sound generating device may output a sound of the middle-pitched sound band and a sound of the high-pitched sound band and may output a stereo sound by separating the left and right sounds, thereby providing a display apparatus having a two-channel sound output characteristic.

Figure 16A:
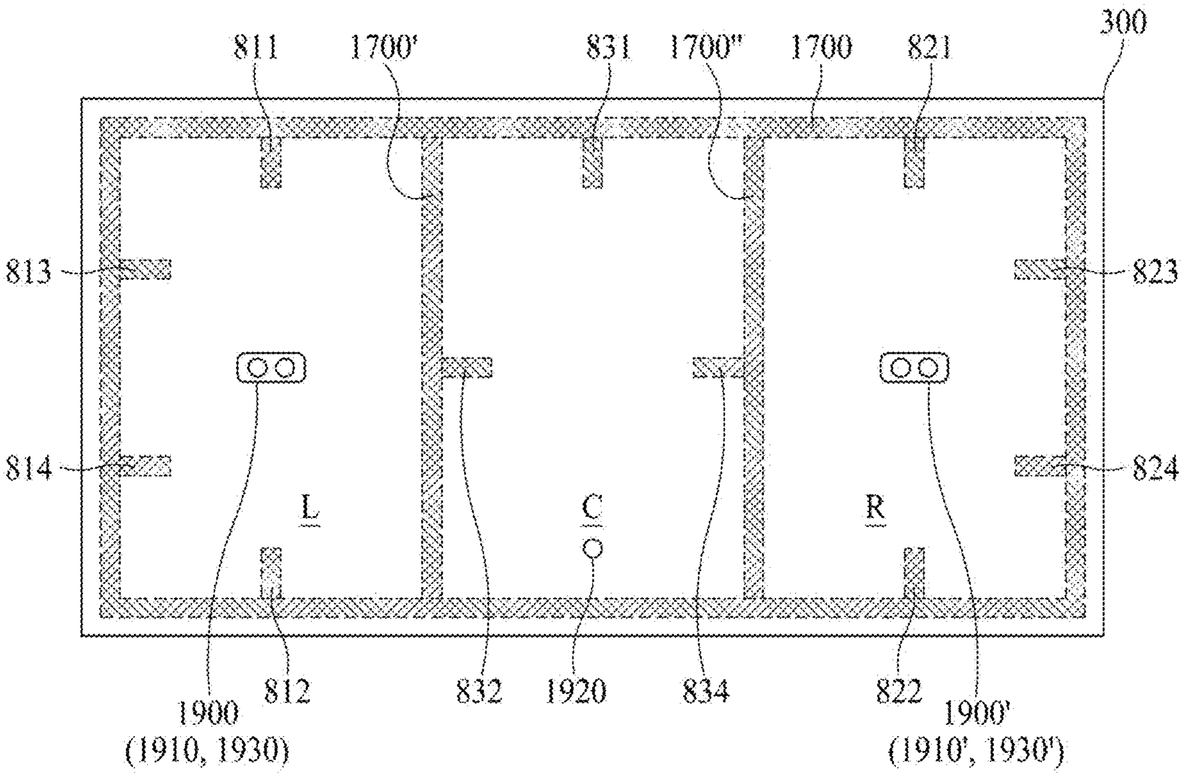
FIGS. 16A and 16B illustrate a sound generating device and a partition according to an embodiment of the present disclosure.
Figure 16B:
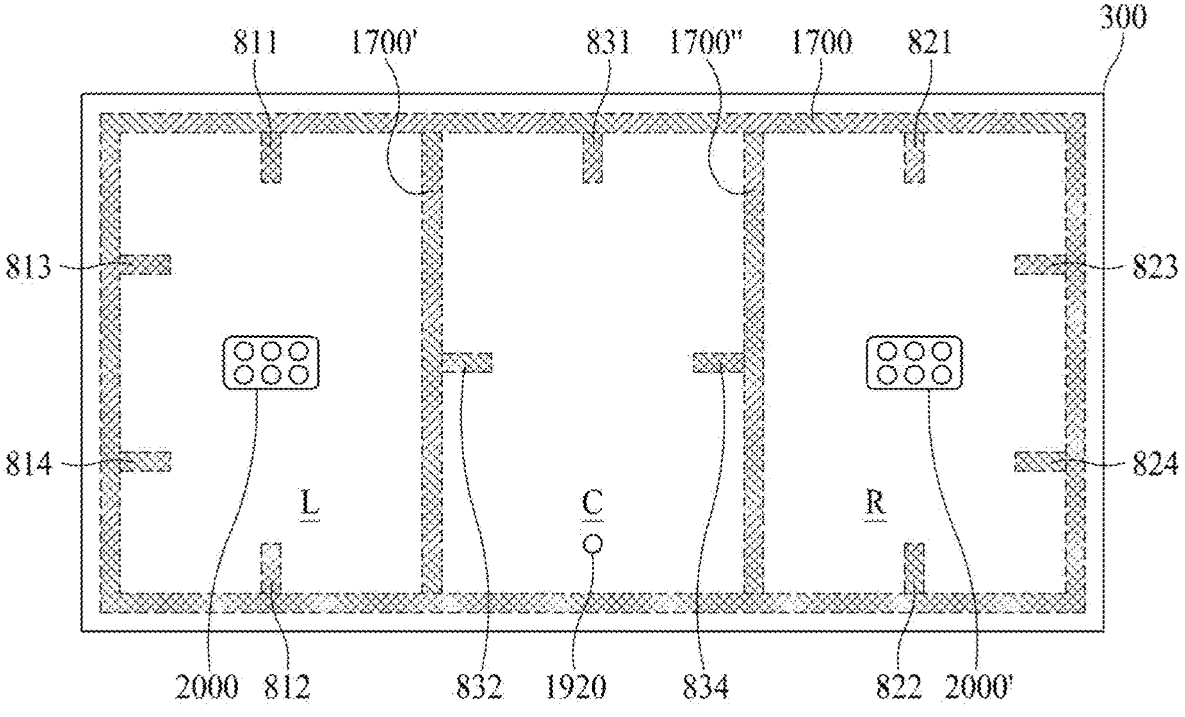

FIGS. 16A and 16B illustrate a sound generating device and a partition according to an embodiment of the present disclosure.

In FIGS. 16A and 16B, substantially same descriptions as descriptions given above with reference to FIGS. 14A to 14D may be omitted or may be briefly given below. For example, descriptions of a sound generating device, a partition, and a pad may be omitted or may be briefly given below.

With reference to FIGS. 16A and 16B, a first partition 1700 may be between a display panel and a supporting member 300. For example, the first partition 1700 may be between a rear surface of the display panel and an upper surface of the supporting member 300. The first partition 1700 may be in the supporting member 300. For example, the first partition 1700 may be in an edge or periphery of the supporting member 300 or an edge or periphery of an upper surface of the supporting member 300. The first partition 1700 may be disposed in an edge or periphery of the display panel. For example, the first partition 1700 may be in the rear surface of the display panel or the edge or periphery of the display panel. The first partition 1700 may be a whole region of four outer sides of the supporting member 300 or the whole region of the rear surface of the display panel.

Therefore, the first partition 1700 may be along a shape of the display panel 100. For example, the first partition 1700 may have a tetragonal (e.g., quadrilateral) shape, but embodiments are not limited thereto. For example, a shape of the first partition 1700 may be modified based on a shape of the display panel 100. If the display panel 100 is a curved display panel having a curve shape or the like, the first partition 1700 may have a curved shape or a curve shape. Accordingly, the first partition 1700 may be disposed along a shape of the display panel 100, thereby preventing the wave phenomenon.

With reference to FIG. 16A, a first sound generating device 1900 (1910 and 1930) may be in a first region L, and a second sound generating device 1900' (1910' and 1930') may be in a second region R. The first sound generating device 1900 (1910 and 1930) and the second sound generating device 1900' (1910' and 1930') may be configured as the sound generating device or the sound generating module described above with reference to FIGS. 8, 9B, 10A, and 10B. As another example, the first sound generating device 1900 (1910 and 1930) and the second sound generating device 1900' (1910' and 1930') may be configured as the sound generating device or the sound generating module described above with reference to FIGS. 9B, 10A, 10B, and 12. For example, the first sound generating device 1900 (1910 and 1930) and the second sound generating device 1900' (1910' and 1930") may be configured with two sound generating devices or sound generating modules. The first sound generating device 1900 (1910 and 1930) and the second sound generating device 1900' (1910' and 1930') may output sounds of different middle-high-pitched sound bands in the first region L and the second region R. For example, the first sound generating device 1900 (1910 and 1930) and the second sound generating device 1900' (1910' and 1930') may output a sound of a range of about 300 Hz to about 20 kHz, but a range is not limited thereto.

A third sound generating device 1920 may be in a third region C. The third sound generating device 1920 may be configured as the sound generating device or the sound generating module described above with reference to FIGS. 8 and 9A. As another example, the third sound generating device 1920 may be configured as the sound generating device or the sound generating module described above with reference to FIGS. 9A and 12. For example, the third sound generating device 1920 may be configured with one sound generating device or sound generating module. The third sound generating device 1920 may output a sound of a middle-low-pitched sound band in the third region C. For example, the third sound generating device 1920 may output a sound of a range of about 100 Hz to about 10 kHz, but a range is not limited thereto.

Therefore, the first sound generating device 1900 (1910 and 1930) and the second sound generating device 1900' (1910' and 1930') may output sounds of different middle-high-pitched sound bands, and the third sound generating device 1920 may output a sound of the middle-low-pitched sound band. Accordingly, a stereo sound may be output by separating left and right sounds, thereby providing a display apparatus having a three-channel sound output characteristic.

With reference to FIG. 16B, a first sound generating device 2000 may be in a first region L, and a second sound generating device 2000' may be in a second region R. The first sound generating device 2000 and the second sound generating device 2000' may be configured as the sound generating device described above with reference to FIGS. 8 and 9D. As another example, the first sound generating device 2000 and the second sound generating device 2000' may be configured as the sound generating device described above with reference to FIGS. 9D and 12. For example, the first sound generating device 2000 and the second sound generating device 2000' may be configured with six sound generating devices. The first sound generating device 2000 and the second sound generating device 2000' may output sounds of different middle-high-pitched sound bands in the first region L and the second region R. For example, the first sound generating device 2000 and the second sound generating device 2000' may output a sound of a range of about 200 Hz to about 20 kHz, but a range is not limited thereto.

A third sound generating device 1920 may be in a third region C. The third sound generating device 1920 may be configured as the sound generating device described above with reference to FIGS. 8 and 9A. As another example, the third sound generating device 1920 may be configured as the sound generating device described above with reference to FIGS. 9A and 12. For example, the third sound generating device 1920 may be configured with one sound generating device. The third sound generating device 1920 may output a sound of a middle-low-pitched sound band in the third region C. For example, the third sound generating device 1920 may output a sound of a range of about 100 Hz to about 10 kHz, but a range is not limited thereto.

Therefore, the first sound generating device 2000 and the second sound generating device 2000' may output sounds of different middle-high-pitched sound bands, and the third sound generating device 1920 may output a sound of the middle-low-pitched sound band. Accordingly, a stereo sound may be output by separating left and right sounds, thereby providing a display apparatus having a three-channel sound output characteristic.

With reference to FIGS. 16A and 16B, a first sound generating device of a first region L and a second sound generating device of a second region R may be disposed asymmetrically with a third sound generating device of a third region C. For example, in FIG. 16A, the first sound generating device 1900 (1910 and 1930) of the first region L and the second sound generating device 1900' (1910' and 1930') of the second region R may be disposed on a line differing from the third sound generating device 1920 of the third region C. The first sound generating device 1900 (1910 and 1930) of the first region L and the second sound generating device 1900' (1910' and 1930') of the second region R may be disposed symmetrically, and the third sound generating device 1920 of the third region C may be disposed asymmetrically with the first sound generating device 1900 (1910 and 1930) of the first region L and the second sound generating device 1900' (1910' and 1930') of the second region R. The third sound generating device 1920 of the third region C may be disposed at lower portion than the first sound generating device 1900 (1910 and 1930) of the first region L and the second sound generating device 1900' (1910' and 1930') of the second region R, but embodiments are not limited thereto.

With reference to FIGS. 16A and 16B, one member may be further on at least one side of a first partition 1700, a second partition 1700', and a third partition 1700". This will be described below with reference to FIG. 15A for example, and the description may be applied to FIG. 16B identically or similarly. A first member 831 may be on a first side of the first partition 1700. For example, the first member 831 may face the third sound generating device 1920. A second member 832 may be on a side of the second partition 1700'. For example, the second member 832 may be in the third region C. A third member 834 may be on a side of the third partition 1700". For example, the third member 834 may be in the third region C. The second member 832 may face the third member 834. The first member 831, the second member 832, and the third member 834 may decrease or prevent the transfer of a vibration(s), generated by the first region L and/or the second region R, to the third region C, thereby providing a display apparatus for realizing a sharp and clean or refined sound. The first member 831 may decrease a peak or a dip caused by a standing wave which occurs in a lengthwise direction of a sound generating device, and thus, may be referred to as a pad. However, the terms are not limited thereto.

One of the second member 832 and the third member 834 may be disposed symmetrically with respect to the first sound generating device 1900 (1910 and 1930) and/or the second sound generating device 1900' (1910' and 1930'). For example, one of the second member 832 and the third member 834 may be on the same plane or line as the first sound generating device 1900 (1910 and 1930) and/or the second sound generating device 1900' (1910' and 1930'), but embodiments are not limited thereto. One of the second member 832 and the third member 834 may be disposed asymmetrically with respect to the first sound generating device 1900 (1910 and 1930) and/or the second sound generating device 1900' (1910' and 1930'). For example, one of the second member 832 and the third member 834 may be disposed on a plane or a line differing from the first sound generating device 1900 (1910 and 1930) and/or the second sound generating device 1900' (1910' and 1930'), but embodiments are not limited thereto. The second member 832 may be between third pad 813 or fourth pad 814 on at least one side of the first partition 1700, but embodiments are not limited thereto. The third member 834 may be between ninth pad 823 or tenth pad 824 on at least one side of the first partition 1700, but embodiments are not limited thereto. For example, the second member 832 may be on or under the third pad 813 or the fourth pad 814, and the third member 834 may be on or under the ninth pad 823 or the tenth pad 824. However, embodiments are not limited thereto.

The first member 831, the second member 832, and the third member 834 may be formed of one of a double-sided tape, a double-sided foam pad, a single-sided tape, a single-sided foam pad, an adhesive, and a bond. When the first member 831, the second member 832, and the third member 834 are formed of materials which differ from those of the first pad 811, the second pad 812, the third pad 813, the fourth pad 814, the seventh pad 821, the eighth pad 822, the ninth pad 823, and the tenth pad 824, the wave phenomenon may occur due to different adhesive forces when contacting the display panel 100. Therefore, when the first member 831, the second member 832, and the third member 834 are formed of the same material as that of the first pad 811, the second pad 812, the third pad 813, the fourth pad 814, the fifth pad 823, and the sixth pad 813, the wave phenomenon may be reduced, and the occurrence of an abnormal sound may be reduced. Therefore, the first member 831, the second member 832, and the third member 834 may be formed of the same material as that of the first pad 811, the second pad 812, the third pad 813, the fourth pad 814, the seventh pad 821, the eighth pad 822, the ninth pad 823, and the tenth pad 824. For example, the first member 831, the second member 832, and the third member 834 may be formed of a double-sided tape or a single-sided tape. The double-sided tape or the single-sided tape may include a foam material which absorbs an impact when contacting the display panel 100. When the double-sided tape or the single-sided tape does not include the foam material, it may be seen that an undesired abnormal sound occurs due to contacting the display panel 100. The single-sided tape may be formed of, for example, polyurethane, polyolefin, polyethylene, and/or the like, but embodiments are not limited thereto. A shape of the first member 831, the second member 832, and the third member 834, as described above with reference to FIGS. 11A to 11D, may be equal or similar to that of the first pad 811, the second pad 812, the third pad 813, the fourth pad 814, the seventh pad 821, the eighth pad 822, the ninth pad 823, and the tenth pad 824.

In FIGS. 15A to 21D, the first region L, the second region R, and the third region C are illustrated as having the same area, but embodiments of the present disclosure is not limited thereto. For example, an area of the first region L and the second region R may be greater than that of the third region C. When the first region L, the second region R, and the third region C have the same area, a sound of a relatively lower sound band may be output. For example, when an area of the third region C which outputs a sound of the middle-low-pitched sound band is greater than that of the first region L and the second region R, a reproduction region of the low-pitched sound band may further increase.

Figure 17A:
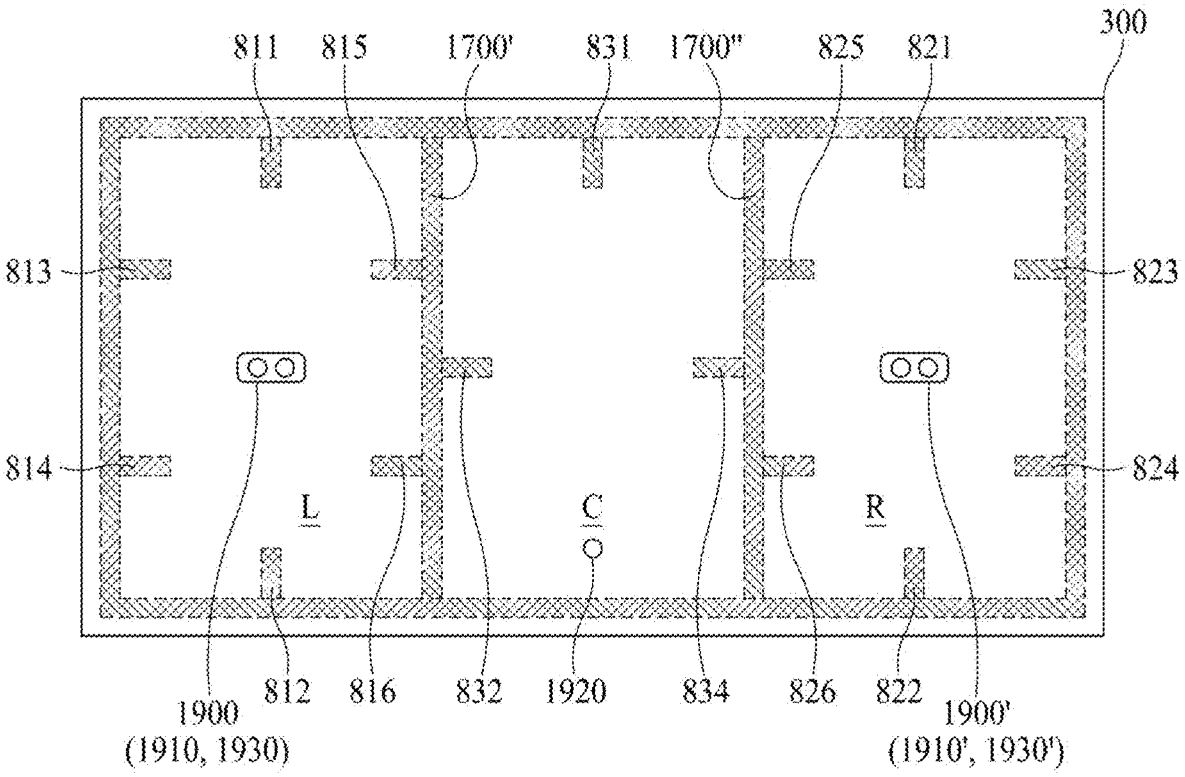
FIGS. 17A and 17B illustrate a sound generating device and a partition according to an embodiment of the present disclosure.
Figure 17B:
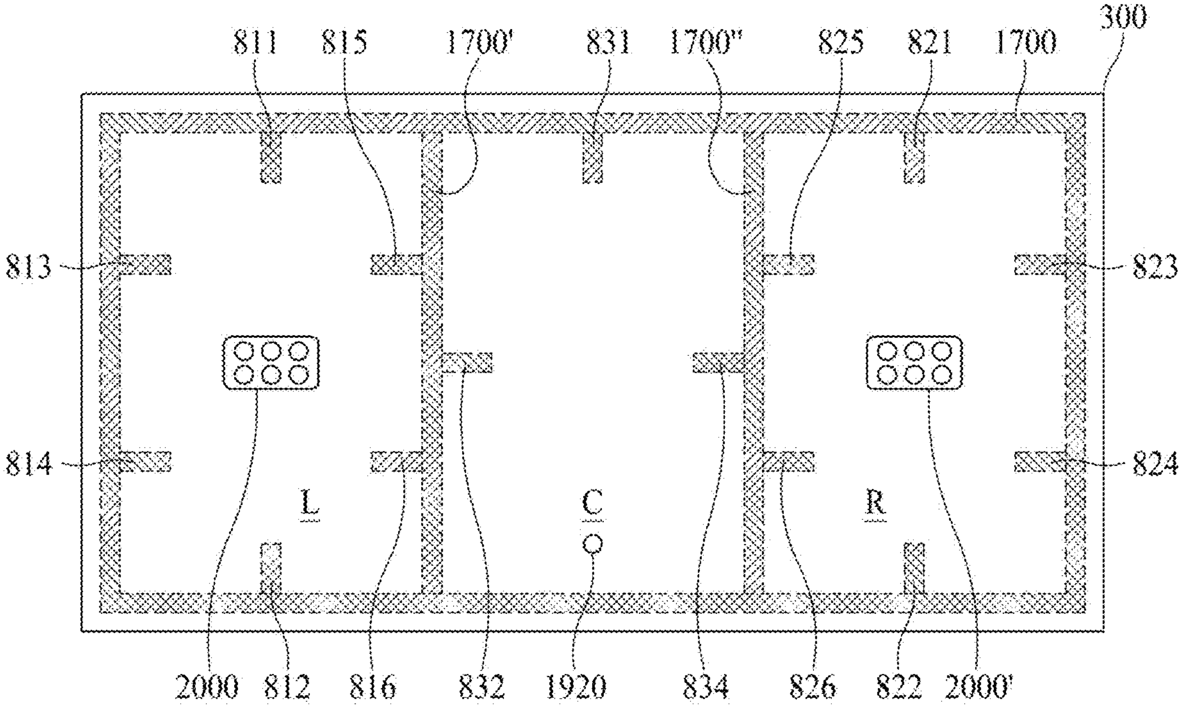

FIGS. 17A and 17B illustrate a sound generating device and a partition according to an embodiment of the present disclosure.

In FIGS. 17A and 17B, substantially same descriptions as descriptions given above with reference to FIGS. 14A to 14D, 16A, and 16B may be omitted or may be briefly given below. For example, descriptions of a sound generating device, a partition, and a pad may be omitted or may be briefly given below.

With reference to FIG. 17A, at least one fifth pad 815, sixth pad 816, eleventh pad 825, and twelfth pad 826 may be further on a side facing the second side of the first partition 1700. For example, the at least one fifth pad 815 and the at least one sixth pad 816 may be in a side, facing the second side of the first partition 1700, of a first region L and may be on one side of a second partition 1700'. As another example, one of the at least one fifth pad 815 and the at least one sixth pad 816 may be provided. For example, the at least one eleventh pad 825 and the at least one twelfth pad 826 may be on a side, facing the second side of the first partition 1700, of a second region R and may be on one side of the third partition 1700". As another example, one of the at least one eleventh pad 825 and the at least one twelfth pad 826 may be provided. The fifth pad 815 and the sixth pad 816 may face the third pad 813 and the fourth pad 814. For example, the fifth pad 815 and the sixth pad 816 may be disposed to be symmetrical with respect to a first sound generating device 1900 (1910 and 1930). The eleventh pad 825 and the twelfth pad 826 may face the ninth pad 823 and the tenth pad 824. For example, the eleventh pad 825 and the twelfth pad 826 may be disposed to be symmetrical with respect to a second sound generating device 1900' (1910' and 1930').

The at least one fifth pad 815 or the at least one sixth pad 816 may be formed of the same material as that of the first partition 1700. For example, the at least one fifth pad 815 or the at least one sixth pad 816 may be formed of one of a double-sided tape, a double-sided foam pad, a single-sided tape, a single-sided foam pad, an adhesive, and a bond, but embodiments are not limited thereto. As another example, the at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one eleventh pad 825 or the at least one twelfth pad 826 may be formed of the same material as that of the first partition 1700. For example, the at least one eleventh pad 825 or the at least one twelfth pad 826 may be formed of one of a double-sided tape, a double-sided foam pad, a single-sided tape, a single-sided foam pad, an adhesive, and a bond, but embodiments are not limited thereto. As another example, the at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700".

Therefore, because a partition is configured based on a shape of a display panel and one or more pads are provided on at least one side of the partition, the wave phenomenon may decrease, and the peak or the dip caused by the standing wave may be reduced, thereby enhancing a sound output characteristic. Also, a first sound generating device and a second sound generating device may output a sound of the middle-pitched sound band and a sound of the high-pitched sound band and may output a stereo sound by separating the left and right sounds, thereby providing a display apparatus having a two-channel sound output characteristic.

Figure 18A:
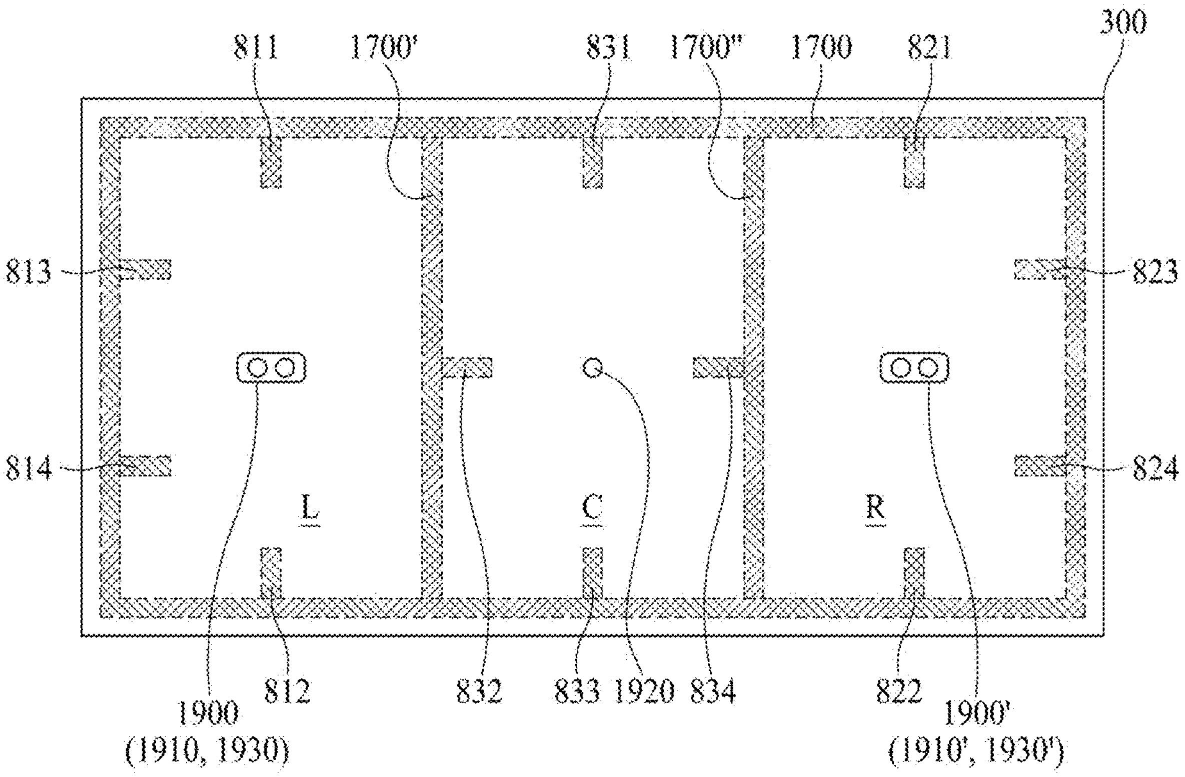
FIGS. 18A and 18B illustrate a sound generating device and a partition according to an embodiment of the present disclosure.
Figure 18B:
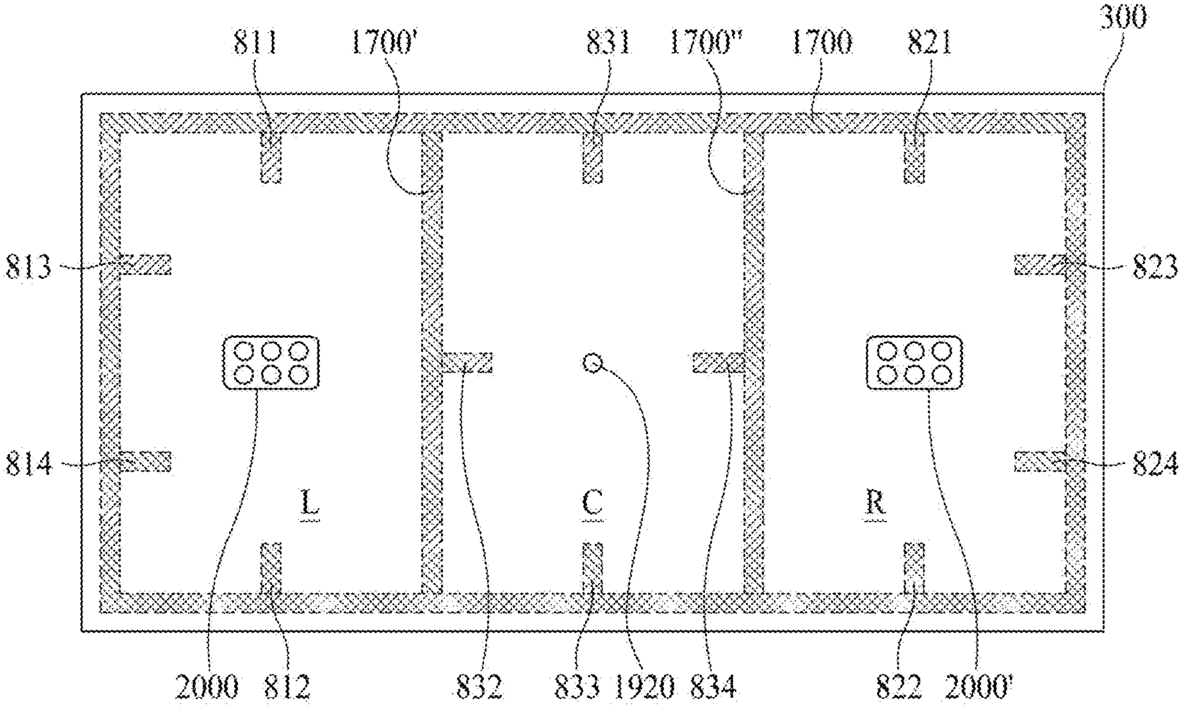

FIGS. 18A and 18B illustrate a sound generating device and a partition according to an embodiment of the present disclosure.

In FIGS. 18A and 18B, substantially same descriptions as descriptions given above with reference to FIGS. 14A to 14D, 16A, and 16B may be omitted or may be briefly given below. For example, descriptions of a sound generating device, a partition, and a pad may be omitted or may be briefly given below.

With reference to FIG. 18A, a first sound generating device 1900 (1910 and 1930) may be in a first region L, and a second sound generating device 1900' (1910' and 1930') may be in a second region R. The first sound generating device 1900 (1910 and 1930) and the second sound generating device 1900' (1910' and 1930') may be configured as the sound generating device or the sound generating module described above with reference to FIGS. 8 and 9B. As another example, the first sound generating device 1900 (1910 and 1930) and the second sound generating device 1900' (1910' and 1930') may be configured as the sound generating device or the sound generating module described above with reference to FIGS. 9B and 12. For example, the first sound generating device 1900 (1910 and 1930) and the second sound generating device 1900' (1910' and 1930') may be configured with two sound generating devices or sound generating modules. The first sound generating device 1900 (1910 and 1930) and the second sound generating device 1900' (1910' and 1930') may output sounds of different middle-high-pitched sound bands in the first region L and the second region R. For example, the first sound generating device 1900 (1910 and 1930) and the second sound generating device 1900' (1910' and 1930') may output a sound of a range of about 300 Hz to about 20 kHz, but a range embodiments are not limited thereto.

A third sound generating device 1920 may be in a third region C. The third sound generating device 1920 may be configured as the sound generating device or the sound generating module described above with reference to FIGS. 8 and 9A. As another example, the third sound generating device 1920 may be configured as the sound generating device or the sound generating module described above with reference to FIGS. 9A and 12. For example, the third sound generating device 1920 may be configured with one sound generating device or sound generating module. The third sound generating device 1920 may output a sound of a middle-low-pitched sound band in the third region C. For example, the third sound generating device 1920 may output a sound of a range of about 100 Hz to about 10 kHz, but a range is not limited thereto.

Therefore, the first sound generating device 1900 and the second sound generating device 1900' may output sounds of different middle-high-pitched sound bands, and the third sound generating device 1920 may output a sound of the middle-low-pitched sound band. Accordingly, a stereo sound may be output by separating left and right sounds, thereby providing a display apparatus having a three-channel sound output characteristic.

With reference to FIG. 18B, a first sound generating device 2000 may be in a first region L, and a second sound generating device 2000' may be in a second region R. The first sound generating device 2000 and the second sound generating device 2000' may be configured as the sound generating device or the sound generating module described above with reference to FIGS. 8 and 9D. As another example, the first sound generating device 2000 and the second sound generating device 2000' may be configured as the sound generating device or the sound generating module described above with reference to FIGS. 9D and 12. For example, the first sound generating device 2000 and the second sound generating device 2000' may be configured with six sound generating devices or sound generating modules. The first sound generating device 2000 and the second sound generating device 2000' may output sounds of different middle-high-pitched sound bands in the first region L and the second region R. For example, the first sound generating device 2000 and the second sound generating device 2000' may output a sound of a range of about 200 Hz to about 20 kHz, but a range is not limited thereto.

A third sound generating device 1920 may be in a third region C. The third sound generating device 1920 may be configured as the sound generating device or the sound generating module described above with reference to FIGS. 8 and 9A. As another example, the third sound generating device 1920 may be configured as the sound generating device or the sound generating module described above with reference to FIGS. 9A and 12. For example, the third sound generating device 1920 may be configured with one sound generating device or sound generating module. The third sound generating device 1920 may output a sound of a middle-low-pitched sound band in the third region C. For example, the third sound generating device 1920 may output a sound of a range of about 100 Hz to about 10 kHz, but a range is not limited thereto.

Therefore, the first sound generating device 2000 and the second sound generating device 2000' may output sounds of different middle-high-pitched sound bands, and the third sound generating device 1920 may output a sound of the middle-low-pitched sound band. Accordingly, a stereo sound may be output by separating left and right sounds, thereby providing a display apparatus having a three-channel sound output characteristic.

With reference to FIGS. 18A and 18B, a first sound generating device of a first region L and a second sound generating device of a second region R may be disposed symmetrically with a third sound generating device of a third region C. For example, in FIG. 18A, the first sound generating device 1900 (1910 and 1930) of the first region L, the second sound generating device 1900' (1910' and 1930') of the second region R, and the third sound generating device 1920 of the third region C may be disposed on the same line. For example, heights of sound sources which generate sounds may become equal or similar, and thus, when reproducing or generating a stereo sound which expresses a position of a sound based on a difference between left and right sounds, sound image localization where a sound image is realized at a normal position may be enhanced.

With reference to FIGS. 18A and 18B, one member may be further disposed on at least one side of a first partition 1700, a second partition 1700', and a third partition 1700". This will be described below with reference to FIG. 18A for example, and the description may be applied to FIG. 18B identically or similarly. A first member 831 may be on a first side of the first partition 1700. For example, the first member 831 may face the third sound generating device 1920. A second member 832 may be on a side of the second partition 1700'. For example, the second member 832 may be in the third region C. A third member 834 may be on a side of the third partition 1700". For example, the third member 834 may be in the third region C. The second member 832 may face the third member 834. A fourth member 833 may be on the first side of the first partition 1700. For example, the fourth member 833 may face the third sound generating device 1920. The first member 831 may face the fourth member 833. The first member 831, the second member 832, the third member 834, and the fourth member 833 may decrease or prevent the transfer of a vibration(s), generated by the first region L and/or the second region R, to the third region C, thereby providing a display apparatus for realizing a sharp and clean or refined sound. The first member 831 and the fourth member 833 may decrease a peak or a dip caused by a standing wave which occurs in a lengthwise direction of a sound generating device, and thus, may be referred to as a pad.

One of the second member 832 and the third member 834 may be disposed symmetrically with respect to the first sound generating device 1900 (1910 and 1930) and/or the second sound generating device 1900' (1910' and 1930'). For example, one of the second member 832 and the third member 834 may be on the same plane or line as the first sound generating device 1900 (1910 and 1930) and/or the second sound generating device 1900' (1910' and 1930'), but embodiments are not limited thereto. One of the second member 832 and the third member 834 may be disposed asymmetrically with respect to the first sound generating device 1900 (1910 and 1930) and/or the second sound generating device 1900' (1910' and 1930'). For example, one of the second member 832 and the third member 834 may be disposed on a plane or a line differing from the first sound generating device 1900 (1910 and 1930) and/or the second sound generating device 1900' (1910' and 1930'), but embodiments are not limited thereto. The second member 832 may be between third pad 813 or fourth pad 814 on at least one side of the first partition 1700, but embodiments are not limited thereto. The third member 834 may be between ninth pad 823 or tenth pad 824 on at least one side of the first partition 1700, but embodiments are not limited thereto. For example, the second member 832 may be on or under the third pad 813 or the fourth pad 814, and the third member 834 may be on or under the ninth pad 823 or the tenth pad 824. However, embodiments are not limited thereto.

The first member 831, the second member 832, the third member 834, and the fourth member 833 may be formed of one of a double-sided tape, a double-sided foam pad, a single-sided tape, a single-sided foam pad, an adhesive, and a bond. When the first member 831, the second member 832, the third member 834, and the fourth member 833 are formed of materials which differ from those of the first pad 811, the second pad 812, the third pad 813, the fourth pad 814, the seventh pad 821, the eighth pad 822, the ninth pad 823, and the tenth pad 824, the wave phenomenon may occur due to different adhesive forces when contacting the display panel 100. Therefore, when the first member 831, the second member 832, the third member 834, and the fourth member 833 are formed of the same material as that of the first pad 811, the second pad 812, the third pad 813, the fourth pad 814, the fifth pad 823, and the sixth pad 813, the wave phenomenon may be reduced, and the occurrence of an abnormal sound may be reduced. Therefore, the first member 831, the second member 832, the third member 834, and the fourth member 833 may be formed of the same material as that of the first pad 811, the second pad 812, the third pad 813, the fourth pad 814, the seventh pad 821, the eighth pad 822, the ninth pad 823, and the tenth pad 824. For example, the first member 831, the second member 832, the third member 834, and the fourth member 833 may be formed of a double-sided tape or a single-sided tape. The double-sided tape or the single-sided tape may include a foam material which absorbs an impact when contacting the display panel 100. When the double-sided tape or the single-sided tape does not include the foam material, it may be seen that an undesired abnormal sound occurs due to contacting the display panel 100. The single-sided tape may be formed of, for example, polyurethane, polyolefin, polyethylene, and/or the like, but embodiments are not limited thereto. A shape of the first member 831, the second member 832, the third member 834, and the fourth member 833, as described above with reference to FIGS. 14A to 14D, may be equal or similar to that of the first pad 811, the second pad 812, the third pad 813, the fourth pad 814, the seventh pad 821, the eighth pad 822, the ninth pad 823, and the tenth pad 824.

Figure 19A:
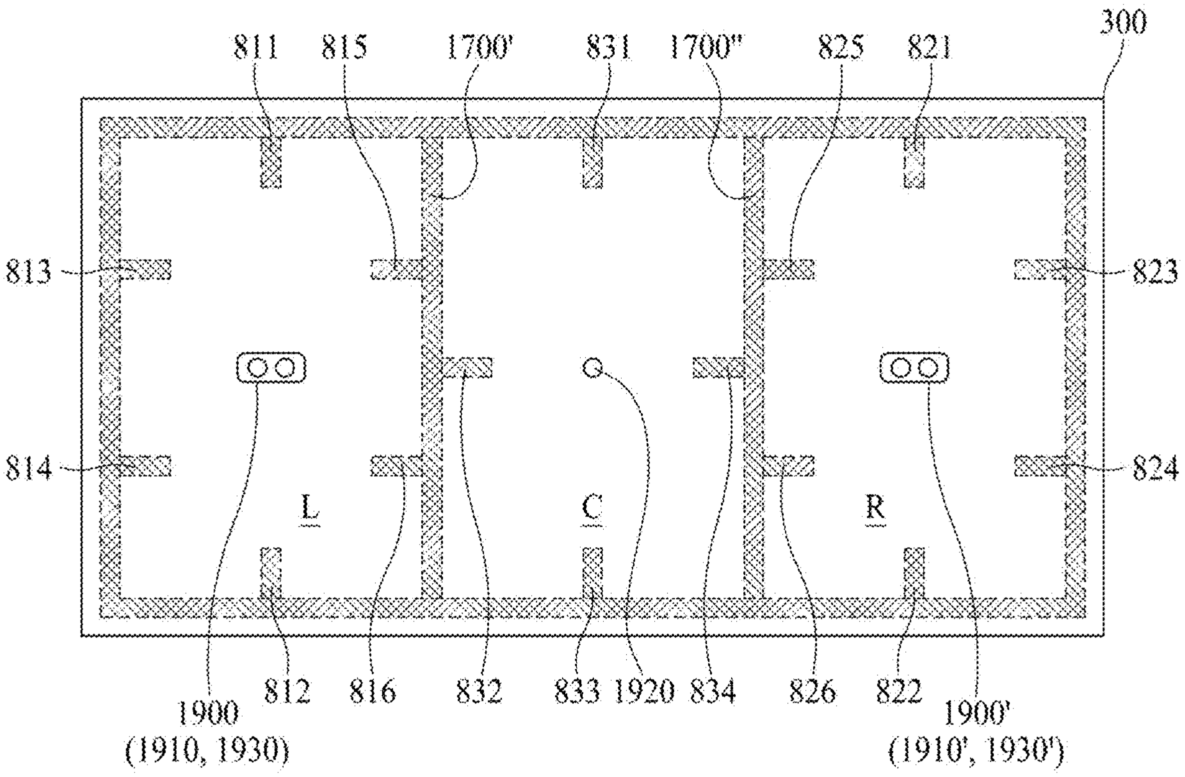
FIGS. 19A and 19B illustrate a sound generating device and a partition according to an embodiment of the present disclosure
Figure 19B:
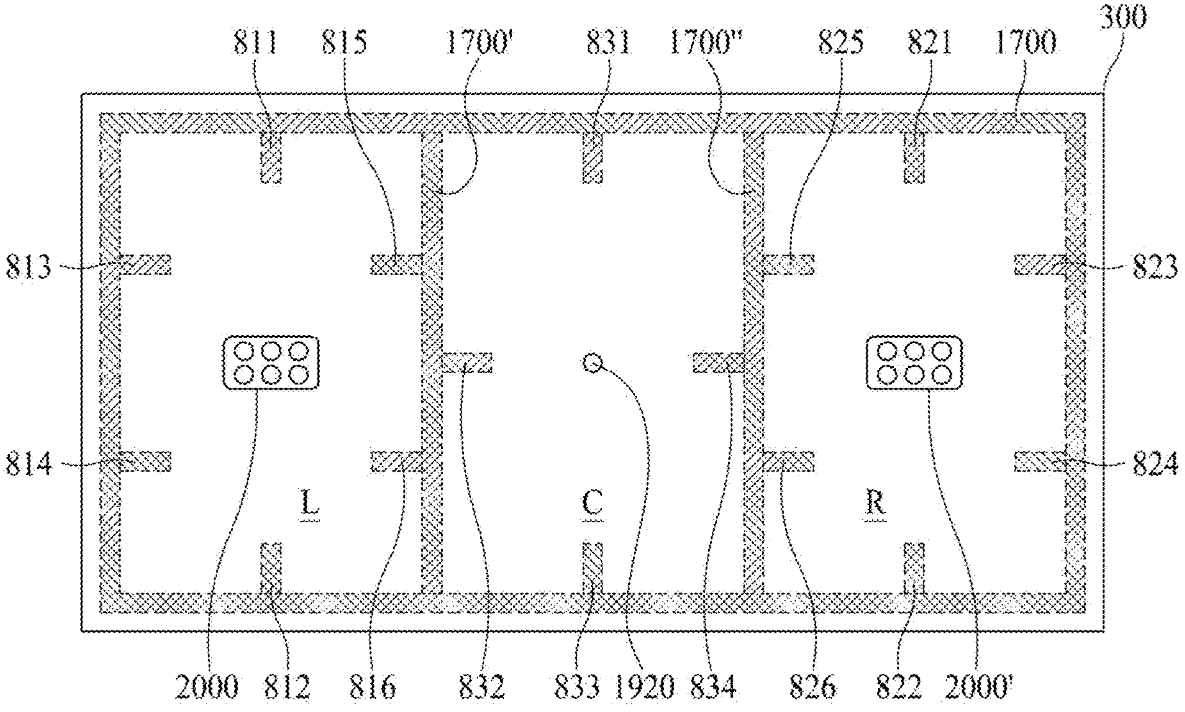

FIGS. 19A and 19B illustrate a sound generating device and a partition according to an embodiment of the present disclosure.

In FIGS. 19A and 19B, substantially same descriptions as descriptions given above with reference to FIGS. 14A to 14D, 18A, and 18B may be omitted or may be briefly given below. For example, descriptions of a sound generating device, a partition, and a pad may be omitted or may be briefly given below.

With reference to FIG. 19A, at least one fifth pad 815, sixth pad 816, eleventh pad 825, and twelfth pad 826 may be further on a side facing the second side of the first partition 1700. For example, the at least one fifth pad 815 and the at least one sixth pad 816 may be in a side, facing the second side of the first partition 1700, of a first region L and may be on one side of a second partition 1700'. As another example, one of the at least one fifth pad 815 and the at least one sixth pad 816 may be provided. For example, the at least one eleventh pad 825 and the at least one twelfth pad 826 may be on a side, facing the second side of the first partition 1700, of a second region R and may be on one side of the third partition 1700". As another example, one of the at least one eleventh pad 825 and the at least one twelfth pad 826 may be provided. The fifth pad 815 and the sixth pad 816 may face the third pad 813 and the fourth pad 814. For example, the fifth pad 815 and the sixth pad 816 may be disposed to be symmetrical with respect to a first sound generating device 1900 (1910 and 1930). The eleventh pad 825 and the twelfth pad 826 may be provided to face the ninth pad 823 and the tenth pad 824. For example, the eleventh pad 825 and the twelfth pad 826 may be disposed to be symmetrical with respect to a second sound generating device 1900' (1910' and 1930').

The at least one fifth pad 815 or the at least one sixth pad 816 may be formed of the same material as that of the first partition 1700. For example, the at least one fifth pad 815 or the at least one sixth pad 816 may be formed of one of a double-sided tape, a double-sided foam pad, a single-sided tape, a single-sided foam pad, an adhesive, and a bond, but embodiments are not limited thereto. As another example, the at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one eleventh pad 825 or the at least one twelfth pad 826 may be formed of the same material as that of the first partition 1700. For example, the at least one eleventh pad 825 or the at least one twelfth pad 826 may be formed of one of a double-sided tape, a double-sided foam pad, a single-sided tape, a single-sided foam pad, an adhesive, and a bond, but embodiments are not limited thereto. As another example, the at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700".

Therefore, because a partition is configured based on a shape of a display panel and one or more pads are on at least one side of the partition, the wave phenomenon may decrease, and the peak or the dip caused by the standing wave may be reduced, thereby enhancing a sound output characteristic. Also, a first sound generating device and a second sound generating device may output a sound of the middle-pitched sound band and a sound of the high-pitched sound band and may output a stereo sound by separating the left and right sounds, thereby providing a display apparatus having a two-channel sound output characteristic.

FIGS. 20A to 20D illustrate a sound generating device and a partition according to an embodiment of the present disclosure.

In FIGS. 20A to 20D, substantially same descriptions as descriptions given above with reference to FIGS. 14A to 14D may be omitted or may be briefly given below. For example, descriptions of a sound generating device, a partition, and a pad may be omitted or may be briefly given below.

With reference to FIGS. 20A to 20D, a first region L and a second region R may include at least two regions, and a sound generating device may be in each of the at least two regions of the first region L and the second region R. A fourth partition 1704 may be further between the two regions of the first region L. A fifth partition 1705 may be further between the two regions of the second region R.

Figure 20A:
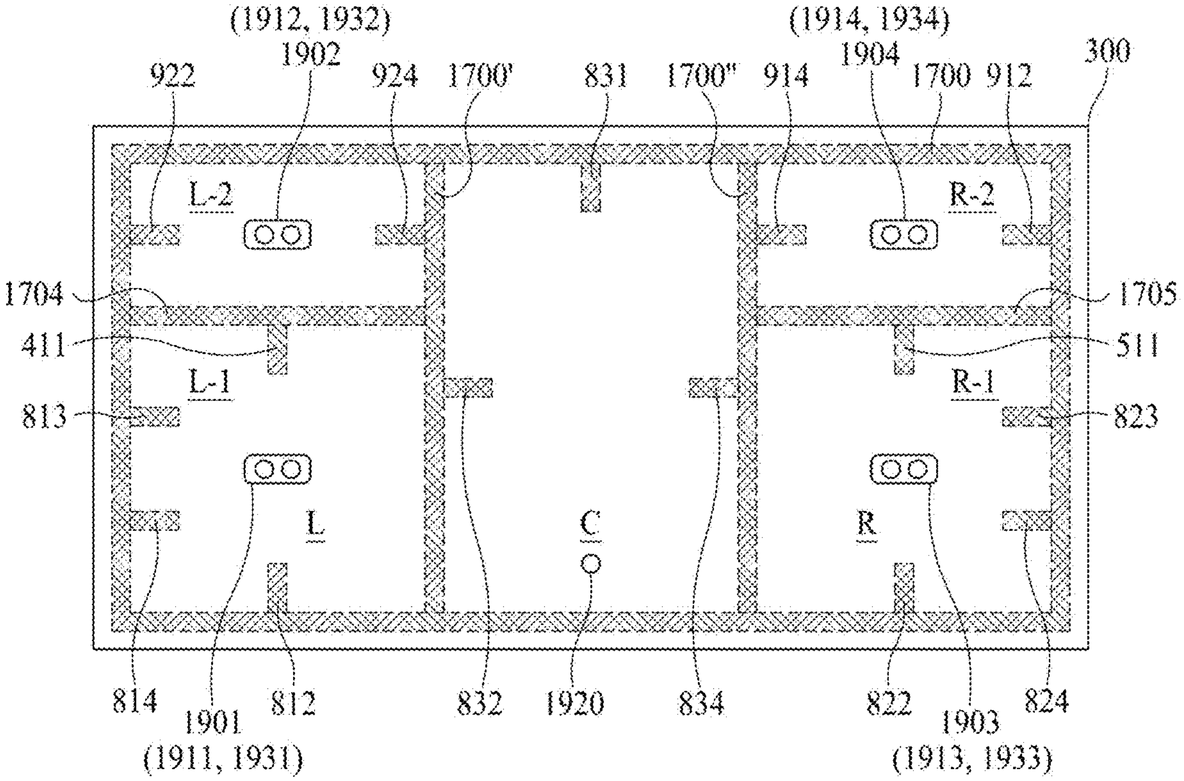
FIGS. 20A to 20D illustrate a sound generating device and a partition according to an embodiment of the present disclosure.

With reference to FIG. 20A, the first region L may include a 1-1$^{st}$ region L-1 and a 1-2$^{nd}$ region L-2, a first sound generating device 1901 may be in the 1-1$^{st}$ region L-1, and a second sound generating device 1902 may be in the 1-2$^{nd}$ region L-2. The first sound generating device 1901 and the second sound generating device 1902 may be provided as sound generating devices having the same structure. When the first sound generating device 1901 and the second sound generating device 1902 are disposed in different structures, for example, when the first sound generating device 1901 is configured with two sound generating devices and the second sound generating device 1902 is configured with six sound generating devices, the first region L may output sounds of different sound bands, and due to this, it may be difficult to output a clean sound. Even when the first sound generating device 1901 is configured with two sound generating devices and the second sound generating device 1902 is configured with six sound generating devices, when the first sound generating device 1901 is configured with sound generating devices for outputting sounds of the same sound band and the second sound generating device 1902 is configured with sound generating devices for outputting sounds of the same sound band, a clean sound may be output. The 1-1$^{st}$ region L-1 may be greater than the 1-2$^{nd}$ region L-2, but embodiments are not limited thereto. For example, the 1-2$^{nd}$ region L-2 may be in a region of one-third (⅓) of the 1-1$^{st}$ region L-1, but embodiments are not limited thereto. For example, when a sound of the middle-pitched sound band may be adjusted to be higher than a sound of the high-pitched sound band, the 1-1$^{st}$ region L-1 may be greater than the 1-2nd region L-2, but embodiments are not limited thereto. For example, the 1-2$^{nd}$ region L-2 may have the same area as that of the 1-1$^{st}$ region L-1. The first sound generating device 1900 of the 1-1$^{st}$ region L-1 may output a sound of the middle-pitched sound band, and the second sound generating device 1902 of the 1-2$^{nd}$ region L-2 may output a sound of the high-pitched sound band. For example, the second sound generating device 1902 of the 1-2$^{nd}$ region L-2 may output a high-pitched sound based on a surround algorithm. For example, the second sound generating device 1902 of the 1-2$^{nd}$ region L-2 may output a surround sound to which a sound field effect algorithm for increasing a sense of space of a sound is applied.

The second region R may include a 2-1$^{st}$ region R-1 and a 2-2$^{nd}$ region R-2, a third sound generating device 1903 may be in the 2-1$^{st}$ region R-1, and a fourth sound generating device 1904 may be in the 2-2$^{nd}$ region R-2. The 2-1$^{st}$ region R-1 may to be greater than the 2-2$^{nd}$ region R-2, but embodiments are not limited thereto. The third sound generating device 1903 of the 2-1$^{st}$ region R-1 may output a sound of the middle-pitched sound band, and the fourth sound generating device 1904 of the 2-2$^{nd}$ region R-2 may output sound of the high-pitched sound band. For example, the fourth sound generating device 1904 of the 2-2$^{nd}$ region R-2 may output a sound of the high-pitched sound band based on the surround algorithm. For example, the fourth sound generating device 1904 of the 2-2$^{nd}$ region R-2 may output a surround sound to which a sound field effect algorithm for increasing a sense of space of a sound is applied.

The first sound generating device 1901, the second sound generating device 1902, the third sound generating device 1903, and the fourth sound generating device 1904 may be provided as sound generating devices having the same structure. For example, the first sound generating device 1901, the second sound generating device 1902, the third sound generating device 1903, and the fourth sound generating device 1904 may be configured with two sound generating devices described above with reference to FIGS. 8, 9B, 10A, and 10B. As another example, the first sound generating device 1901, the second sound generating device 1902, the third sound generating device 1903, and the fourth sound generating device 1904 may be configured with two sound generating devices described above with reference to FIGS. 10A, 10B, and 12. When the first sound generating device 1901 and the second sound generating device 1902 is configured with two sound generating devices and the third sound generating device 1903 and the fourth sound generating device 1904 is configured with six sound generating devices, the first region L and the second region R may output sounds of different sound bands, and due to this, it may be difficult to output a clean sound.

A fifth sound generating device 1920 may be in a third region C. The fifth sound generating device 1920 may be configured as the sound generating device described above with reference to FIGS. 8 and 9A. As another example, the fifth sound generating device 1920 may be configured as the sound generating device described above with reference to FIGS. 9A and 20. For example, the fifth sound generating device 1920 may be configured with one sound generating device. The fifth sound generating device 1920 may output a sound of the middle-low-pitched sound band in the third region C. For example, the fifth sound generating device 1920 may output a sound of a range of about 100 Hz to about 10 kHz, but a range is not limited thereto.

Figure 20B:
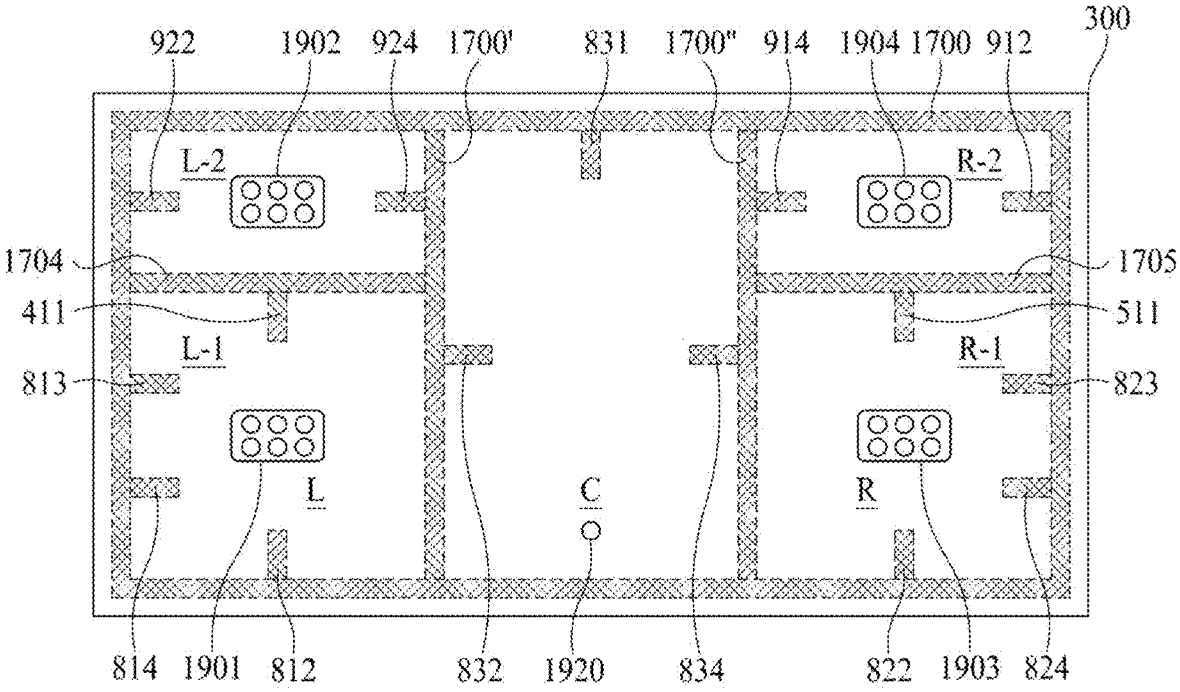

With reference to FIGS. 20A and 20B, the fourth partition 1704 may be between the 1-1$^{st}$ region L-1 and the 1-2$^{nd}$ region L-2 of the first region L. At least one pad may be on at least one side of a first partition 1700 in the 1-1$^{st}$ region L-1. For example, at least one second pad 812 may be on a first side of the first partition 1700, and at least one third pad 813 and at least one fourth pad 814 may be on a second side vertical to the first side of the first partition 1700. As another example, one of the at least one third pad 813 and the at least one fourth pad 814 may be provided. For example, the at least one second pad 812, the at least one third pad 813, and the at least one fourth pad 814 may face the first sound generating device 1901.

At least one thirteenth pad 411 may be on at least one side of the fourth partition 1704. For example, the at least one thirteenth pad 411 may face the first sound generating device 1901. The at least one thirteenth pad 411 may face the at least one second pad 812, but embodiments are not limited thereto.

At least one pad may be on at least one side of the first partition 1700 and a second partition 1700' in the 1-2$^{nd}$ region L-2. For example, at least one fourteenth pad 922 may be on the second side of the first partition 1700. At least one fifteenth pad 924 may be on one side of the second partition 1700'. The at least one fourteenth pad 922 and the at least one fifteenth pad 924 may face the second sound generating device 1902. Also, the at least one fourteenth pad 922 and the at least one fifteenth pad 924 may be disposed symmetrically with respect to the second sound generating device 1902, but embodiments are not limited thereto. For example, the at least one fourteenth pad 922 and the at least one fifteenth pad 924 may be on the same plane or line with respect to the second sound generating device 1902.

The fifth partition 1705 may be between the 2-1$^{st}$ region R-1 and the 2-2$^{nd}$ region R-2 of the second region R. At least one pad may be on at least one side of the first partition 1700 in the 2-1$^{st}$ region R-1. For example, at least one eighth pad 822 may be on the first side of the first partition 1700, and at least one ninth pad 823 and at least one tenth pad 824 may be on the second side vertical to the first side of the first partition 1700. For example, the at least one eighth pad 822, the at least one ninth pad 823, and the at least one tenth pad 824 may face the third sound generating device 1903.

At least one sixteenth pad 511 may be on at least one side of the fifth partition 1705. For example, the at least one sixteenth pad 511 face the third sound generating device 1903. The at least one sixteenth pad 511 may face the at least one eighth pad 822, but embodiments are not limited thereto.

At least one pad may be disposed on at least one side of the first partition 1700 and a third partition 1700" in the 2-2$^{nd}$ region R-2. For example, at least one seventeenth pad 912 may be on the second side of the first partition 1700. At least one eighteenth pad 914 may be on one side of the third partition 1700". The at least one seventeenth pad 912 and the at least one eighteenth pad 914 may face the fourth sound generating device 1904. Also, the at least one seventeenth pad 912 and the at least one eighteenth pad 914 may be disposed symmetrically with respect to the fourth sound generating device 1904, but embodiments are not limited thereto. For example, the at least one seventeenth pad 912 and the at least one eighteenth pad 914 may be on the same plane or line with respect to the fourth sound generating device 1904.

The fourth partition 1704 and the fifth partition 1705 may be formed of the same material as that of the first partition 1700. When the fourth partition 1704 and the fifth partition 1705 are formed of the same material, an adhesive force may be enhanced in a process of attaching a supporting member to the display panel 100. For example, the fourth partition 1704 and the fifth partition 1705 may be formed of the same material as that of the first partition 700, the second partition 1700', and the third partition 1700". The fourth partition 1704 and the fifth partition 1705 may be formed of one of a double-sided tape, a double-sided foam pad, a single-sided tape, a single-sided foam pad, an adhesive, and a bond, but embodiments are limited thereto. For example, the fourth partition 1704 and the fifth partition 1705 may include a foam material that absorbs an impact when contacting the display panel 100. When the double-sided tape or the single-sided tape does not include the foam material, it may be seen that an undesired abnormal sound occurs due to contacting the display panel 100. The fourth partition 1704 and the fifth partition 1705 may be formed of a material having an elastic force which enables compression to be made to a certain degree, and for example, may be formed of polyurethane, polyolefin, polyethylene, and/or the like, but embodiments are not limited thereto.

With reference to FIG. 20B, the first sound generating device 1901, the second sound generating device 1902, the third sound generating device 1903, and the fourth sound generating device 1904 may be configured with six sound generating devices described above with reference to FIG. 9D. Descriptions relevant thereto are substantially similar to descriptions given above with reference to FIG. 20A, and thus, may be omitted. Descriptions of a member and a pad may be the same as or similar to descriptions given above with reference to FIGS. 16A to 19B, and thus, may be omitted.

With reference to FIGS. 20A and 20B, the first and second sound generating devices of the first region L, the third and fourth sound generating devices of the second region R, and the fifth sound generating device of the third region C may be disposed asymmetrically. For example, in FIG. 20A, the first and second sound generating devices 1901 and 1902 of the first region L and the third and fourth sound generating devices 1903 and 1904 of the second region R may be on a line differing from the fifth sound generating device 1920 of the third region C. The first and second sound generating devices 1901 and 1902 of the first region L and the third and fourth sound generating devices 1903 and 1904 of the second region R may be disposed symmetrically, and the fifth sound generating device 1920 of the third region C may be disposed asymmetrically with the first and second sound generating devices 1901 and 1902 of the first region L and the third and fourth sound generating devices 1903 and 1904 of the second region R. The fifth sound generating device 1920 of the third region C may be disposed at a position which is lower than the first and second sound generating devices 1901 and 1902 of the first region L and the third and fourth sound generating devices 1903 and 1904 of the second region R.

Figure 20C:
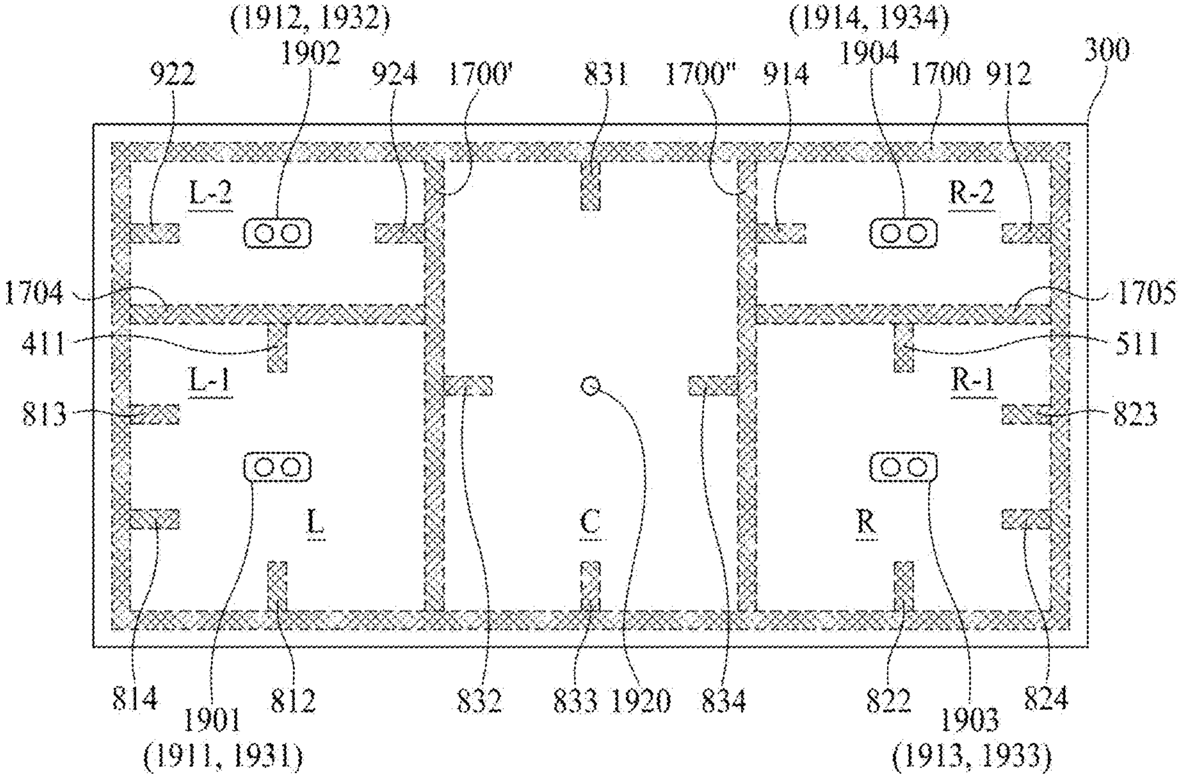
Figure 20D:
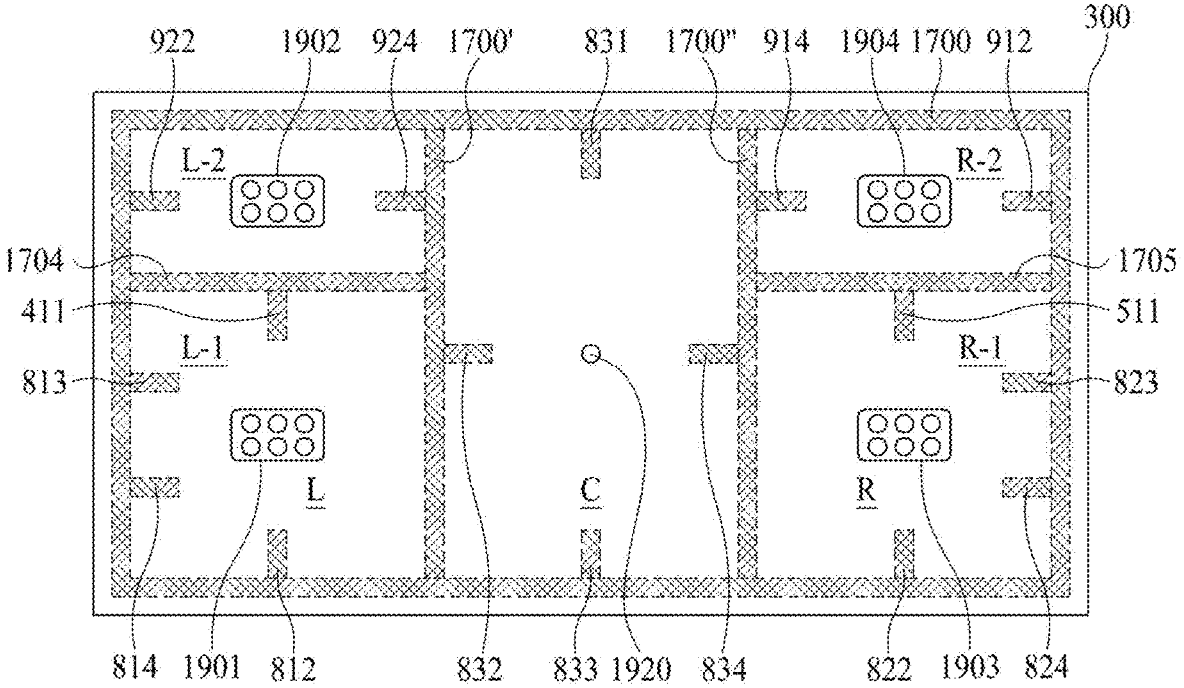

FIGS. 20C and 20D are substantially similar to descriptions given above with reference to FIGS. 18A, 18B, 20A, and 20B, and thus, detailed descriptions may be omitted. With reference to FIGS. 20C and 20D, a fourth member 833 may be on the first side of the first partition 1700. For example, the fourth member 833 may face the third sound generating device 1920. The first member 831 may face the fourth member 833. The first member 831, the second member 832, the third member 834, and the fourth member 833 may decrease or prevent the transfer of a vibration(s), generated by the first region L and/or the second region R, to the third region C, thereby providing a display apparatus for realizing a sharp and clean sound. The first member 831 and the fourth member 833 may decrease a peak or a dip caused by a standing wave which occurs in a lengthwise direction of a sound generating device, and thus, may be referred to as a pad.

With reference to FIGS. 20C and 20D, the first and second sound generating devices 1901 and 1902 of the first region L, the third and fourth sound generating devices 1903 and 1904 of the second region R, and the fifth sound generating device 1920 of the third region C may be disposed symmetrically. For example, in FIG. 20C, the first and second sound generating devices 1901 and 1902 of the first region L and the third and fourth sound generating devices 1903 and 1904 of the second region R may be on the same line as the fifth sound generating device 1920 of the third region C. For example, heights of sound sources which generate sounds may become equal or similar, and thus, when reproducing a stereo sound which expresses a position of a sound based on a difference between left and right sounds, sound image localization where a sound image is realized at a normal position may be enhanced.

Therefore, the first sound generating device 1901 and the third sound generating device 1903 may output sounds of different middle-pitched sound bands, and the second sound generating device 1902 and the fourth sound generating device 1904 may output sounds of different high-pitched sound bands, and the fifth sound generating device 1920 may output a sound of the middle-low-pitched sound band. Accordingly, a display apparatus having a five-channel sound output characteristic may be provided.

FIGS. 21A to 21D illustrate a sound generating device and a partition according to an embodiment of the present disclosure.

In FIGS. 21A to 21D, substantially same descriptions as descriptions given above with reference to FIGS. 14A to 14D and 20A to 20D may be omitted or may be briefly given below. For example, descriptions of a sound generating device, a partition, and a pad may be omitted or may be briefly given below.

Figure 21A:
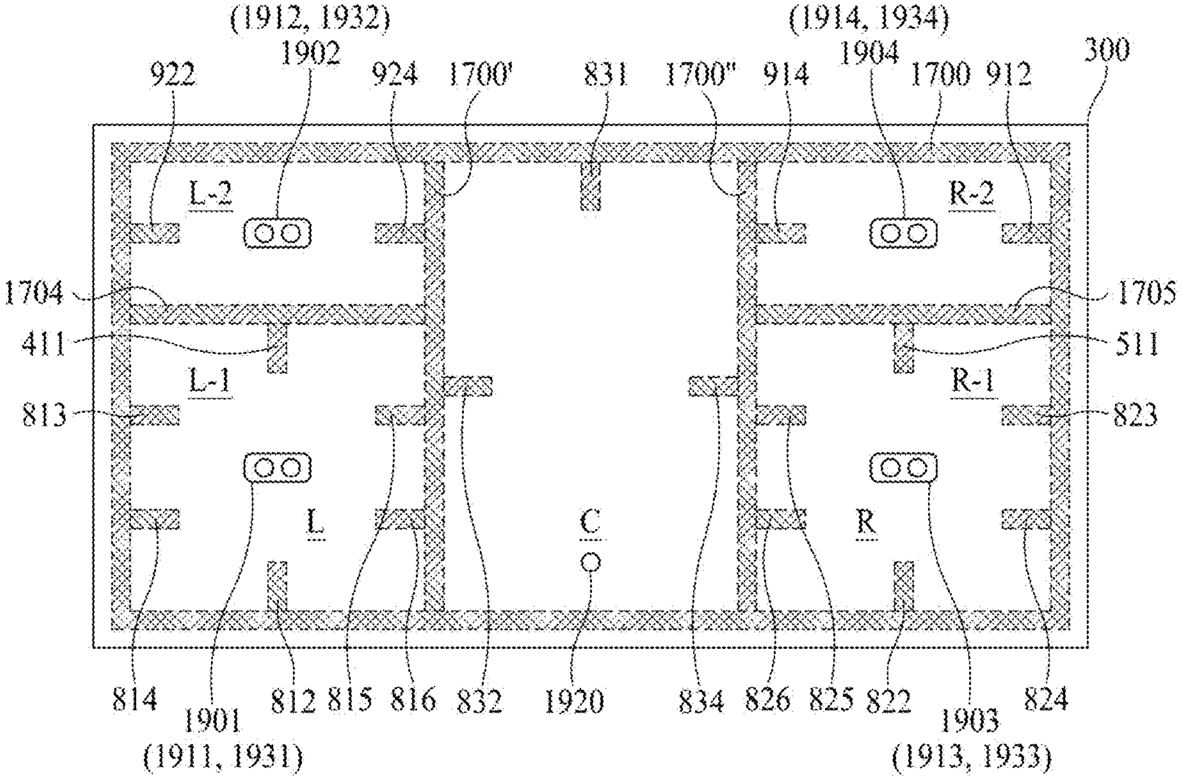
FIGS. 21A to 21D illustrate a sound generating device and a partition according to an embodiment of the present disclosure.
Figure 21B:
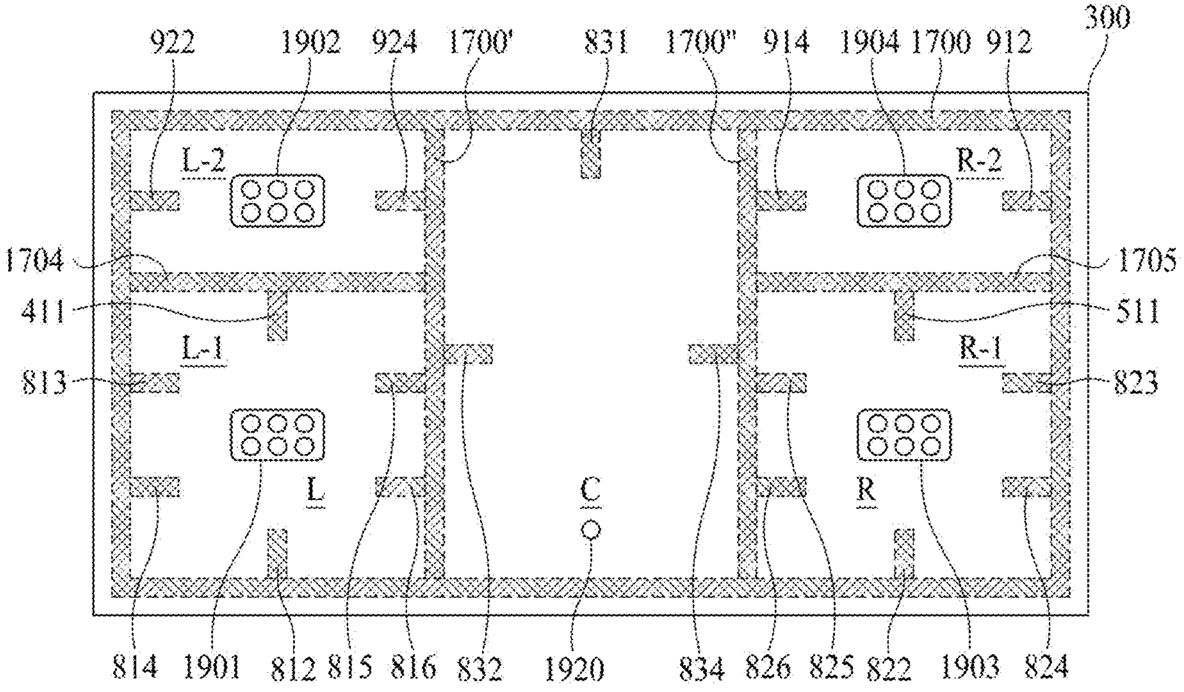
Figure 21C:
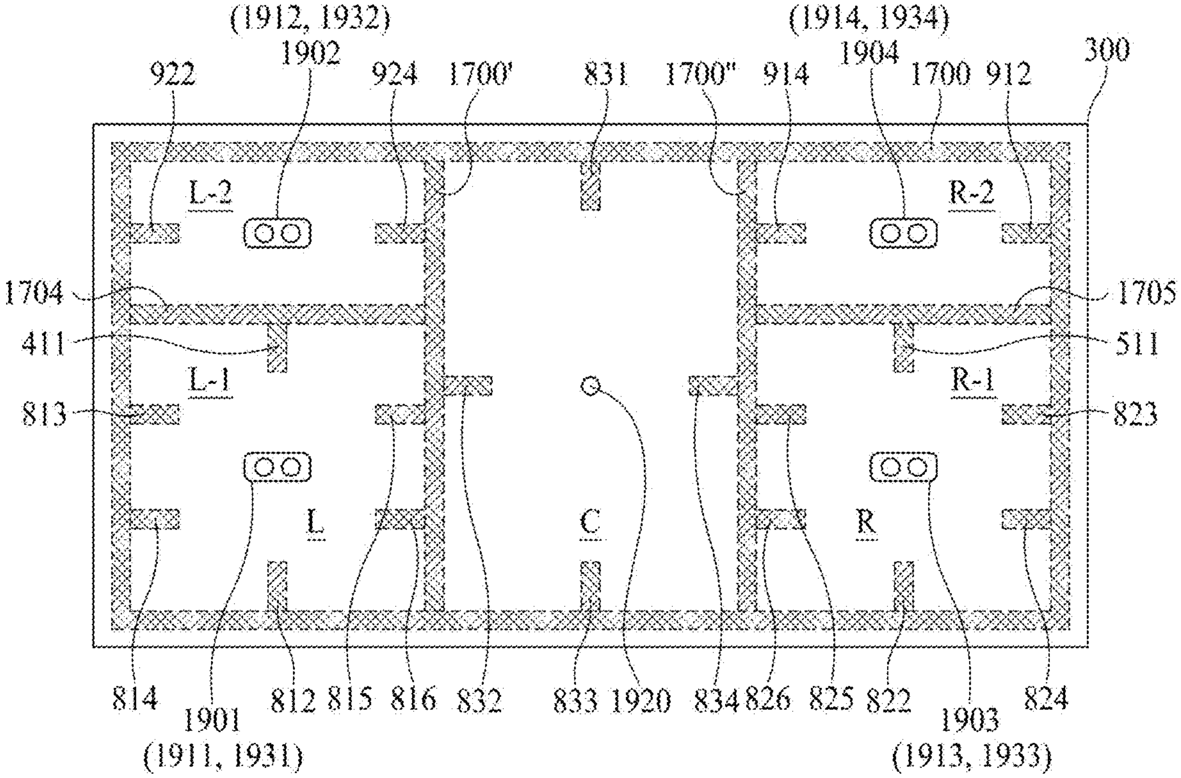
Figure 21D:
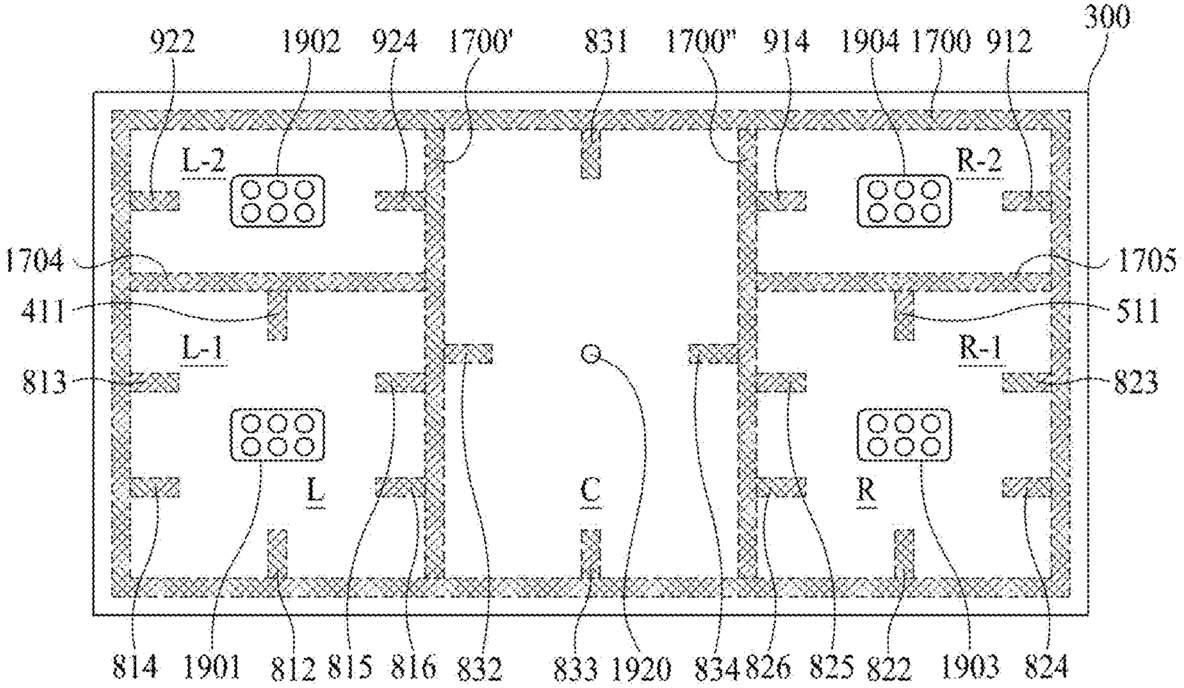

With reference to FIG. 21A, at least one fifth pad 815, sixth pad 816, eleventh pad 825, and twelfth pad 826 may be further on a side facing the second side of the first partition 1700. For example, the at least one fifth pad 815 and the at least one sixth pad 816 may be in a side, facing the second side of the first partition 1700, of a first region L and may be on one side of a second partition 1700'. As another example, one of the at least one fifth pad 815 and the at least one sixth pad 816 may be provided. For example, the at least one eleventh pad 825 and the at least one twelfth pad 826 may be on a side, facing the second side of the first partition 1700, of a second region R and may be on one side of the third partition 1700". As another example, one of the at least one eleventh pad 825 and the at least one twelfth pad 826 may be provided. The fifth pad 815 and the sixth pad 816 may be provided to face the third pad 813 and the fourth pad 814. For example, the fifth pad 815 and the sixth pad 816 may be disposed to be symmetrical with respect to a first sound generating device 1901. The eleventh pad 825 and the twelfth pad 826 may face the ninth pad 823 and the tenth pad 824. For example, the eleventh pad 825 and the twelfth pad 826 may be disposed to be symmetrical with respect to a third sound generating device 1903.

The at least one fifth pad 815 or the at least one sixth pad 816 may be formed of the same material as that of the first partition 1700. For example, the at least one fifth pad 815 or the at least one sixth pad 816 may be formed of one of a double-sided tape, a double-sided foam pad, a single-sided tape, a single-sided foam pad, an adhesive, and a bond, but embodiments are not limited thereto. As another example, the at least one fifth pad 815 or the at least one sixth pad 816 may be formed of a material differing from that of the first partition 1700. The at least one fifth pad 815 or the at least one sixth pad 816 may be formed of a material differing from that of at least one of the first partition 1700, the second partition 1700', and the third partition 1700". The at least one eleventh pad 825 or the at least one twelfth pad 826 may be formed of the same material as that of the first partition 1700. For example, the at least one eleventh pad 825 or the at least one twelfth pad 826 may be formed of one of a double-sided tape, a double-sided foam pad, a single-sided tape, a single-sided foam pad, an adhesive, and a bond, but embodiments are not limited thereto. As another example, the at least one eleventh pad 825 or the at least one twelfth pad 826 may be formed of a material differing from that of the first partition 1700. The at least one eleventh pad 825 or the at least one twelfth pad 826 may be formed of a material differing from that of at least one of the first partition 1700, the second partition 1700', and the third partition 1700".

Therefore, the first sound generating device 1901 and the third sound generating device 1903 may output sounds of different middle-pitched sound bands, and the second sound generating device 1902 and the fourth sound generating device 1904 may output sounds of different high-pitched sound bands, and the fifth sound generating device 1920 may output a sound of the middle-low-pitched sound band. Accordingly, a display apparatus having a five-channel sound output characteristic may be provided.

Figure 22:
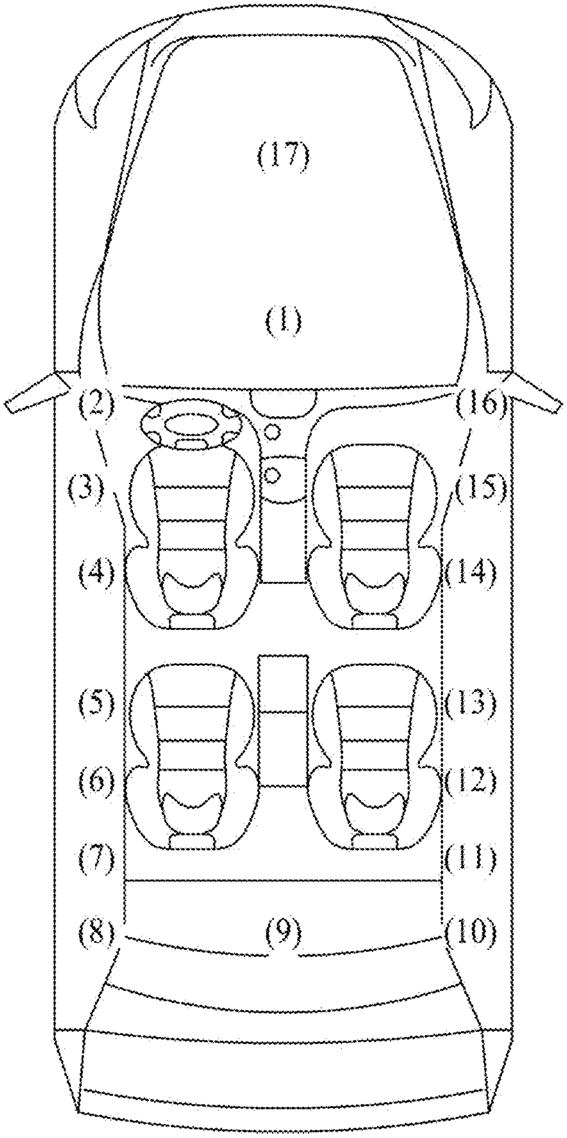
FIG. 22 illustrates an automotive apparatus according to an embodiment of the present disclosure.

FIG. 22 illustrates an automotive apparatus according to an embodiment of the present disclosure.

In the present disclosure, the display panel may be applied to vehicles as a user interface module such as a central control panel for automobiles. For example, the display panel may be provided between occupants sitting on two front seats in order for a vibration of the display panel to be transferred to the inside of a vehicle, but embodiments are not limited thereto. Therefore, an audio experience in a vehicle is improved in comparison with a case where speakers are disposed on interior sides of the vehicle.

With reference to FIG. 22, an automotive apparatus to which a sound generating device or a display apparatus is applied is illustrated as an example. Since an echo is severe inside vehicles and a number of flections on which sound waves bump are in vehicles, it is difficult to output a desired sound. Therefore, when a sound generating device or a display apparatus according to an embodiment of the present disclosure is provided in a vehicle or a vehicle body, the sound generating device or the display apparatus may be implemented to have a small area compared to a related art speaker installed in a vehicle, and an automotive apparatus including a sound generating device or a display apparatus outputting an enhanced sound may be implemented. In FIGS. 22, (1) to (17) represent portions where a sound generating device or a display apparatus is provided in a vehicle or a vehicle body, but embodiments are not limited thereto.

With respect to a driver seat, a sound generating device implemented along with a display apparatus may be in front of the driver seat and a sound generating device with no display apparatus may be behind the driver seat, but embodiments are not limited thereto. As another example, with respect to two front seats, a sound generating device implemented along with a display apparatus may be in front of the two front seats and a sound generating device with no display apparatus may be behind the two front seats, but embodiments are not limited thereto. For example, a portion implemented along with a display apparatus may be implemented along with elements embedded into a vehicle or a display apparatus. For example, in FIG. 22, a sound generating device may be implemented along with a display apparatus in (1). The sound generating device in (1) may be a tweeter or a center speaker, but embodiments are not limited thereto. The sound generating device in (1) may output a sound of about 150 Hz to 20 kHz, but embodiments are not limited thereto. A sound generating device in (17) may output a sound of about 150 Hz to 20 kHz of a mid-range or a full-range, but embodiments are not limited thereto. Also, a sound generating device may be in all of (1) and (17). As another example, a sound generating device may be disposed in one of (1) and (17).

(2) to (4) and (14) to (16) may be a sound generating device in a front door. As another example, a display apparatus including a sound generating device or a display apparatus may be in (2) to (4) and (14) to (16). A sound generating device in (2) and (16) may be a speaker of the mid-range, but embodiments are not limited thereto. The sound generating device in (2) and (16) may output a sound of about 150 Hz to 20 kHz of the mid-range, but embodiments are not limited thereto. A sound generating device in (3) and (15) may be a tweeter, but embodiments are not limited thereto. The sound generating device in (3) and (15) may output a sound of about 2 kHz to 20 kHz, but embodiments are not limited thereto. The sounds output from the sound generating devices in (2), (16), (3), and (15) may be combined and output. A sound generating device in (4) and (14) may be one of a speaker, a woofer, a mid-woofer, and a sub-woofer of the full-range, but embodiments are not limited thereto. The sound generating device in (4) and (14) may output a sound of about 150 Hz to 20 kHz of the full-range, but embodiments are not limited thereto. One of (2) to (4) and (14) to (16) may be provided. For example, a sound generating device may be in of (3), (4), (14), and (15).

(5) to (7) and (11) to (13) may be a sound generating device in a rear door. As another example, a display apparatus including a sound generating device or a display apparatus may be disposed in (5) to (7) and (11) to (13). A sound generating device disposed in (5) and (13) may be a speaker of the mid-range, but embodiments are not limited thereto. A sound generating device in (5) and (13) may be a tweeter, but embodiments are not limited thereto. The sound generating device in (5) and (13) may output a sound of about 150 Hz to 20 kHz of the full-range, but embodiments are not limited thereto. A sound generating device in (6) and (12) may be a speaker of the full-range or a speaker of the mid-range, but embodiments are not limited thereto. The sound generating device disposed in (6) and (12) may output a sound of 150 Hz to 20 kHz within the full-range or the mid-range, but embodiments are not limited thereto. A sound generating device disposed in (7) and (11) may be one of a speaker, a woofer, a mid-woofer, and a sub-woofer of the full-range, but embodiments are not limited thereto. The sound generating device in (7) and (11) may output a sound of about 150 Hz to 20 kHz of the full-range, but embodiments are not limited thereto. One or more of (5) to (7) and (11) to (13) may be provided. For example, a sound generating device may be in (5), (7), (11), and (13).

(8) to (10) may be a sound generating device in a rear deck. As another example, a display apparatus including a sound generating device or a display apparatus may be in (8) to (10). A sound generating device in (8) and (10) may be one of a speaker of the full-range and a speaker of the mid-range, but embodiments are not limited thereto. The sound generating device in (8) and (10) may output a sound of about 150 Hz to 20 kHz of the full-range or the mid-range, but embodiments are not limited thereto. The sound generating device in (8) and (10) may be configured with a sound generating device for outputting a surround sound of the full-range or the mid-range. A sound generating device disposed in (9) may output a sound of about 60 Hz to 150 Hz, but embodiments are not limited thereto. As another example, the sound generating device in (9) may be configured with one or more tweeters instead of one of a woofer and a sub-woofer. As another example, the sound generating device in (9) may be configured with one of a woofer and a sub-woofer or one or more tweeters. Therefore, a sound generating device in a vehicle body may be implemented to output one or more of a sound of about 150 Hz to 20 kHz, a sound of about 2 kHz to 20 kHz, and a sound of about 60 Hz to 150 Hz.

With respect to a driver seat or two front seats, (2) to (4) and (14) to (16) may be referred to as a left side or a left portion and a right side or a right portion, and a sound generating device in a left side or a left portion and a sound generating device in a right side or a right portion may be configured to be symmetrical. As another example, a display apparatus including a sound generating device in a left side or a left portion and a sound generating device in a right side or a right portion may be configured to be symmetrical. For example, a frequency output from a sound generating device in a left side or a left portion with respect to the driver seat or the two front seats may be one or more of about 150 Hz to 20 kHz and about 2 kHz to 20 kHz, and a frequency output from a sound generating device in a right side or a right portion with respect to the driver seat or the two front seats may be one or more of about 150 Hz to 20 kHz and about 2 kHz to 20 kHz. In this case, the sound image localization of a sound output from a left side or a left portion and a right side or a right portion may be enhanced. For example, (2) to (4) and (14) to (16) may be implemented by applying the sound generating device illustrated in FIGS. 2, 5 to 8, and 9A to 12. (1) and (17) may be implemented by applying the sound generating device illustrated in FIGS. 2, 5 to 8, and 9A to 12. (1) to (17) may be implemented by applying the display apparatus illustrated in FIGS. 2, 5 to 8, 9A to 12, and 13A to 21D.

Because the display apparatus according to embodiments of the present disclosure includes the sound generating device that vibrates the display panel to generate sound, the sound of the display apparatus may be output toward a region in front of the display panel. Accordingly, an immersion experience of a viewer who is watching an image displayed by the display apparatus is enhanced.

Moreover, in the display apparatus according to embodiments of the present disclosure, since the sound generating device is provided in the display panel, the sound generating device may be slimmed and may enhance sound. Accordingly, an automotive apparatus may be implemented with the display apparatus or the sound generating device according to embodiments of the present disclosure.

In the sound generating device and the display apparatus including the same according to e embodiments of the present disclosure, the spacer may be in the sound generating device or on the frame, thereby decreasing a problem where a sound of the sound generating device is reduced due to a magnetic force of the magnet.

A sound generating device according to an embodiment of the present disclosure may be applied as a sound generating device in a display apparatus. A display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage devices, game machines, notebook computers, monitors, cameras, camcorders, home appliances, etc. Also, the sound generating device according to an embodiment of the present disclosure may be applied to organic light emitting lighting apparatuses or inorganic light emitting lighting apparatuses. When the sound generating device is applied to a lighting apparatus, the sound generating device may act as lighting and a speaker.

A sound generating device, a display apparatus including the same, and an automotive apparatus including the sound generating device according to an embodiment of the present disclosure will be described below.

According to an embodiment of the present disclosure, a sound generating device includes a magnet and a center pole on a yoke, a bobbin around the center pole, a coil wound around the bobbin, a frame outside the yoke, a damper between the frame and the bobbin, and a spacer in the bobbin.

For example, in a sound generating device according to an embodiment of the present disclosure, the spacer may be on the center pole.

For example, in a sound generating device according to an embodiment of the present disclosure, the spacer may include one of a spring and an adhesive.

For example, a sound generating device according to an embodiment of the present disclosure may further include a bobbin ring on the bobbin and an adhesive member between the bobbin ring and the spacer, wherein the spacer may be attached to the bobbin ring by the adhesive member.

For example, a sound generating device according to an embodiment of the present disclosure may further include a structure in one of a peripheral portion and a center portion of the damper.

For example, in a sound generating device according to an embodiment of the present disclosure, the sound generating device may include two sound generating modules, and bobbin rings of the two sound generating modules are provided as one body.

For example, a sound generating device according to an embodiment of the present disclosure may further include a first structure near the damper and a second structure in a center portion of the damper.

For example, in a sound generating device according to an embodiment of the present disclosure, the spacer may be disposed in a bobbin of each of the two sound generating modules.

According to an embodiment of the present disclosure, a sound generating device includes a first sound generating module and a second sound generating module adjacent to the first sound generating module, wherein the first sound generating module and the second sound generating module includes a magnet and a center pole on a yoke, a bobbin around the center pole, a coil wound around the bobbin, a frame outside the yoke, a damper between the frame and the bobbin, and a spacer on the frame.

For example, in a sound generating device according to an embodiment of the present disclosure, the spacer may be between the first sound generating module and the second sound generating module.

For example, in a sound generating device according to an embodiment of the present disclosure, the spacer may include one of a spring and an adhesive.

For example, a sound generating device according to an embodiment of the present disclosure may further include a first structure near the damper.

For example, a sound generating device according to an embodiment of the present disclosure may further include a second structure in a center portion of the damper.

For example, a sound generating device according to an embodiment of the present disclosure may further include a bobbin ring on the bobbin and an adhesive member between the bobbin ring and the spacer, wherein the spacer may be attached to the bobbin ring by the adhesive member.

According to an embodiment of the present disclosure, a display apparatus includes a display panel configured to display an image, an encapsulation substrate on a rear surface of the display panel, at least one sound generating device in the display panel, the at least one sound generating device being configured to vibrate the display panel to generate sound, and a spacer between the encapsulation substrate and the at least one sound generating device.

For example, in a display apparatus according to an embodiment of the present disclosure, the at least one sound generating device may include a magnet and a center pole on a yoke, a bobbin around the center pole, a coil wound around the bobbin, a frame outside the yoke, and a damper between the frame and the bobbin.

For example, a display apparatus according to an embodiment of the present disclosure may further include a heat dissipation member on a rear surface of the encapsulation substrate, wherein the spacer may be between the heat dissipation member and the center pole.

For example, in a display apparatus according to an embodiment of the present disclosure, the damper may be a line that a sound signal is applied to the at least one sound generating device.

For example, a display apparatus according to an embodiment of the present disclosure may further include a connection member in an extension part of the yoke, wherein the at least one sound generating device may be in the display panel by the connection member.

For example, a display apparatus according to an embodiment of the present disclosure may further include a connection member in an extension part of the frame, wherein the at least one sound generating device may be in the display panel by the connection member.

For example, in a display apparatus according to an embodiment of the present disclosure, the spacer may include one of a spring and an adhesive.

For example, in a display apparatus according to an embodiment of the present disclosure, the at least one sound generating device may include one or more of a pair of sound generating devices, an oval sound generating device, a circular sound generating device, a single type sound generating device, and a two or more-device array sound generating device.

According to an embodiment of the present disclosure, a display apparatus includes a display panel configured to display an image and including a first region, a second region, and a third region, a supporting member configured to support the display panel, at least one sound generating device in the display panel and at least one of the first region, the second region, and the third region, a first partition between the display panel and the supporting member, the first partition including a first side and a second side vertical to the first side, a second partition between the first region and the third region, and a third partition between the second region and the third region, wherein the at least one sound generating device includes a magnet and a center pole on a yoke, a bobbin around the center pole, a coil wound around the bobbin, a frame outside the yoke, a damper between the frame and the bobbin, and a spacer in the bobbin or on the frame.

For example, in a display apparatus according to an embodiment of the present disclosure, the at least one sound generating device may include a two-device array sound generating module, and the spacer is in a bobbin of the two-device array sound generating module.

For example, a display apparatus according to an embodiment of the present disclosure may further include a bobbin ring on the bobbin, wherein bobbin rings of the two-device array sound generating module may be provided as one body.

For example, in a display apparatus according to an embodiment of the present disclosure, the at least one sound generating device may include a two-device array sound generating device, and the spacer is on the frame.

For example, a display apparatus according to an embodiment of the present disclosure may further include an encapsulation substrate on a rear surface of the display panel and a heat dissipation member on a rear surface of the encapsulation substrate, wherein the spacer may be between the heat dissipation member and the center pole.

For example, in a display apparatus according to an embodiment of the present disclosure, the damper may be a line that a sound signal is applied to the at least one sound generating device.

For example, in a display apparatus according to an embodiment the present disclosure, the yoke may include an extension part, the display apparatus may further include a connection member in the extension part, and the at least one sound generating device may be in the display panel by the connection member.

For example, in a display apparatus according to an embodiment of the present disclosure, the frame may include an extension part, the display apparatus may further include a connection member in the extension part, and the at least one sound generating device may be in the display panel by the connection member.

For example, in a display apparatus according to an embodiment of the present disclosure, the spacer may include one of a spring and an adhesive.

For example, in a display apparatus according to an embodiment of the present disclosure, the at least one sound generating device may include one or more of a pair of sound generating devices, an oval sound generating device, a circular sound generating device, a single type sound generating device, and a two or more-device array sound generating device.

For example, in a display apparatus according to an embodiment of the present disclosure, the at least one sound generating device may be in each of the first region and the second region.

For example, a display apparatus according to an embodiment of the present disclosure may further include at least one first pad in the first region and the first side, at least one second pad in a side facing the at least one first pad, and at least one third pad or at least one fourth pad in the second side.

For example, a display apparatus according to an embodiment of the present disclosure may further include at least one fifth pad or at least one sixth pad in the first region and at least one side of the second partition.

For example, a display apparatus according to an embodiment of the present disclosure may further include at least one seventh pad in the second region and the first side, at least one eighth pad in a side facing the at least one seventh pad, and at least one ninth pad or at least one tenth pad in the second side.

For example, a display apparatus according to an embodiment of the present disclosure may further include at least one eleventh pad or at least one twelfth pad in the second region and at least one side of the third partition.

For example, in a display apparatus according to an embodiment of the present disclosure, the at least one sound generating device may be further disposed in the third region.

For example, a display apparatus according to an embodiment of the present disclosure may further include at least one first member in the third region and the first side, at least one second member in at least one side of the second partition, and at least one third member in at least one side of the third partition.

For example, a display apparatus according to an embodiment of the present disclosure may further include at least one first member in the third region and the first side, at least one second member in at least one side of the second partition, at least one third member in at least one side of the third partition, and at least one fourth member in a side facing the at least one first member.

For example, in a display apparatus according to an embodiment of the present disclosure, the first region may include a 1-1$^{st}$ region and a 1-2$^{nd}$ region, and the second region may include a 2-1$^{st}$ region and a 2-2$^{nd}$ region.

For example, a display apparatus according to an embodiment of the present disclosure may further include a fourth partition between the 1-1$^{st}$ region and the 1-2$^{nd}$ region and a fifth partition between the 2-1$^{st}$ region and the 2-2$^{nd}$ region.

For example, a display apparatus according to an embodiment of the present disclosure may further include at least one second pad in the 1-1$^{st}$ region and the first side, at least one third pad or at least one fourth pad in the second side, at least one thirteenth pad in at least one side of the fourth partition, at least one fourteenth pad in the 1-2$^{nd}$ region and the second side of the first partition, and at least one fifteenth pad in at least one side of the second partition.

For example, a display apparatus according to an embodiment of the present disclosure may further include at least one fifth pad or at least one sixth pad in the 1-1$^{st}$ region and at least one side of the second partition.

For example, a display apparatus according to an embodiment of the present disclosure may further include at least one eighth pad in the 2-1$^{st}$ region and the first side, at least one ninth pad or at least one tenth pad in the second side, at least one sixteenth pad in at least one side of the fifth partition, at least one seventeenth pad in the 2-2$^{nd}$ region and the second side, and at least one eighteenth pad in at least one side of the third partition.

For example, a display apparatus according to an embodiment of the present disclosure may further include at least one eleventh pad or at least one twelfth pad in the 2-1$^{st}$ region and at least one side of the third partition.

For example, a display apparatus according to an embodiment of the present disclosure may further include at least one first member in the third region and the first side, at least one second member in at least one side of the second partition, and at least one third member in at least one side of the third partition.

For example, a display apparatus according to an embodiment of the present disclosure may further include at least one first member in the third region and the first side, at least one second member in at least one side of the second partition, at least one third member in at least one side of the third partition, and at least one fourth member in a side facing the at least one first member.

According to an embodiment of the present disclosure, an automotive apparatus includes a vehicle body and a display apparatus or a sound generating device in the vehicle body.

For example, in an automotive apparatus according to an embodiment of the present disclosure, a sound generating device in a left portion and a sound generating device in a right portion may be symmetrical with respect to a driver seat or two front seats of the vehicle body.

For example, in an automotive apparatus according to an embodiment of the present disclosure, the sound generating device in the vehicle body may output sound having one or more of 150 Hz to 20 kHz, 2 kHz to 20 kHz, and 60 Hz to 150 Hz.

It will be apparent to those skilled in the art that various modifications and variations may be made in the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. A display apparatus, comprising:

a display panel configured to display an image and including a first region, a second region, and a third region;

a supporting member configured to support the display panel;

at least one sound generating device in at least one of the first region, the second region, and the third region, the at least one sound generating device configured to vibrate the display panel;

a first partition between the display panel and the supporting member, the first partition surrounding the first region, the second region, and the third region;

a second partition between the first region and the third region; and a third partition between the second region and the third region, wherein the at least one sound generating device includes:

a magnet and a center pole on a yoke;

a bobbin around the center pole;

a coil wound around the bobbin;

a frame outside the yoke;

a damper between the frame and the bobbin; and a spacer in the bobbin or on the frame, wherein the at least one sound generating device includes a two or more-device array sound generating module, and wherein the spacer is in the bobbin of the two or more-device array sound generating module or is on the frame.

2. The display apparatus of claim 1, further comprising a bobbin ring on the bobbin, wherein bobbin rings of the two or more-device array sound generating module are one body.

3. The display apparatus of claim 1, wherein the at least one sound generating device includes a two-device array sound generating device; and wherein the spacer is on the frame between two-device array sound generating device.

4. The display apparatus of claim 1, further comprising:

an encapsulation substrate on a rear surface of the display panel; and a heat dissipation member on a rear surface of the encapsulation substrate, wherein the spacer is between the heat dissipation member and the center pole.

5. The display apparatus of claim 1, wherein the damper includes a line that a sound signal is applied to the at least one sound generating device.

6. The display apparatus of claim 1, wherein the yoke includes an extension part;

wherein the display apparatus further comprises a connection member in the extension part; and wherein the at least one sound generating device is in the display panel by the connection member.

7. The display apparatus of claim 1, wherein the frame comprises an extension part;

wherein the display apparatus further comprises a connection member in the extension part; and wherein the at least one sound generating device is in the display panel by the connection member.

8. The display apparatus of claim 1, wherein the spacer includes one of a spring and an adhesive.

9. The display apparatus of claim 1, wherein the at least one sound generating device includes a two-device array sound generating device; and wherein the spacer is in the bobbin of each of the two-device array sound generating device.

10. The display apparatus of claim 1, wherein the at least one sound generating device is in each of the first region and the second region.

11. The display apparatus of claim 10, further comprising:

at least one first pad in the first region and a first side of the first partition;

at least one second pad in a side facing the at least one first pad; and at least one third pad or at least one fourth pad in a second side vertical to the first side of the first partition.

12. The display apparatus of claim 11, further comprising at least one fifth pad or at least one sixth pad in the first region and at least one side of the second partition.

13. The display apparatus of claim 10, further comprising:

at least one seventh pad in the second region and a first side of the first partition;

at least one eighth pad in a side facing the at least one seventh pad; and at least one ninth pad or at least one tenth pad in a second side vertical to the first side of the first partition.

14. The display apparatus of claim 13, further comprising at least one eleventh pad or at least one twelfth pad in the second region and at least one side of the third partition.

15. The display apparatus of claim 10, wherein the at least one sound generating device is further disposed in the third region.

16. The display apparatus of claim 15, further comprising:

at least one first member in the third region and a first side of the first partition;

at least one second member in at least one side of the second partition; and at least one third member in at least one side of the third partition.

17. The display apparatus of claim 15, further comprising:

at least one first member in the third region and a first side of the first partition;

at least one second member in at least one side of the second partition;

at least one third member in at least one side of the third partition; and at least one fourth member in a side facing the at least one first member.

18. The display apparatus of claim 1, wherein:

the first region comprises a 1-1$^{st}$ region and a 1-2$^{nd}$ region; and the second region comprises a 2-1$^{st}$ region and a 2-2$^{nd}$ region.

19. The display apparatus of claim 18, further comprising:

a fourth partition between the 1-1$^{st}$ region and the 1-2$^{nd}$ region; and a fifth partition between the 2-1$^{st}$ region and the 2-2$^{nd}$ region.

20. The display apparatus of claim 18, further comprising:

at least one second pad in the 1-1$^{st}$ region and a first side of the first partition;

at least one third pad or at least one fourth pad in a second side vertical to the first side of the first partition;

at least one thirteenth pad in at least one side of the fourth partition;

at least one fourteenth pad in the 1-2$^{nd}$ region and the second side of the first partition; and at least one fifteenth pad in at least one side of the second partition.

21. The display apparatus of claim 20, further comprising at least one fifth pad or at least one sixth pad in the 1-1$^{st}$ region and at least one side of the second partition.

22. The display apparatus of claim 19, further comprising:

at least one eighth pad d in the 2-1$^{st}$ region and a first side of the first partition;

at least one ninth pad or at least one tenth pad in a second side vertical to the first side of the first partition;

at least one sixteenth pad in at least one side of the fifth partition;

at least one seventeenth pad in the 2-2$^{nd}$ region and the second side; and at least one eighteenth pad in at least one side of the third partition.

23. The display apparatus of claim 22, further comprising at least one eleventh pad or at least one twelfth pad in the 2-1$^{st}$ region and at least one side of the third partition.

24. The display apparatus of claim 19, further comprising:

at least one first member in the third region and a first side of the first partition;

at least one second member in at least one side of the second partition; and at least one third member in at least one side of the third partition.

25. The display apparatus of claim 20, further comprising:

at least one first member in the third region and the first side;

at least one second member in at least one side of the second partition; and at least one third member in at least one side of the third partition.

26. The display apparatus of claim 21, further comprising:

at least one first member in the third region and the first side;

at least one second member in at least one side of the second partition; and at least one third member in at least one side of the third partition.

27. The display apparatus of claim 22, further comprising:

at least one first member in the third region and the first side;

at least one second member in at least one side of the second partition; and at least one third member in at least one side of the third partition.

28. The display apparatus of claim 23, further comprising:

at least one first member in the third region and the first side;

at least one second member in at least one side of the second partition; and at least one third member in at least one side of the third partition.

29. An automotive apparatus, comprising:

a vehicle body; and the sound generating device of claim 1, the sound generating device being in the vehicle body.

30. The automotive apparatus of claim 29, wherein a sound generating device in a left portion and a sound generating device in a right portion are symmetrical with respect to a driver seat or two front seats of the vehicle body.

31. The automotive apparatus of claim 29, wherein the sound generating device in the vehicle body outputs a sound having one or more of 150 Hz to 20 kHz, 2 kHz to 20 kHz, and 60 Hz to 150 Hz.

* * * * *